(12) United States Patent
Ording

(10) Patent No.: US 10,983,692 B2
(45) Date of Patent: *Apr. 20, 2021

(54) LIST SCROLLING AND DOCUMENT TRANSLATION, SCALING, AND ROTATION ON A TOUCH-SCREEN DISPLAY

(71) Applicant: Apple Inc., Cupertino, CA (US)

(72) Inventor: Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/794,111

(22) Filed: Feb. 18, 2020

(65) Prior Publication Data

US 2020/0241741 A1 Jul. 30, 2020

Related U.S. Application Data

(63) Continuation of application No. 15/483,743, filed on Apr. 10, 2017, now Pat. No. 10,606,470, which is a (Continued)

(51) Int. Cl.
*G06F 3/0488* (2013.01)
*G06F 40/106* (2020.01)
(Continued)

(52) U.S. Cl.
CPC ........ *G06F 3/04883* (2013.01); *G06F 3/0482* (2013.01); *G06F 3/0485* (2013.01);
(Continued)

(58) Field of Classification Search
None
See application file for complete search history.

(56) References Cited

U.S. PATENT DOCUMENTS 4,395,134 A 7/1983 Luce
4,455,452 A 6/1984 Schuyler
(Continued)

FOREIGN PATENT DOCUMENTS

AU 2007283771 A1 4/2008
AU 2008201540 A1 6/2008
(Continued)

OTHER PUBLICATIONS

Advisory Action received for U.S. Appl. No. 90/012,332, dated Nov. 20, 2013, 10 pages.
(Continued)

*Primary Examiner* — Toan H Vu
(74) *Attorney, Agent, or Firm* — Dentons US LLP

(57) ABSTRACT

In accordance with some embodiments, a computer-implemented method for use in conjunction with a device with a touch screen display is disclosed. In the method, a movement of an object on or near the touch screen display is detected. In response to detecting the movement, an electronic document displayed on the touch screen display is translated in a first direction. If an edge of the electronic document is reached while translating the electronic document in the first direction while the object is still detected on or near the touch screen display, an area beyond the edge of the document is displayed. After the object is no longer detected on or near the touch screen display, the document is translated in a second direction until the area beyond the edge of the document is no longer displayed.

42 Claims, 38 Drawing Sheets

Related U.S. Application Data continuation of application No. 14/624,518, filed on Feb. 17, 2015, now Pat. No. 9,619,132, which is a continuation of application No. 12/270,815, filed on Nov. 13, 2008, now Pat. No. 9,052,814, which is a continuation of application No. 11/956,969, filed on Dec. 14, 2007, now Pat. No. 7,469,381.

(60) Provisional application No. 60/937,993, filed on Jun. 29, 2007, provisional application No. 60/946,971, filed on Jun. 28, 2007, provisional application No. 60/945,858, filed on Jun. 22, 2007, provisional application No. 60/879,469, filed on Jan. 8, 2007, provisional application No. 60/883,801, filed on Jan. 7, 2007, provisional application No. 60/879,253, filed on Jan. 7, 2007.

(51) Int. Cl.

| | | |
|---|---|---|
| *H04M 1/7243* | (2021.01) | |
| *H04M 1/72403* | (2021.01) | |
| *H04M 1/72427* | (2021.01) | |
| *H04M 1/72445* | (2021.01) | |
| *G06F 3/0485* | (2013.01) | |
| *G06F 3/0482* | (2013.01) | |
| *G06F 3/0484* | (2013.01) | |

(52) U.S. Cl.
CPC ........ *G06F 3/0488* (2013.01); *G06F 3/04845* (2013.01); *G06F 40/106* (2020.01); *H04M 1/7243* (2021.01); *H04M 1/72403* (2021.01); *H04M 1/72427* (2021.01); *H04M 1/72445* (2021.01); *G06F 2203/04803* (2013.01); *G06F 2203/04806* (2013.01); *G06F 2203/04808* (2013.01); *H04M 2250/12* (2013.01); *H04M 2250/22* (2013.01)

(56) References Cited

U.S. PATENT DOCUMENTS

| | | |
|---|---|---|
| 4,550,221 A | 10/1985 | Mabusth |
| 4,746,770 A | 5/1988 | McAvinney |
| 4,843,568 A | 6/1989 | Krueger et al. |
| 4,954,967 A | 9/1990 | Takahashi |
| 5,046,434 A | 9/1991 | Breezer et al. |
| 5,088,070 A | 2/1992 | Shiff |
| 5,241,674 A | 8/1993 | Kuorsawa et al. |
| 5,313,229 A | 5/1994 | Gilligan et al. |
| 5,374,787 A | 12/1994 | Miller et al. |
| 5,428,367 A | 6/1995 | Mikan |
| 5,454,960 A | 10/1995 | Newsom |
| 5,463,725 A | 10/1995 | Henckel et al. |
| 5,477,508 A | 12/1995 | Will |
| 5,483,261 A | 1/1996 | Yasutake |
| 5,488,204 A | 1/1996 | Mead et al. |
| 5,495,566 A | 2/1996 | Kwatinetz |
| 5,519,393 A | 5/1996 | Brandestini |
| 5,534,893 A | 7/1996 | Hansen, Jr. et al. |
| 5,543,591 A | 8/1996 | Gillespie et al. |
| 5,563,631 A | 10/1996 | Masunaga |
| 5,634,064 A | 5/1997 | Warnock et al. |
| 5,676,064 A | 10/1997 | Shuert |
| 5,686,940 A | 11/1997 | Kuga |
| 5,691,747 A | 11/1997 | Amano |
| 5,739,775 A | 4/1998 | Brandestini |
| 5,825,352 A | 10/1998 | Bisset et al. |
| 5,825,353 A | 10/1998 | Will |
| 5,835,079 A | 11/1998 | Shieh |
| 5,844,547 A | 12/1998 | Minakuchi et al. |
| 5,852,413 A | 12/1998 | Bacchi et al. |
| 5,867,158 A | 2/1999 | Murasaki et al. |
| 5,869,791 A | 2/1999 | Young |
| 5,874,961 A | 2/1999 | Bates et al. |
| 5,880,411 A | 3/1999 | Gillespie et al. |
| 5,903,229 A | 5/1999 | Kishi |
| 5,903,902 A | 5/1999 | Orr et al. |
| 5,940,521 A | 8/1999 | East et al. |
| 5,942,733 A | 8/1999 | Allen et al. |
| 5,956,020 A | 9/1999 | D'Amico et al. |
| 5,960,366 A | 9/1999 | Duwaer |
| 5,982,710 A | 11/1999 | Rawat et al. |
| 6,028,271 A | 2/2000 | Gillespie et al. |
| 6,028,602 A | 2/2000 | Weidenfeller et al. |
| 6,034,688 A | 3/2000 | Greenwood et al. |
| 6,061,063 A | 5/2000 | Wagner et al. |
| 6,067,068 A | 5/2000 | Hussain |
| 6,089,371 A | 7/2000 | Lin |
| 6,141,018 A | 10/2000 | Beri et al. |
| 6,188,391 B1 | 2/2001 | Seely et al. |
| 6,203,190 B1 | 3/2001 | Stotz |
| 6,239,389 B1 | 5/2001 | Allen et al. |
| 6,249,689 B1 | 6/2001 | Aizawa |
| 6,278,443 B1 | 8/2001 | Amro et al. |
| 6,297,795 B1 | 10/2001 | Kato et al. |
| 6,300,939 B1 | 10/2001 | Decker et al. |
| 6,305,234 B1 | 10/2001 | Thies et al. |
| 6,310,648 B1 | 10/2001 | Miller et al. |
| 6,320,610 B1 | 11/2001 | Van Sant et al. |
| 6,323,846 B1 | 11/2001 | Westerman et al. |
| 6,337,698 B1 | 1/2002 | Keely, Jr. et al. |
| 6,351,657 B2 | 2/2002 | Yamada |
| 6,356,283 B1 | 3/2002 | Guedalia |
| 6,396,482 B1 | 5/2002 | Griffin et al. |
| 6,477,117 B1 | 11/2002 | Narayanaswami et al. |
| 6,486,896 B1 | 11/2002 | Ubillos |
| 6,489,951 B1 | 12/2002 | Wong et al. |
| 6,501,487 B1 | 12/2002 | Taguchi |
| 6,509,907 B1 | 1/2003 | Kuwabara |
| 6,525,997 B1 | 2/2003 | Narayanaswami et al. |
| 6,535,461 B1 | 3/2003 | Karhu |
| 6,556,222 B1 | 4/2003 | Narayanaswami |
| 6,567,102 B2 | 5/2003 | Kung |
| 6,570,557 B1 | 5/2003 | Westerman et al. |
| 6,570,594 B1 | 5/2003 | Wagner |
| 6,590,595 B1 | 7/2003 | Wagner et al. |
| 6,636,197 B1 | 10/2003 | Goldenberg et al. |
| 6,647,338 B1 | 11/2003 | Hamberger et al. |
| 6,650,343 B1 | 11/2003 | Fujita et al. |
| 6,661,409 B2 | 12/2003 | Demartines et al. |
| 6,661,438 B1 | 12/2003 | Shiraishi et al. |
| 6,664,991 B1 | 12/2003 | Chew et al. |
| 6,677,932 B1 | 1/2004 | Westerman |
| 6,677,965 B1 | 1/2004 | Ullmann et al. |
| 6,690,387 B2 | 2/2004 | Zimmerman et al. |
| 6,700,564 B2 | 3/2004 | McLoone et al. |
| 6,707,449 B2 | 3/2004 | Hinckley et al. |
| 6,720,860 B1 | 4/2004 | Narayanaswami |
| 6,741,966 B2 | 5/2004 | Romesburg |
| 6,757,673 B2 | 6/2004 | Makus et al. |
| 6,788,220 B2 | 9/2004 | Netzer |
| 6,791,530 B2 | 9/2004 | Vernier et al. |
| 6,809,275 B1 | 10/2004 | Cheng et al. |
| 6,809,724 B1 | 10/2004 | Shiraishi et al. |
| 6,820,237 B1 | 11/2004 | Abu-Hakima et al. |
| 6,839,721 B2 | 1/2005 | Schwols |
| 6,842,169 B2 | 1/2005 | Griffin et al. |
| 6,903,927 B2 | 6/2005 | Anlauff |
| 6,907,575 B2 | 6/2005 | Duarte |
| 6,912,462 B2 | 6/2005 | Ogaki |
| 6,920,619 B1 | 7/2005 | Milekic |
| 6,957,392 B2 | 10/2005 | Simister et al. |
| 6,958,749 B1 | 10/2005 | Matsushita et al. |
| 6,967,642 B2 | 11/2005 | SanGiovanni |
| 6,967,903 B2 | 11/2005 | Guanter |
| 6,970,160 B2 | 11/2005 | Mulligan et al. |
| 6,972,776 B2 | 12/2005 | Davis et al. |
| 6,975,306 B2 | 12/2005 | Hinckley et al. |
| 6,985,178 B1 | 1/2006 | Morita et al. |
| 7,007,239 B1 | 2/2006 | Hawkins et al. |
| 7,009,599 B2 | 3/2006 | Pihlaja |
| 7,009,626 B2 | 3/2006 | Anwar |
| 7,015,894 B2 | 3/2006 | Morohoshi |

(56) References Cited

U.S. PATENT DOCUMENTS

| | | |
|---|---|---|
| 7,030,860 B1 | 4/2006 | Hsu et al. |
| 7,046,230 B2 | 5/2006 | Zadesky et al. |
| 7,075,512 B1 | 7/2006 | Fabre et al. |
| 7,075,513 B2 | 7/2006 | Silfverberg et al. |
| 7,081,866 B2 | 7/2006 | Gaechter |
| 7,081,905 B1 | 7/2006 | Raghunath |
| 7,102,626 B2 | 9/2006 | Denny, III |
| 7,109,978 B2 | 9/2006 | Gillespie et al. |
| 7,116,317 B2 | 10/2006 | Gregorio et al. |
| 7,117,453 B2 | 10/2006 | Drucker et al. |
| 7,143,355 B2 | 11/2006 | Yamaguchi et al. |
| 7,146,005 B1 | 12/2006 | Anft et al. |
| 7,152,210 B1 | 12/2006 | Van Den Hoven et al. |
| 7,154,534 B2 | 12/2006 | Seki et al. |
| 7,155,048 B2 | 12/2006 | Ohara |
| 7,168,047 B1 | 1/2007 | Huppi |
| 7,173,623 B2 | 2/2007 | Calkins et al. |
| 7,181,373 B2 | 2/2007 | Le Cocq et al. |
| 7,184,064 B2 | 2/2007 | Zimmerman et al. |
| 7,184,796 B2 | 2/2007 | Karidis et al. |
| 7,240,291 B2 | 7/2007 | Card et al. |
| 7,254,775 B2 | 8/2007 | Geaghan et al. |
| 7,256,770 B2 | 8/2007 | Hinckley et al. |
| 7,272,077 B2 | 9/2007 | Nobs |
| 7,286,063 B2 | 10/2007 | Gauthey et al. |
| 7,286,119 B2 | 10/2007 | Yamaguchi et al. |
| 7,317,449 B2 | 1/2008 | Robbins et al. |
| 7,333,084 B2 | 2/2008 | Griffin |
| 7,337,412 B2 | 2/2008 | Guido et al. |
| 7,339,573 B2 | 3/2008 | Andert et al. |
| 7,346,850 B2 | 3/2008 | Swartz et al. |
| 7,355,620 B2 | 4/2008 | Ikehata et al. |
| 7,382,139 B2 | 6/2008 | Mackey |
| 7,411,575 B2 | 8/2008 | Hill et al. |
| 7,446,783 B2 | 11/2008 | Grossman |
| 7,450,113 B2 | 11/2008 | Gillespie et al. |
| 7,450,114 B2 | 11/2008 | Anwar |
| 7,463,239 B2 | 12/2008 | Ledbetter et al. |
| 7,469,381 B2 | 12/2008 | Ording |
| 7,469,386 B2 | 12/2008 | Bear et al. |
| 7,477,890 B1 | 1/2009 | Narayanaswami |
| 7,479,949 B2 | 1/2009 | Jobs et al. |
| 7,499,040 B2 | 3/2009 | Zadesky et al. |
| 7,506,269 B2 | 3/2009 | Lang |
| 7,511,702 B2 | 3/2009 | Hotelling |
| 7,519,468 B2 | 4/2009 | Orr et al. |
| 7,532,205 B2 | 5/2009 | Gillespie et al. |
| 7,561,159 B2 | 7/2009 | Abel et al. |
| 7,576,732 B2 | 8/2009 | Lii |
| 7,612,786 B2 | 11/2009 | Vale et al. |
| 7,658,675 B2 | 2/2010 | Hotta |
| 7,663,607 B2 | 2/2010 | Hotelling et al. |
| 7,724,242 B2 | 5/2010 | Hillis et al. |
| 7,735,016 B2 | 6/2010 | Celik et al. |
| 7,786,975 B2 | 8/2010 | Ording et al. |
| 7,794,138 B2 | 9/2010 | Hilfiker |
| 7,844,913 B2 | 11/2010 | Amano et al. |
| 7,844,915 B2 | 11/2010 | Platzer et al. |
| 7,856,255 B2 | 12/2010 | Tsuchiya et al. |
| 7,872,640 B2 | 1/2011 | Lira |
| 7,890,882 B1 | 2/2011 | Nelson |
| 7,916,157 B1 | 3/2011 | Kelley et al. |
| 8,001,488 B1 | 8/2011 | Lam |
| 8,009,144 B2 | 8/2011 | Yajima |
| 8,140,996 B2 | 3/2012 | Tomkins |
| 8,209,606 B2 | 6/2012 | Ording |
| 8,255,798 B2 | 8/2012 | Ording |
| 8,307,306 B2 | 11/2012 | Komatsu |
| 8,311,727 B2 | 11/2012 | Eckstein et al. |
| 8,312,371 B2 | 11/2012 | Ording |
| 8,570,277 B2 | 10/2013 | Rekimoto |
| 8,661,363 B2 | 2/2014 | Platzer et al. |
| 8,677,283 B2 | 3/2014 | Fong |
| 8,686,944 B1 | 4/2014 | Charlton et al. |
| 8,717,302 B1 | 5/2014 | Qin et al. |
| 8,799,816 B2 | 8/2014 | Wells et al. |
| 8,824,245 B2 | 9/2014 | Lau et al. |
| 9,007,057 B2 | 4/2015 | Villaret |
| 9,037,995 B2 | 5/2015 | Platzer et al. |
| 9,052,814 B2 | 6/2015 | Ording |
| 9,104,705 B2 | 8/2015 | Fujinaga |
| 9,183,661 B2 | 11/2015 | Platzer et al. |
| 9,378,577 B2 | 6/2016 | Platzer et al. |
| 9,395,867 B2 | 7/2016 | Griffin et al. |
| 9,395,905 B2 | 7/2016 | Wherry |
| 9,442,649 B2 | 9/2016 | Davis et al. |
| 9,448,712 B2 | 9/2016 | Platzer et al. |
| 9,600,352 B2 | 3/2017 | Platzer |
| 9,760,272 B2 | 9/2017 | Platzer et al. |
| 2001/0004337 A1 | 6/2001 | Paratte |
| 2001/0011991 A1 | 8/2001 | Wang et al. |
| 2001/0028369 A1 | 10/2001 | Gallo et al. |
| 2001/0045949 A1 | 11/2001 | Chithambaram et al. |
| 2002/0015024 A1 | 2/2002 | Westerman et al. |
| 2002/0019296 A1 | 2/2002 | Freeman et al. |
| 2002/0027547 A1 | 3/2002 | Kamijo et al. |
| 2002/0030665 A1 | 3/2002 | Ano |
| 2002/0030668 A1 | 3/2002 | Hoshino et al. |
| 2002/0036618 A1 | 3/2002 | Wakai et al. |
| 2002/0036623 A1 | 3/2002 | Kano |
| 2002/0067346 A1 | 6/2002 | Mouton |
| 2002/0101458 A1 | 8/2002 | Sangiovanni |
| 2002/0118169 A1 | 8/2002 | Hinckley et al. |
| 2002/0154150 A1 | 10/2002 | Ogaki et al. |
| 2002/0154175 A1 | 10/2002 | Abello et al. |
| 2002/0180763 A1 | 12/2002 | Kung |
| 2002/0186621 A1 | 12/2002 | Lai |
| 2002/0189763 A1 | 12/2002 | Kwon et al. |
| 2002/0194589 A1 | 12/2002 | Cristofalo et al. |
| 2003/0025673 A1 | 2/2003 | Ledbetter et al. |
| 2003/0076301 A1 | 4/2003 | Tsuk et al. |
| 2003/0095096 A1 | 5/2003 | Robbin et al. |
| 2003/0095135 A1 | 5/2003 | Kaasila et al. |
| 2003/0095697 A1 | 5/2003 | Wood et al. |
| 2003/0115384 A1 | 6/2003 | Sonehara et al. |
| 2003/0122787 A1 | 7/2003 | Zimmerman et al. |
| 2003/0123329 A1 | 7/2003 | Guanter et al. |
| 2003/0132959 A1 | 7/2003 | Simister et al. |
| 2003/0142081 A1 | 7/2003 | Iizuka et al. |
| 2003/0152203 A1 | 8/2003 | Berger et al. |
| 2003/0160832 A1 | 8/2003 | Ridgley et al. |
| 2003/0174149 A1 | 9/2003 | Fujisaki et al. |
| 2003/0179239 A1 | 9/2003 | Lira |
| 2003/0184525 A1 | 10/2003 | Tsai |
| 2003/0210286 A1 | 11/2003 | Gerpheide et al. |
| 2003/0231168 A1 | 12/2003 | Bell et al. |
| 2004/0013042 A1 | 1/2004 | Farine |
| 2004/0021676 A1 | 2/2004 | Chen et al. |
| 2004/0021698 A1 | 2/2004 | Baldwin et al. |
| 2004/0027398 A1 | 2/2004 | Jaeger |
| 2004/0034801 A1 | 2/2004 | Jaeger |
| 2004/0047244 A1 | 3/2004 | Iino et al. |
| 2004/0056880 A1 | 3/2004 | Matsuoka et al. |
| 2004/0080541 A1 | 4/2004 | Saiga et al. |
| 2004/0085328 A1 | 5/2004 | Maruyama et al. |
| 2004/0100479 A1* | 5/2004 | Nakano .......... G06F 3/0362 715/700 |
| 2004/0113819 A1 | 6/2004 | Gauthey et al. |
| 2004/0125088 A1 | 7/2004 | Zimmerman et al. |
| 2004/0130580 A1 | 7/2004 | Howard et al. |
| 2004/0145595 A1 | 7/2004 | Bennett |
| 2004/0150621 A1 | 8/2004 | Bohn |
| 2004/0155888 A1 | 8/2004 | Padgitt et al. |
| 2004/0155907 A1 | 8/2004 | Yamaguchi et al. |
| 2004/0160419 A1 | 8/2004 | Padgitt |
| 2004/0160458 A1 | 8/2004 | Igarashi et al. |
| 2004/0167919 A1 | 8/2004 | Sterling et al. |
| 2004/0170270 A1 | 9/2004 | Takashima et al. |
| 2004/0205504 A1 | 10/2004 | Phillips |
| 2004/0205624 A1 | 10/2004 | Lui et al. |
| 2004/0215643 A1 | 10/2004 | Brechner et al. |
| 2004/0218472 A1 | 11/2004 | Narayanaswami et al. |
| 2004/0222992 A1 | 11/2004 | Calkins et al. |
| 2004/0224638 A1 | 11/2004 | Fadell et al. |

(56) References Cited

U.S. PATENT DOCUMENTS

| | | |
|---|---|---|
| 2004/0225613 A1 | 11/2004 | Narayanaswami et al. |
| 2004/0252119 A1* | 12/2004 | Hunleth .............. G06F 16/40 345/440 |
| 2004/0263486 A1 | 12/2004 | Seni |
| 2005/0001815 A1 | 1/2005 | Tsunoda |
| 2005/0007884 A1 | 1/2005 | Lorenzato |
| 2005/0012723 A1* | 1/2005 | Pallakoff .............. G06F 1/1618 345/173 |
| 2005/0017957 A1 | 1/2005 | Yi |
| 2005/0026521 A1 | 2/2005 | Brasier |
| 2005/0041385 A1 | 2/2005 | Kikinis et al. |
| 2005/0057524 A1 | 3/2005 | Hill et al. |
| 2005/0062729 A1 | 3/2005 | Hinckley et al. |
| 2005/0081164 A1 | 4/2005 | Hama et al. |
| 2005/0088418 A1 | 4/2005 | Nguyen |
| 2005/0088443 A1 | 4/2005 | Blanco et al. |
| 2005/0097466 A1 | 5/2005 | Levi Montalcini |
| 2005/0099400 A1* | 5/2005 | Lee .............. G06F 3/04883 345/173 |
| 2005/0116941 A1 | 6/2005 | Wallington |
| 2005/0122806 A1 | 6/2005 | Arakawa et al. |
| 2005/0145807 A1 | 7/2005 | Lapstun et al. |
| 2005/0168353 A1 | 8/2005 | Dement et al. |
| 2005/0168488 A1 | 8/2005 | Montague |
| 2005/0168566 A1 | 8/2005 | Tada et al. |
| 2005/0183026 A1 | 8/2005 | Amano et al. |
| 2005/0193015 A1 | 9/2005 | Logston et al. |
| 2005/0195154 A1 | 9/2005 | Robbins et al. |
| 2005/0195216 A1 | 9/2005 | Kramer et al. |
| 2005/0195373 A1 | 9/2005 | Feigel et al. |
| 2005/0198588 A1 | 9/2005 | Lin et al. |
| 2005/0209051 A1 | 9/2005 | Santomassimo et al. |
| 2005/0215848 A1 | 9/2005 | Lorenzato |
| 2005/0237308 A1 | 10/2005 | Autio et al. |
| 2005/0259077 A1 | 11/2005 | Adams et al. |
| 2005/0270269 A1 | 12/2005 | Tokkonen |
| 2005/0275618 A1 | 12/2005 | Juh et al. |
| 2005/0275636 A1* | 12/2005 | Dehlin .............. G09G 5/14 345/173 |
| 2006/0001652 A1 | 1/2006 | Chiu et al. |
| 2006/0007129 A1 | 1/2006 | Pletikosa |
| 2006/0010400 A1 | 1/2006 | Dehlin et al. |
| 2006/0020904 A1 | 1/2006 | Aaltonen et al. |
| 2006/0025218 A1 | 2/2006 | Hotta |
| 2006/0026521 A1 | 2/2006 | Hotelling et al. |
| 2006/0028455 A1 | 2/2006 | Hinckley et al. |
| 2006/0038796 A1 | 2/2006 | Hinckley et al. |
| 2006/0048073 A1 | 3/2006 | Jarrett et al. |
| 2006/0055669 A1 | 3/2006 | Das |
| 2006/0061551 A1 | 3/2006 | Fateh |
| 2006/0077544 A1 | 4/2006 | Stark |
| 2006/0082549 A1 | 4/2006 | Hoshino et al. |
| 2006/0084852 A1 | 4/2006 | Mason et al. |
| 2006/0085764 A1 | 4/2006 | Klementiev |
| 2006/0092177 A1 | 5/2006 | Blasko |
| 2006/0094502 A1 | 5/2006 | Katayama et al. |
| 2006/0097991 A1 | 5/2006 | Hotelling et al. |
| 2006/0101354 A1 | 5/2006 | Hashimoto et al. |
| 2006/0112335 A1 | 5/2006 | Hofmeister et al. |
| 2006/0112350 A1 | 5/2006 | Kato |
| 2006/0136631 A1 | 6/2006 | Eid et al. |
| 2006/0139375 A1 | 6/2006 | Rasmussen et al. |
| 2006/0152480 A1 | 7/2006 | Senn |
| 2006/0156249 A1 | 7/2006 | Blythe et al. |
| 2006/0181506 A1 | 8/2006 | Fyke |
| 2006/0181510 A1 | 8/2006 | Faith |
| 2006/0187215 A1 | 8/2006 | Rosenberg et al. |
| 2006/0190833 A1 | 8/2006 | Sangiovanni et al. |
| 2006/0197753 A1 | 9/2006 | Hotelling |
| 2006/0236263 A1 | 10/2006 | Bathiche et al. |
| 2006/0238495 A1 | 10/2006 | Davis |
| 2006/0242607 A1 | 10/2006 | Hudson |
| 2006/0250358 A1 | 11/2006 | Wroblewski |
| 2006/0268020 A1 | 11/2006 | Han |
| 2006/0271870 A1* | 11/2006 | Anwar .............. G06F 3/0481 715/764 |
| 2006/0274053 A1 | 12/2006 | Kinouchi |
| 2006/0277454 A1 | 12/2006 | Chen |
| 2006/0279533 A1 | 12/2006 | Hsieh |
| 2006/0288313 A1 | 12/2006 | Hillis |
| 2006/0290671 A1 | 12/2006 | Bohn et al. |
| 2007/0008066 A1 | 1/2007 | Fukuda |
| 2007/0024646 A1 | 2/2007 | Saarinen et al. |
| 2007/0028191 A1 | 2/2007 | Tsuji |
| 2007/0028856 A1 | 2/2007 | Ma |
| 2007/0035513 A1 | 2/2007 | Sherrard et al. |
| 2007/0046635 A1 | 3/2007 | Nishiyama et al. |
| 2007/0046646 A1 | 3/2007 | Kwon et al. |
| 2007/0050732 A1 | 3/2007 | Chapman et al. |
| 2007/0055967 A1 | 3/2007 | Poff et al. |
| 2007/0063995 A1 | 3/2007 | Bailey et al. |
| 2007/0064004 A1 | 3/2007 | Bonner et al. |
| 2007/0067745 A1 | 3/2007 | Choi et al. |
| 2007/0075965 A1 | 4/2007 | Huppi et al. |
| 2007/0081726 A1 | 4/2007 | Westerman et al. |
| 2007/0087775 A1 | 4/2007 | Richardson et al. |
| 2007/0097151 A1 | 5/2007 | Rosenberg |
| 2007/0109275 A1 | 5/2007 | Chuang |
| 2007/0109277 A1 | 5/2007 | Lira |
| 2007/0120819 A1 | 5/2007 | Young et al. |
| 2007/0120835 A1 | 5/2007 | Sato |
| 2007/0132789 A1 | 6/2007 | Ording et al. |
| 2007/0137076 A1 | 6/2007 | Cowden, III |
| 2007/0146318 A1 | 6/2007 | Juh et al. |
| 2007/0146337 A1 | 6/2007 | Ording et al. |
| 2007/0149252 A1 | 6/2007 | Jobs et al. |
| 2007/0150826 A1 | 6/2007 | Anzures et al. |
| 2007/0150842 A1 | 6/2007 | Chaudhri et al. |
| 2007/0152978 A1 | 7/2007 | Kocienda et al. |
| 2007/0152979 A1 | 7/2007 | Jobs et al. |
| 2007/0152984 A1 | 7/2007 | Ording et al. |
| 2007/0155434 A1 | 7/2007 | Jobs et al. |
| 2007/0156364 A1 | 7/2007 | Rothkopf |
| 2007/0157089 A1 | 7/2007 | Van os et al. |
| 2007/0157094 A1 | 7/2007 | Lemay et al. |
| 2007/0182743 A1 | 8/2007 | Aguera Y Arcas |
| 2007/0185876 A1 | 8/2007 | Mendis et al. |
| 2007/0188518 A1 | 8/2007 | Vale et al. |
| 2007/0192692 A1 | 8/2007 | Chen et al. |
| 2007/0211042 A1 | 9/2007 | Kim et al. |
| 2007/0226646 A1 | 9/2007 | Nagiyama et al. |
| 2007/0229458 A1 | 10/2007 | Moon |
| 2007/0242569 A1 | 10/2007 | Inoue et al. |
| 2007/0252821 A1 | 11/2007 | Hollemans et al. |
| 2007/0256026 A1 | 11/2007 | Klassen et al. |
| 2007/0262964 A1 | 11/2007 | Zotov et al. |
| 2007/0277124 A1 | 11/2007 | Shin et al. |
| 2007/0279401 A1 | 12/2007 | Ramstein et al. |
| 2007/0290045 A1 | 12/2007 | Cisar |
| 2007/0296711 A1 | 12/2007 | Yee et al. |
| 2008/0001915 A1 | 1/2008 | Pihlaja et al. |
| 2008/0004084 A1 | 1/2008 | Park |
| 2008/0005703 A1 | 1/2008 | Radivojevic et al. |
| 2008/0013826 A1 | 1/2008 | Hillis et al. |
| 2008/0016096 A1 | 1/2008 | Wilding et al. |
| 2008/0034029 A1 | 2/2008 | Fang et al. |
| 2008/0048978 A1 | 2/2008 | Trent et al. |
| 2008/0052945 A1 | 3/2008 | Matas et al. |
| 2008/0062207 A1 | 3/2008 | Park |
| 2008/0094369 A1 | 4/2008 | Ganatra et al. |
| 2008/0104544 A1 | 5/2008 | Collins et al. |
| 2008/0123473 A1 | 5/2008 | Ozawa et al. |
| 2008/0155475 A1 | 6/2008 | Duhig |
| 2008/0163132 A1 | 7/2008 | Lee et al. |
| 2008/0168382 A1 | 7/2008 | Louch et al. |
| 2008/0168384 A1 | 7/2008 | Platzer et al. |
| 2008/0168395 A1 | 7/2008 | Ording et al. |
| 2008/0168404 A1 | 7/2008 | Ording |
| 2008/0204478 A1 | 8/2008 | Hung |
| 2008/0231610 A1 | 9/2008 | Hotelling et al. |
| 2008/0257701 A1 | 10/2008 | Wlotzka |
| 2008/0284799 A1 | 11/2008 | Hollemans et al. |
| 2008/0288880 A1 | 11/2008 | Reponen et al. |

(56) References Cited

U.S. PATENT DOCUMENTS

| | | |
|---|---|---|
| 2009/0049385 A1 | 2/2009 | Blinnikka et al. |
| 2009/0050465 A1 | 2/2009 | Asada |
| 2009/0051649 A1 | 2/2009 | Rondel |
| 2009/0059730 A1 | 3/2009 | Lyons et al. |
| 2009/0070705 A1 | 3/2009 | Ording |
| 2009/0079698 A1 | 3/2009 | Takashima et al. |
| 2009/0109069 A1 | 4/2009 | Takasaki et al. |
| 2009/0143117 A1 | 6/2009 | Shin et al. |
| 2009/0152452 A1 | 6/2009 | Lee et al. |
| 2009/0156255 A1 | 6/2009 | Shin et al. |
| 2009/0196124 A1 | 8/2009 | Mooring |
| 2009/0199130 A1 | 8/2009 | Tsern et al. |
| 2009/0213086 A1 | 8/2009 | Chae et al. |
| 2009/0231271 A1 | 9/2009 | Heubel et al. |
| 2009/0244020 A1 | 10/2009 | Sjolin |
| 2009/0249252 A1 | 10/2009 | Lundy et al. |
| 2009/0259969 A1 | 10/2009 | Pallakoff |
| 2009/0284478 A1 | 11/2009 | De la torre baltierra et al. |
| 2009/0288039 A1 | 11/2009 | Mail et al. |
| 2009/0307623 A1 | 12/2009 | Agarawala et al. |
| 2009/0325563 A1 | 12/2009 | Horodezky et al. |
| 2010/0029327 A1 | 2/2010 | Jee |
| 2010/0058223 A1 | 3/2010 | Price et al. |
| 2010/0058226 A1 | 3/2010 | Flake et al. |
| 2010/0083082 A1 | 4/2010 | Lehrian et al. |
| 2010/0128570 A1 | 5/2010 | Smith et al. |
| 2010/0172624 A1 | 7/2010 | Watts |
| 2010/0173678 A1 | 7/2010 | Kim et al. |
| 2010/0187074 A1 | 7/2010 | Manni |
| 2010/0220562 A1 | 9/2010 | Hozumi et al. |
| 2010/0248778 A1 | 9/2010 | Biswas |
| 2010/0259481 A1 | 10/2010 | Oh |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0277126 A1 | 11/2010 | Naeimi et al. |
| 2010/0325575 A1 | 12/2010 | Platzer et al. |
| 2010/0331145 A1 | 12/2010 | Lakovic et al. |
| 2011/0004830 A1 | 1/2011 | Von kaenel et al. |
| 2011/0006980 A1 | 1/2011 | Taniguchi et al. |
| 2011/0014956 A1 | 1/2011 | Lee et al. |
| 2011/0025311 A1 | 2/2011 | Chauvin et al. |
| 2011/0037725 A1 | 2/2011 | Pryor |
| 2011/0055752 A1 | 3/2011 | Rubinstein et al. |
| 2011/0057886 A1 | 3/2011 | Ng et al. |
| 2011/0078025 A1 | 3/2011 | Shrivastav |
| 2011/0090255 A1 | 4/2011 | Wilson et al. |
| 2011/0093812 A1 | 4/2011 | Fong |
| 2011/0099481 A1 | 4/2011 | Bitonti et al. |
| 2011/0131494 A1 | 6/2011 | Ono et al. |
| 2011/0131531 A1 | 6/2011 | Russell et al. |
| 2011/0167262 A1 | 7/2011 | Ross et al. |
| 2011/0187355 A1 | 8/2011 | Dixon et al. |
| 2011/0224967 A1 | 9/2011 | Van Schaik |
| 2011/0252357 A1 | 10/2011 | Chaudhri |
| 2011/0252369 A1 | 10/2011 | Chaudhri |
| 2011/0270833 A1 | 11/2011 | von Kaenel et al. |
| 2011/0296312 A1 | 12/2011 | Boyer et al. |
| 2011/0298830 A1 | 12/2011 | Lam |
| 2012/0026198 A1 | 2/2012 | Maesaka |
| 2012/0044267 A1 | 2/2012 | Fino |
| 2012/0054670 A1 | 3/2012 | Rainisto |
| 2012/0056840 A1* | 3/2012 | Benko ............... G06F 3/04812 345/173 |
| 2012/0092383 A1 | 4/2012 | Hysek et al. |
| 2012/0099406 A1 | 4/2012 | Lau et al. |
| 2012/0105484 A1 | 5/2012 | Cui |
| 2012/0174005 A1 | 7/2012 | Deutsch et al. |
| 2012/0186951 A1 | 7/2012 | Wu et al. |
| 2012/0200689 A1 | 8/2012 | Friedman et al. |
| 2012/0223971 A1 | 9/2012 | Hillis |
| 2012/0272181 A1 | 10/2012 | Rogers et al. |
| 2012/0324380 A1 | 12/2012 | Nurmi et al. |
| 2012/0324390 A1 | 12/2012 | Tao |
| 2013/0067390 A1 | 3/2013 | Kwiatkowski et al. |
| 2013/0120301 A1 | 5/2013 | Lira |
| 2013/0142016 A1 | 6/2013 | Pozzo di borgo et al. |
| 2013/0169579 A1 | 7/2013 | Havnor |
| 2013/0176020 A1 | 7/2013 | Chauvin et al. |
| 2013/0205939 A1 | 8/2013 | Meerovitsch |
| 2013/0218517 A1 | 8/2013 | Ausserlechner |
| 2013/0258819 A1 | 10/2013 | Hoover |
| 2013/0303087 A1 | 11/2013 | Hauser et al. |
| 2014/0028688 A1 | 1/2014 | Houjou et al. |
| 2014/0074717 A1 | 3/2014 | Evans |
| 2014/0132640 A1 | 5/2014 | Sharma et al. |
| 2014/0137020 A1 | 5/2014 | Sharma et al. |
| 2014/0181730 A1 | 6/2014 | Briand |
| 2014/0253487 A1 | 9/2014 | Bezinge et al. |
| 2014/0260776 A1 | 9/2014 | Burleson |
| 2014/0306989 A1 | 10/2014 | Doubleday et al. |
| 2014/0347289 A1 | 11/2014 | Suh et al. |
| 2015/0039494 A1 | 2/2015 | Sinton et al. |
| 2015/0121405 A1 | 4/2015 | Ekselius et al. |
| 2015/0234562 A1 | 8/2015 | Ording |
| 2015/0277559 A1 | 10/2015 | Vescovi et al. |
| 2015/0370529 A1 | 12/2015 | Zambetti et al. |
| 2016/0034133 A1 | 2/2016 | Wilson et al. |
| 2016/0034166 A1 | 2/2016 | Wilson et al. |
| 2016/0034167 A1 | 2/2016 | Wilson et al. |
| 2016/0062466 A1 | 3/2016 | Moussette et al. |
| 2016/0063828 A1 | 3/2016 | Moussette et al. |
| 2016/0098016 A1 | 4/2016 | Ely et al. |
| 2016/0170598 A1 | 6/2016 | Zambetti et al. |
| 2016/0170625 A1 | 6/2016 | Zambetti et al. |
| 2016/0202865 A1 | 7/2016 | Dakin et al. |
| 2016/0202866 A1 | 7/2016 | Zambetti et al. |
| 2016/0209939 A1 | 7/2016 | Zambetti et al. |
| 2016/0259535 A1 | 9/2016 | Fleizach et al. |
| 2016/0269540 A1 | 9/2016 | Butcher et al. |
| 2017/0102850 A1 | 4/2017 | Platzer et al. |
| 2017/0212674 A1 | 7/2017 | Ording |
| 2018/0011616 A1 | 1/2018 | Platzer et al. |
| 2020/0110522 A1 | 4/2020 | Zambetti et al. |
| 2020/0257424 A1 | 8/2020 | Platzer et al. |

FOREIGN PATENT DOCUMENTS

| | | |
|---|---|---|
| AU | 2009208103 A1 | 9/2009 |
| CN | 1330310 A | 1/2002 |
| CN | 1695105 A | 11/2005 |
| CN | 1754141 A | 3/2006 |
| CN | 1757011 A | 4/2006 |
| CN | 1975652 A | 6/2007 |
| CN | 101431545 A | 5/2009 |
| CN | 101446802 A | 6/2009 |
| CN | 101241407 B | 7/2011 |
| CN | 101034328 B | 2/2013 |
| DE | 102008052485 A1 | 4/2010 |
| EP | 0493128 A2 | 7/1992 |
| EP | 0626635 A2 | 11/1994 |
| EP | 0635779 A1 | 1/1995 |
| EP | 0701220 A1 | 3/1996 |
| EP | 0725331 A1 | 8/1996 |
| EP | 0880091 A2 | 11/1998 |
| EP | 0944218 A1 | 9/1999 |
| EP | 1486860 A1 | 12/2004 |
| EP | 1517228 A2 | 3/2005 |
| EP | 2069877 A2 | 6/2009 |
| EP | 2102738 A1 | 9/2009 |
| EP | 2224317 A1 | 9/2010 |
| EP | 3076277 B1 | 3/2019 |
| FR | 2830093 A3 | 3/2003 |
| GB | 1517521 A | 7/1978 |
| GB | 2319591 A | 5/1998 |
| GB | 2335105 A | 9/1999 |
| GB | 2373778 A | 10/2002 |
| JP | 63-146168 A | 6/1988 |
| JP | 63-206827 A | 8/1988 |
| JP | 2-140822 A | 5/1990 |
| JP | 3-271976 A | 12/1991 |
| JP | 5-100809 A | 4/1993 |
| JP | 7-182134 A | 7/1995 |
| JP | 7-230352 A | 8/1995 |

(56) References Cited

FOREIGN PATENT DOCUMENTS

| | | |
|---|---|---|
| JP | 8-202281 A | 8/1996 |
| JP | 8-249114 A | 9/1996 |
| JP | 9-152856 A | 6/1997 |
| JP | 9-160713 A | 6/1997 |
| JP | 9-237175 A | 9/1997 |
| JP | 10-161628 A | 6/1998 |
| JP | 10-240220 A | 9/1998 |
| JP | 11-126149 A | 5/1999 |
| JP | 11-327733 A | 11/1999 |
| JP | 2000-163031 A | 6/2000 |
| JP | 2000-163193 A | 6/2000 |
| JP | 2000-181428 A | 6/2000 |
| JP | 2000-320271 A | 11/2000 |
| JP | 2000-322495 A | 11/2000 |
| JP | 2000-333044 A | 11/2000 |
| JP | 2001-202178 A | 7/2001 |
| JP | 2001-202181 A | 7/2001 |
| JP | 2001-290585 A | 10/2001 |
| JP | 2001-318665 A | 11/2001 |
| JP | 2002-254614 A | 9/2002 |
| JP | 2002-323850 A | 11/2002 |
| JP | 2002-342033 A | 11/2002 |
| JP | 2002-373312 A | 12/2002 |
| JP | 2003-108279 A | 4/2003 |
| JP | 2003-140802 A | 5/2003 |
| JP | 2003-248544 A | 9/2003 |
| JP | 2003-288151 A | 10/2003 |
| JP | 2003-330586 A | 11/2003 |
| JP | 2003-330613 A | 11/2003 |
| JP | 2003-344059 A | 12/2003 |
| JP | 2003-345491 A | 12/2003 |
| JP | 2004-310388 A | 11/2004 |
| JP | 2005-108211 A | 4/2005 |
| JP | 2005-515530 A | 5/2005 |
| JP | 2005-234199 A | 9/2005 |
| JP | 2005-267631 A | 9/2005 |
| JP | 2005-284726 A | 10/2005 |
| JP | 2006-11862 A | 1/2006 |
| JP | 2006-90962 A | 4/2006 |
| JP | 2006-154892 A | 6/2006 |
| JP | 2006-179006 A | 7/2006 |
| JP | 2006-244353 A | 9/2006 |
| JP | 2008-508601 A | 3/2008 |
| JP | 2009-59382 A | 3/2009 |
| JP | 2009-128296 A | 6/2009 |
| JP | 2010-515978 A | 5/2010 |
| JP | 2012-27797 A | 2/2012 |
| JP | 2014-222527 A | 11/2014 |
| KR | 10-2001-0040410 A | 5/2001 |
| KR | 2002-0038177 A | 5/2002 |
| KR | 2002-0081953 A | 10/2002 |
| KR | 2002-0095992 A | 12/2002 |
| KR | 2003-0016313 A | 2/2003 |
| KR | 10-2003-0088374 A | 11/2003 |
| KR | 10-2004-0050051 A | 6/2004 |
| KR | 10-2004-0107472 A | 12/2004 |
| KR | 10-2006-0014874 A | 2/2006 |
| KR | 10-2006-0085850 A | 7/2006 |
| KR | 10-2007-0024702 A | 3/2007 |
| KR | 10-2013-0027017 A | 3/2013 |
| TW | D122820 S | 5/2008 |
| WO | 1994/29788 A1 | 12/1994 |
| WO | 1996/19872 A1 | 6/1996 |
| WO | 1998/06054 A1 | 2/1998 |
| WO | 1998/07112 A2 | 2/1998 |
| WO | 1999/28812 A1 | 6/1999 |
| WO | 1999/38149 A1 | 7/1999 |
| WO | 1999/57630 A1 | 11/1999 |
| WO | 2001/29702 A2 | 4/2001 |
| WO | 2001/77792 A2 | 10/2001 |
| WO | 2002/01338 A1 | 1/2002 |
| WO | 2002/08881 A2 | 1/2002 |
| WO | 2002/21338 A2 | 3/2002 |
| WO | 2003/023593 A1 | 3/2003 |
| WO | 2003/060622 A2 | 7/2003 |
| WO | 2003/081458 A1 | 10/2003 |
| WO | 2004/001560 A1 | 12/2003 |
| WO | 2005/052773 A2 | 6/2005 |
| WO | 2006/003591 A2 | 1/2006 |
| WO | 2006/020305 A2 | 2/2006 |
| WO | 2006/037545 A2 | 4/2006 |
| WO | 2006/045530 A2 | 5/2006 |
| WO | 2008/030563 A2 | 3/2008 |
| WO | 2008/085848 A1 | 7/2008 |
| WO | 2008/086218 A2 | 7/2008 |
| WO | 2011/045805 A1 | 4/2011 |
| WO | 2011/126502 A1 | 10/2011 |

OTHER PUBLICATIONS

Applicant Initiated Interview Summary received for U.S. Appl. No. 14/913,345, dated Nov. 4, 2019, 5 pages.
Board Opinion received for Chinese Patent Application No. 200880001827.7, dated Apr. 9, 2015, 11 pages (5 pages of English Translation and 6 pages of Official Copy).
Corcoran, "Sticky-Kit", Available at: <http://leafo.net/sticky-kit/>, Dec. 5, 2013, 6 pages.
Corrected Notice of Allowance received for U.S. Appl. No. 15/665,167, dated Aug. 19, 2019, 2 pages.
Corrected Notice of Allowance received for U.S. Appl. No. 15/665,167, dated Oct. 1, 2019, 2 pages.
Coyier, Chris, "Scroll-Then-Fix-Content", Available at: <https://css-tricks.com/scroll-fix-content/>, Sep. 17, 2014, 16 pages.
Decision on Appeal received for Korean Patent Application No. 10-2016-7008474, mailed on Jan. 29, 2020, 21 pages (2 pages of English Translation and 19 pages of Official Copy).
Decision on Request for Rehearing received for U.S. Appl. No. 90/012,332, mailed on Aug. 29, 2019, 16 pages.
Decision to Grant received for European Patent Application No. 08712964.9, dated Apr. 13, 2017, 2 pages.
Decision to Grant received for European Patent Application No. 17165715.8, dated Feb. 14, 2019, 2 pages.
Examiner's Answer to Appeal Brief received for U.S. Appl. No. 14/871,816, mailed on May 2, 2019, 9 pages.
Ex-parte Reexamination Non-Final Communication received for U.S. Appl. No. 90/012,332, mailed on Dec. 19, 2012, 38 pages.
Extended European Search Report received for European Patent Application No. 19154558.1, dated Aug. 16, 2019, 8 pages.
Extended Search Report received for European Patent Application 17165715.8, dated Nov. 29, 2017, 5 pages.
Fitzpatrick, Jason, "Make the Most of Your Multiple Monitors in Windows", Online Available at: https://lifehacker.com/5526025/make-the-most-of-your-multiple-monitors-in-windows-7, Mar. 21, 2014, 11 pages.
Intention to Grant received for European Patent Application 17165715.8, dated Sep. 26, 2018, 7 pages.
Intention to Grant received for European Patent Application No. 08712964.9, dated Nov. 30, 2016, 7 pages.
Intention to Grant received for European Patent Application No. 14772494.2, dated Mar. 16, 2020, 10 pages.
International Preliminary Report on Patentability received for PCT Patent Application No. PCT/US2005/000089, dated Jun. 18, 2008, 5 pages.
International Search Report and Written Opinion received for PCT Patent Application No. PCT/US2005/000089, dated May 31, 2005, 7 pages.
Non-Final Office Action received for U.S. Appl. No. 14/712,637, dated Sep. 23, 2015, 10 pages.
Non-Final Office Action received for U.S. Appl. No. 14/871,816, dated Nov. 20, 2017, 46 pages.
Non-Final Office Action received for U.S. Appl. No. 11/620,717, dated Dec. 29, 2009, 8 pages.
Non-Final Office Action received for U.S. Appl. No. 11/620,717, dated Jul. 8, 2009, 6 pages.
Non-Final Office Action received for U.S. Appl. No. 12/869,182, dated Jun. 20, 2012, 6 pages.
Non-Final Office Action received for U.S. Appl. No. 12/869,182, dated Oct. 24, 2011, 7 pages.

(56) References Cited

OTHER PUBLICATIONS

Non-Final Office Action received for U.S. Appl. No. 14/189,922, dated Sep. 24, 2014, 7 pages.
Non-Final Office Action received for U.S. Appl. No. 14/871,816, dated Jul. 30, 2018, 46 pages.
Non-Final Office Action received for U.S. Appl. No. 15/269,582, dated Jan. 26, 2017, 5 pages.
Non-Final Office Action received for U.S. Appl. No. 15/665,167, dated Apr. 3, 2019, 5 pages.
Notice of Allowance received for Chinese Patent Application No. 201310073437.3, dated May 10, 2016, 4 pages (2 pages of English Translation and 2 pages of Official Copy).
Notice of Allowance received for U.S. Appl. No. 14/712,637, dated May 12, 2016, 10 pages.
Notice of Allowance received for U.S. Appl. No. 11/620,717, dated Jul. 20, 2010, 11 pages.
Notice of Allowance received for U.S. Appl. No. 12/869,182, dated Dec. 12, 2012, 5 pages.
Notice of Allowance received for U.S. Appl. No. 12/869,182, dated Feb. 23, 2012, 5 pages.
Notice of Allowance received for U.S. Appl. No. 13/867,950, dated Nov. 15, 2013, 7 pages.
Notice of Allowance received for U.S. Appl. No. 14/189,922, dated Apr. 7, 2015, 6 pages.
Notice of Allowance received for U.S. Appl. No. 14/712,637, dated Jun. 28, 2016, 2 pages.
Notice of Allowance received for U.S. Appl. No. 14/913,345, dated Feb. 10, 2020, 10 pages.
Notice of Allowance received for U.S. Appl. No. 15/269,582, dated May 5, 2017, 13 pages.
Notice of Allowance received for U.S. Appl. No. 15/665,167, dated Jul. 18, 2019, 13 pages.
Notice of Intent to Issue Ex Parte Reexamination Certificate received for U.S. Appl. No. 90/012,332, mailed on Feb. 14, 2020, 7 pages.
Office Action received for Chinese Patent Application No. 201310073437.3, dated Sep. 2, 2015, 18 pages (10 pages of English Translation and 8 pages of Official Copy).
Office Action received for Chinese Patent Application No. 201610079785.5, dated Jun. 13, 2019, 11 pages (5 pages of English Translation and 6 pages of Official Copy).
Office Action received for Chinese Patent Application No. 201610079785.5, dated Mar. 5, 2020, 6 pages (3 pages of English Translation and 3 pages of Official Copy).
Office Action received for Chinese Patent Application No. 201610079785.5, dated May 31, 2018, 13 pages (5 pages of English Translation and 8 pages of Official Copy).
Office Action received for European Patent Application No. 08712964.9, dated Jan. 20, 2015, 8 pages.
Office Action received for Indian Patent Application No. 201617008291, dated Jan. 14, 2020, 7 pages.
Office Action received for Korean Patent Application No. 10-2019-7028736, dated Nov. 28, 2019, 8 pages (3 pages of English Translation and 5 pages of Official Copy).
Rubine, Dean Harris., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Summon to attend Oral Proceedings received for European Patent Application No. 08712964.9, mailed on May 12, 2016, 6 pages.
"A truly Inventive Invention", Dec. 23, 2014, 4 pages.
Advisory Action received for U.S. Appl. No. 14/624,518, dated Sep. 27, 2016, 3 pages.
"Affidavit of Benjamin Bederson", Feb. 9, 2012.
Agarawala, A., "Enriching the Desktop Metaphor with Physics", Piles and Pen, 2006, pp. 10-101.
Agarawala, et al., "Keepin' It Real: Pushing the Desktop Metaphor with Physics", Piles and the Pen, CHI 2006 Proceedings of the SIGCHI Conference on Human Factors in Computing Systems, Montreal, Québec, Canada, Apr. 22-27, 2006, pp. 1283-1292.

*Apple Inc. v. Samsung Electronics Co. Ltd., et al.*, Nos. ZAII-730 and ZAII-731 (Netherlands), Judgment dated Aug. 23, 2011.
*Apple Inc. v. Samsung Electronics Co. Ltd., et al.*, No. ZA12-220 (Netherlands), Judgment dated Nov. 28, 2012.
*Apple Inc. v. Samsung Electronics Co. Ltd., et al.*, No. ZA12-220 (Netherlands), Judgment dated Nov. 28, 2012. (Convenience English Translation).
*Apple Inc. v. Samsung Electronics Co.*, Case No. 11-cv-01846 (N.D. Cal.), Apple's Opening Claim Construction Brief Pursuant to Patent L.R. 4-5, Dec. 8, 2011, pp. 6-8.
*Apple Inc. v. Samsung Electronics Co.*, Case No. 11-cv-01846 (N.D. Cal.), Apple's Reply Claim Construction Brief Pursuant to Patent L.R. 4-5, Dec. 29, 2011, pp. 3-5.
*Apple Inc. v. Samsung Electronics Co.*, Case No. 11-cv-01846 (N.D. Cal.), Declaration of Benjamin Bederson, Aug. 20, 2011.
*Apple Inc. v. Samsung Electronics Co.*, Case No. 11-cv-01846 (N.D. Cal.), declaration of Ravin Balakrishnan in support of Apple's motion for a preliminary injunction, filed Jul. 1, 2011.
*Apple Inc. v. Samsung Electronics Co.*, Case No. 11-cv-01846 (N.D. Cal.), declaration of Ravin Balakrishnan in support of Apple's opposition to MSJ.
*Apple Inc. v. Samsung Electronics Co.*, Case No. 11-cv-01846 (N.D. Cal.), declaration of Van Dam in support of Samsung's motion in opposition to preliminary injunction, filed Nov. 29, 2011.
*Apple Inc. v. Samsung Electronics Co.*, Case No. 11-cv-01846 (N.D. Cal.), deposition transcript of Van Dam, dated May 2, 2012.
*Apple Inc. v. Samsung Electronics Co.*, Case No. 11-cv-01846 (N.D. Cal.), deposition transcript of Van Dam, dated Sep. 14, 2011.
*Apple Inc. v. Samsung Electronics Co.*, Case No. 11-cv-01846 (N.D. Cal.), excerpts from Apple's Motion for a Preliminary Injunction, filed Jul. 1, 2011.
*Apple Inc. v. Samsung Electronics Co.*, Case No. 11-cv-01846 (N.D. Cal.), excerpts from Apple's opposition to Samsung MSJ, filed May 31, 2012.
*Apple Inc. v. Samsung Electronics Co.*, Case No. 11-cv-01846 (N.D. Cal.), excerpts from Apple's Reply Brief in PI Appeal.
*Apple Inc. v. Samsung Electronics Co.*, Case No. 11-cv-01846 (N.D. Cal.), excerpts from Apple's reply motion for Preliminary Injunction, filed Sep. 30, 2011.
*Apple Inc. v. Samsung Electronics Co.*, Case No. 11-cv-01846 (N.D. Cal.), excerpts from Samsung brief, appealing PI ruling, dated Jan. 11, 2012.
*Apple Inc. v. Samsung Electronics Co.*, Case No. 11-cv-01846 (N.D. Cal.), excerpts from Samsung motion for summary judgment, filed May 17, 2012.
*Apple Inc. v. Samsung Electronics Co.*, Case No. 11-cv-01846 (N.D. Cal.), excerpts from Samsung's opposition to Apple's motion for preliminary injunction, filed Nov. 29, 2011.
*Apple Inc. v. Samsung Electronics Co.*, Case No. 11-cv-01846 (N.D. Cal.), Joint Claim Construction and Prehearing Statement Pursuant to Patent L.R. 4-3, Nov. 14, 2011, p. 6.
*Apple Inc. v. Samsung Electronics Co.*, Case No. 11-cv-01846 (N.D. Cal.), Order Construing Disputed Claim Terms of U.S. Pat. Nos. 7,469,381 and 7,864,163, Jul. 20, 2012.
*Apple Inc. v. Samsung Electronics Co.*, Case No. 11-cv-01846 (N.D. Cal.), Order Construing Disputed Claim Terms, Apr. 4, 2012.
*Apple Inc. v. Samsung Electronics Co.*, Case No. 11-cv-01846 (N.D. Cal.), Order Denying Motion for Summary Judgment, Jun. 30, 2012, pp. 11-17.
*Apple Inc. v. Samsung Electronics Co.*, Case No. 11-cv-01846 (N.D. Cal.), reply declaration of Ravin Balakrisnan, filed Sep. 30, 2011.
*Apple Inc. v. Samsung Electronics Co.*, Case No. 11-cv-01846 (N.D. Cal.), Videotaped Deposition of Benjamin Bederson, Transcript, Sep. 17, 2011.
*Apple Inc. v., Samsung Electronics, et al.*, No. 11-cv-01846-LHK (N.D. Cal.), Order Granting in Part and Denying in Part Motion for Judgment As a Matter of Law, Jan. 29, 2013.
*Apple Inc. Vs. Samsung Electronice Co. Ltd.*, Case No. 11-CV-01846-LHK, Aug. 9, 2011, 85 pages.
*Apple Inc. vs. Samsung Electronics Co. Ltd. et al.*, Judgment in Interlocutory proceeding, Case No. 396957/KG ZA 11-730, civil law sector, Aug. 24, 2011, pp. 1-65.

(56) References Cited

OTHER PUBLICATIONS

*Apple Inc. vs. Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc. vs. Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
*Apple Inc. Vs. Samsung Electronics GmbH*, Jul. 26, 2012, 27 pages.
*Apple Inc. Vs. Samsung Electronics GmbH*, Landgericht Mannheim 7. Zivilkammer Beschluss, Feb. 8, 2013, 13 pages.
*Apple v. HTC*, Nos. HC11 CO2826, HC11 CO2703, HC11 C03080 (UK), Hearing Transcript May 1, 2012.
*Apple v. HTC*, Nos. HC11 CO2826, HC11 CO2703, HC11 C03080 (UK), Hearing Transcript May 10, 2012.
*Apple v. HTC*, Nos. HC11 CO2826, HC11 CO2703, HC11 C03080 (UK), Hearing Transcript May 11, 2012.
*Apple v. HTC*, Nos. HC11 CO2826, HC11 CO2703, HC11 C03080 (UK), Hearing Transcript May 2, 2012.
*Apple v. HTC*, Nos. HC11 CO2826, HC11 CO2703, HC11 C03080 (UK), Hearing Transcript May 3, 2012.
*Apple v. HTC*, Nos. HC11 CO2826, HC11 CO2703, HC11 C03080 (UK), Hearing Transcript May 8, 2012.
*Apple v. HTC*, Nos. HC11 CO2826, HC11 CO2703, HC11 C03080 (UK), Hearing Transcript May 9, 2012.
*Apple v. HTC*, Nos. HC11 CO2826, HC11 CO2703, HC11 C03080 (UK), Judgment dated Jul. 4, 2012.
*Apple v. Samsung*, No. (P) NSD 1243 of2011 (Australia), "Particulars of Invalidity", Australian Standard Patent No. 2008100283, May 16, 2012.
*Apple v. Samsung*, No. (P) NSD 1243 of2011 (Australia), "Particulars of Invalidity", Australian Standard Patent No. 2008100372, May 16, 2012.
*Apple v. Samsung*, No. (P) NSD 1243 of2011 (Australia), "Particulars of Invalidity", Australian Standard Patent No. 2008201540, May 16, 2012.
*Apple v. Samsung*, No. (P) NSD 1243 of2011 (Australia), "Particulars of Invalidity", Australian Standard Patent No. 2009200366, May 16, 2012.
*Apple Vs. Samsung Electronics GmbH*, Landgericht Munchen 1, 21 O 26022/11, Feb. 27, 2012, 16 pages.
Australian Case No. (P) NSD 308 of 2013, "Amended Particulars of Invalidity", Australian Standard Patent No. 2008201540, Mar. 2013.
Australian Case No. (P) NSD 308 of 2013, "Amended Particulars of Invalidity", Australian Standard Patent No. 2009200366, Mar. 2013.
Australian Case No. (P) NSD 308 of 2013, "Amended Particulars of Invalidity", Australian Standard Patent No. 2008100283, Mar. 2013.
Australian Case No. NSD 1243 of 2011, "Affidavit of Andrew Cockburn", Jan. 14, 2013.
Australian Case No. NSD 1243 of 2011, "Affidavit of Saul Greenberg", Jan. 9, 2013.
Australian Case No. NSD 1243 of 2011, "Apple's Outline of Opening Submissions on the Invalidity of HCI Patents", Feb. 21, 2013.
Australian Case No. NSD 1243 of 2011, "Samsung's Outline of Opening Submissions on the Invalidity of Apple's HCI Patents", Feb. 14, 2013.
Australian Case No. NSD 1243 of 2011, "Second Affidavit of Mark Nathan Billinghurst", Jan. 16, 2013.
Australian Case No. NSD 1243 of 2011, "Second Affidavit of Masahiro Takatsuka", Jan. 15, 2013.
Australian Case No. NSD 1243 of 2011, "Second Affidavit of Ravin Balakrishnan", May 2, 2013.
Australian Case No. NSD 1243 of 2011, "Second Affidavit of Roderick Alexander Farmer", Oct. 30, 2012.
Australian Case No. NSD 1243 of 2011, "Second Affidavit of Saul Greenberg", Jan. 9, 2013.
Australian Case No. NSD 1243 of 2011, "Third Affidavit of Roderick Alexander Farmer", Feb. 8, 2013.
Australian Case No. NSD 1243 of 2011, Affidavit of Ravin Balakrishnan, Jan. 16, 2013.
Australian Case No. NSD 308 of 2013, "Apple's Defence to Samsung's Statement of Cross-Claim", Feb. 25, 2013.
Australian Case No. NSD 308 of 2013, "Samsung's Notice of Cross-Claim", Feb. 22, 2013.
Australian Case No. NSD 308 of 2013, "Samsung's Statement of Cross-Claim", Feb. 22, 2013.
Australian Case Nos. NSD 308 of 2013 | NSD 1243 of 2011, "List of Topics for Discussion Between Experts on the HCI A Patents", Feb. 2013.
Auxiliary request in the Opposition Proceedings against the European Patent No. 08713567.9, filed on Dec. 5, 2014, 77 pages.
Bach, M.J., "The Design of the Unix Operating System", Eastern Economy Edition, 1986.
Baecker, et al., "Reading in Human-Computer Interactio: A Multi-disciplinary Approach", 1987.
Baecker, et al., "Readings in Human-Computer Interaction: Toward the Year 2000", 1995.
Baig, Edward C., "Apple's iPhone Isn't Perfect, But It's Worthy of the Hype", Jun. 27, 2007, 4 pages.
Ballard, Paul, "Microsoft Makes Research Technologies Available for Licensing", available at <http://www.theserveside.com/discussions/thread.tss?thread_id=33761>, May 5, 2005, 8 pages.
Bederson, Benjamin B., et al., "Pad++: A Zooming Graphical Interface for Exploring Alternate Interface Physics", UIST' 94 ACM, Nov. 2, 1994, pp. 17-26.
Bederson et al., "Jazz: An Extensible 2D+Zooming Graphics Toolkit in Java", Jul. 1999.
Bederson et al., "Jazz: An Extensible Zoomable User Interface Graphics Toolkit in Java", ACM Symposium on User Interfaces Software and Technology, May 2000.
Bederson et al., "Photo Mesa 3.1.2 Screen Shots", Windsor Interfaces. Inc., 2004-2006, 5 pages.
Benko et al., "Precise Selection Techniques for Multi-Touch Screens", CHI 2006, Apr. 22-27, 2006, 10 pages.
Bic et al., "The Logical Design of Operating Systems", Second Edition, 1988, pp. 1-370.
Bier et al., "Snap-Dragging", Proceedings of SIGGRAPH 86, Computer Graphics (20) 4, 1986, pp. 233-240.
Bier, "Snap-Dragging: Interactive Geometric Desing in Two and Three Dimensions", Ph.D. Thesis, University of California, Berkeley, 1989.
Borman et al., "Human Factors in Computing Systems", CHI '85 Conference Proceedings, San Francisco, Apr. 14-18, 1985.
Browne et al., "Designing a Collaborative Finger Painting Application for Children", UM Computer Science Department, CS-TR-4184, 2000.
Butz, Andreas, "Expert Statement Regarding European Patent No. 2126678", Sep. 21, 2013, 31 pages.
Buxton, W., "Invited Paper: A Touching Story: A Personal Perspective on the Histsory of Touch Interfaces Past and Future", Society for Information Display (SID) Symposium Digest of Technical Papers, vol. 41(1), Session 31, May 2010, pp. 444-448.
Certificate of Grant received for Hong Kong Patent Application No. 10103983.1, dated Feb. 3, 2012, 5 pages.
Certificate of Grant received for Turkish part of European Patent Application No. 2126678, dated Jun. 21, 2012, 2 pages.
Chang et al., "Animation: From Cartoons to the User Interface", UIST '93 Proceedings of the 6th Annual ACM Symposium on User Interface Software and Technology, Nov. 1993, pp. 45-55.
CHI 2005 Paper Abstracts, 2005.
Cockburn et al., "Comparing Speed-Dependent Automatic Zooming with Traditional Scroll, Pan, and Zoom Methods", People and Computers XVII: British Computer Society Conference on Human Computer Interaction, 2003, pp. 87-102.
Communication Arts, Sep./Oct. 2001 Communication Arts Interactive Annual 7.
Communication Arts, Sep./Oct. 2003 Communication Arts Interactive Annual 9.
Communication Arts, Sep./Oct. 2004 Communication Arts Interactive Annual 10.

(56) References Cited

OTHER PUBLICATIONS

Communication Arts, Sep./Oct. 2005 Communication Arts Interactive Annual 11.
Communication Arts, Sep./Oct. 2006 Communication Arts Interactive Annual 12.
Corrected Notice of Allowance received for U.S. Appl. No. 14/624,518, dated Feb. 13, 2017, 5 pages.
Corrected Notice of Allowance received for U.S. Appl. No. 14/624,518, dated Jan. 20, 2017, 5 pages.
Corrected Notice of Allowance received for U.S. Appl. No. 15/483,743, dated Feb. 21, 2020, 5 pages.
"Data sheet of the HP iPAQ h41 00 pocket PC series", available online at http://h20000.www2.hp.com/bizsupport/TechSupport/Document.jsp?lang=de&cc=de& taskId=120&prodSeriesId=349042&prodTypeId=215348&objectiD=c00350648, accessed on May 17, 2013.
Davis, Joshua, "Flash to the Core—An Interactive Sketchbook", available at <http://flashtothecore.praystation.com/menu.html>, 2002, 3 pages.
Decision on Appeal received for European Patent Application No. 08713567.9, mailed on Sep. 10, 2018, 36 pages.
Decision on Appeal received for Korean Patent Application No. 10-2015-7022918, mailed on Oct. 29, 2018, 20 pages.
Decision to Grant received for European Patent Application No. 08713567.9, dated Oct. 7, 2011, 1 page.
Decision to Grant received for European Patent Application No. 11182954.5, dated Aug. 10, 2017, 3 pages.
Decision to Grant received for European Patent Application No. 17186896.1, dated Jan. 23, 2020, 3 pages.
Decision to Grant received for Japanese Patent Application No. 2009-544996, dated May 20, 2011, 1 page.
Decision to Grant received for Japanese Patent Application No. 2010-157302, dated Oct. 26, 2012, 3 pages.
Decision to Grant received for Japanese Patent Application No. 2010-157303, dated Apr. 15, 2013, 3 pages.
Decision to Grant received for the European Patent Application No. 07814633.9, dated Sep. 2, 2010, 3 pages.
Decision to Revoke Patent received for European Patent Application No. 08713567.9. dated Jun. 23, 2015, 50 pages.
Declaration of Benjamin B. Bederson, *Apple Inc.* vs. *Samsung Electronics Co., Ltd.*, Case No. 11-cv-01846-LHK, Document 165, Filed on Aug. 22, 2011, 12 pages.
Denning, P.J., "The Invisible Future", 2001.
Dewid, R D., "Scroll Control Box", IBM Technical Disclosure Bulletin, vol. 38, No. 4, Apr. 1993, pp. 399-403.
Dietz et al., "Touch Recognition Technology 'DiamondTouch, (Abstract)", Mitsubishi Denki Giho (Aug. 2002).
Dodge et al., "Microsoft Office Excel 2003 Office Manual", Microsoft Press, vol. 1, Unable to Locate English Translation, Jul. 12, 2004, 5 pages.
Ed. C. EPP, "Prelude to Patterns in Computer Science Using Java", Beta Edition, , 2001.
Erickson, T.D., "Working with Interface Metaphors", in Human-computer Itneraction, 1995, pp. 65-73.
Esenther et al., "Multi-User Multi-Touch Games on DiamondTouch with the DTFiash Toolkit", Intelligent Technologies for Interactive Entertainment, Dec. 2005.
Eslambolchilar et al., "Tilt-based automatic zooming and scaling in mobile devices—A state-space implementation", Mobile Human-Computer Interaction—MobileHCI 2004: 6th International Symposium, Glasgow, UK, Sep. 13-16, 2004, pp. 120-131.
European search Opinion dated Oct. 31, 2011, received in European Patent Application No. 11178257.9, which relates to U.S. Appl. No. 11/956,969, 2 pages.
European search report dated Oct. 18, 2011, received in European Patent Application No. 11178257.9, which relates to U.S. Appl. No. 11/956,969, 2 pages.
Examiner's Amendment received for U.S. Appl. No. 11/956,969, dated Oct. 29, 2008, 6 pages.
Examiners report No. 1 dated May 16, 2008, received in Australian Patent Application No. 2008100372, which corresponds U.S. Appl. No. 11/956,969, 1 page.
Examiners report No. 2 dated Apr. 1, 2009, received in Australian Patent Application No. 2008201540, which corresponds to U.S. Appl. No. 11/956,969, 2 pages.
Extended European Search Report received for European Patent Application No. 11182954.5, dated Nov. 29, 2011, 6 pages.
Extended European Search Report received for European Patent Application No. 11182959.4, dated Nov. 30, 2011, 7 pages.
Extended European Search Report received for European Patent Application No. 11182962.8, dated Dec. 1, 2011, 8 pages.
Extended European Search Report received for European Patent Application No. 11182963.6, dated Dec. 1, 2011, 7 pages.
Extended European Search Report received for European Patent Application No. 17186896.1, dated Dec. 15, 2017, 9 pages.
Final Office Action received for U.S. Appl. No. 12/270,815, dated Feb. 14, 2013, 12 pages.
Final Office Action received for U.S. Appl. No. 14/624,518, dated Jul. 13, 2016, 10 pages.
Final Office Action received for U.S. Appl. No. 14/913,345, dated Oct. 26, 2018, 20 pages.
Final Office Action received for U.S. Appl. No. 15/049,049 dated Jul. 12, 2018, 24 pages.
Final Office Action received for U.S. Appl. No. 15/049,049, dated May 23, 2017, 23 pages.
"Flash to the Core Website", Available online at: http://flashtothecore.praystation.com, 2002.
"Flashloaded SlideMem Website", Available online at: http://flashloaded.com/flashcomponents/slidemem/, 2007.
Foley et al., "Computer Graphics—Principles and Practice", 2nd Edition, 1990.
Foley et al., "Computer Graphics—Principles and Practice", 2nd Edition in C, 1996.
Foley et al., "Indroduction to Computer Graphics", 1994.
Forlines et al., "DTLens: Multi-user Tabletop Spatial Data Exploration", UIST'05, Oct. 23-27, 2005, 6 pages.
Forlines et al., "Glimpse: A Novel Input Model for Multi-Level Devices", CHI'2005, Apr. 2-7, 2005, 6 pages.
Forlines et al., "Input Techniques for Mobile Interaction, plus . . . ", Mitsubishi Electric Research Laboratories, 2005.
German Case No. 7070/12, Regional Court Mannheim, 7th Civil Chamber, "Decision", Feb. 8, 2013.
Gleicher, M., "Image Snapping", 1995, pp. 183-190.
Gross, Mark D., "Grids in Design and CAD", Proceedings of Association for Computer Aided Design in Architecture, 1991, pp. 1-11.
Grounds of appeal against revocation of European Patent No. EP 2126678, Nov. 3, 2015, 41 pages.
Han, Jeff, "Jeff Han Demos his Breakthrough Touchscreen", TED, Ideas Worth Spreading, available at <http://www.ted.com/talks/jeff_han_demos_his_breakthrough_touchscreen.html>, retrieved on May 8, 2012, 12 pages.
Han, Jeff, "Talks Jeff Han: Unveiling the Genius of Multi-touch Interface Design", Ted Ideas Worth Spreading, available at: <http://www.ted.com/index.php/talks/view/id/65>, Aug. 2006, 2 pages.
Hewlett-Packard, "QuickSpecs-HP iPAQ rx1950 Pocket PC", Sep. 26, 2005.
Hewlett-Packard, "User's Guide-HP iPAQ Pocket PC h1900 series", May 2003.
HTC Europe Co. Ltd and Apple Inc. invalidity Claim dated Jul. 29, 2011, together with amended Particulars of Claim and amended Grounds of Invalidity, Jul. 29, 2011, 22 pages.
HTC Europe Co. Ltd and Apple Inc. Invalidity Claim No. HC 12 C 01465, together with annexes, dated Apr. 5, 2012, 12 pages.
HTC, "User manual—PDA Phone—HTC_P3050 Touch", available at: <http://web.archive.org/web/20101228223033/http://www.comparecellular.com/image s/phones/userguide1130.pdf>, Nov. 2, 2007, pp. 12-28.
Intention to Grant received for European Patent Application No. 11182954.5, dated Mar. 31, 2017, 10 pages.
Intention to Grant received for European Patent Application No. 17186896.1, dated Dec. 20, 2019, 6 pages.

(56) References Cited

OTHER PUBLICATIONS

Intention to Grant received for European Patent Application No. 17186896.1, dated Jul. 25, 2019, 9 pages.
International Preliminary Report on Patentability received for PCT Patent Application No. PCT/US2007/077441, dated Mar. 10, 2009, 9 pages.
International Preliminary Report on Patentability received for PCT Patent Application No. PCT/US2008/050292, dated Mar. 26, 2013, 17 pages.
International Preliminary Report on Patentability received for PCT Patent Application No. PCT/US2014/053951, dated Mar. 17, 2016, 9 pages.
International Search Report and Written Opinion received for PCT Patent Application No. PCT/US2008/050292, dated Sep. 19, 2008, 19 pages.
International Search Report and Written Opinion received for PCT Patent Application No. PCT/US2014/053951, dated Dec. 8, 2014, 11 pages.
International Search Report and Written Opinion, received for PCT Patent Application No. PCT/US2007/077441, dated May 8, 2008, 13 pages.
Invitation to Pay Additional Fees received for PCT Patent Application No. PCT/US2008/050292, dated Jul. 18, 2008, 4 pages.
"IOS Security", White Paper, Available online at <https://web.archive.org/web/20150526223200/http://www.apple.com/business/docs/iOS_Security_Guide.pdf>, Apr. 2015, 55 pages.
"Iphone", Wikipedia, the free Encyclopedia, retrieved on Aug. 18, 2017, 46 pages.
Ishak et al., "Content-Aware Scrolling", UIST'06 Proceedings of the 19th annual ACM symposium on User Interface Software and Technology, Montrex, Switzerland, Oct. 15-18, 2006.
Japanese 2011 (Wa) No. 27781, Case of Petition for Damage Compensation, "Apple's Seventh Brief [Translation]", Feb. 2013.
Japanese 2011 (Wa) No. 27781, Case of Petition for Damage Compensation, "Apple's Sixth Brief [Translation]", Jan. 10, 2013.
Japanese 2011 (Wa) No. 27781, Case of Petition for Damage Compensation, "Samsung's Eighth Brief [Translation]", May 14, 2013.
Japanese 2011 (Wa) No. 27781, Case of Petition for Damage Compensation, "Samsung's Seventh Brief [Translation]", Jan. 17, 2013.
Japanese Patent Invalidation Trial No. 2012-800075, Oral Proceedings Statement Brief [Translation], Apr. 5, 2013.
Johnson, E.A., "Touch Displays: A Programmed Man-Machine Interface", Ergonomics, vol. 10(2), Mar. 1967, pp. 271-277.
Johnson et al., "A Collection of Papers from First Person", Inc., 1995, pp. 1-86.
Johnson et al., "The Effect of Touch-Pad Size on Pointing Accuracy", Apr. 1994, pp. 1-8.
Johnson, Jeff A., "A Comparison of User Interfaces for Panning on a Touch-Controlled Display", CHI '95 Proceedings, Mosaic of Creativity, May 7-11, 1995, pp. 218-225.
Jul et al., "Critical Zones in Desert Fog: Aids to Multiscale Navigation", Proceedings of the 11th annual ACM symposium on User interface software and technology, 1998, pp. 97-106.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, pp. 1-17.
Keys, "[CHI] Is Microsoft's (U.S.) New User Interface Made for Next Generation Cell Phones?", Tech-On!, Apr. 8, 2005.
Klemmer, Scott, "Declaration of Scott Klemmer", in the matter of European Patent No. EP21266788, Nov. 1, 2015, 3 pages.
Korean Case No. 2012 Na 76203, Action for Injunction to Cease Patent Infringement, etc.,"Appeal Brief", Nov. 26, 2012.
Korean Case No. 2012 Na 76203, Action for Injunction to Cease Patent Infringement, etc.,"Brief", Feb. 1, 2013.
Korean Case No. 2012 Na 76203, Action for Injunction to Cease Patent Infringement, etc.,"Brief", Feb. 26, 2013.
Koren, J., "Including Images in Web Pages", Available online at: http://unsco.org/webworld/infotraining/inline.html, 1998.
Krolik M., "PIV Creator 3.41", Cross Browser DHTML 360 Panorama Image Viewer (PIV), 1999.
Krueger, M.W., "Artificial Reality II", 1991.
Krueger, M.W., "Artificial Reality", 1983.
Landgericht Dusseldorf Geschftsstelle, Jun. 18, 2014, 2 pages.
Laurel, B., "The Art of Human-Computer Interface Design", 1990, pp. 65-73.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Levy, "At Last, the iPhone", The Daily Beast, Jun. 25, 2007.
Lewis et al., "MAC OS in a Nutshell—A Power User's Quick Reference", 2000.
Masui et al., "Elastic Graphical Interfaces for Precise Data Manipulation", ACM Conference on Human Factors in Computing Systems (CHI '95), Conference Companion, Apr. 1995, pp. 143-144.
Mertz et al., "The Influence of Design Techniques on User Interfaces: The DigiStrips Experiment for Air Traffic Control", Proceeding of HCI-Aero 2000 International Conference on Human-Computer Interaction in Aeronautics, 2000, 6 pages.
Microsoft Word 2003 Screenshots, 1983-2003, 2 pages.
Miller, Dana, "PersonalJava Application Environment", available at <http://java.sun.com/products/personaljava/touchable/>, Jun. 8, 1999, 12 pages.
Millhollon et al., "Microsoft Office Word 2003 Inside Out", 2004, 7 pages.
Minutes of the Oral Proceedings received for European Application No. 08713567.9, mailed on Jun. 29, 2018, 6 pages.
Mossberg, "The iPhone is a Breakthrough Handheld Computer", ALL Things D, Jun. 26, 2007.
*Motorola Mobility Germany GmbH* Vs. *Samsung Electronics GmbH*, Bundespatentgericht, Sep. 26, 2013, 50 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Non-Final Office Action received for U.S. Appl. No. 14/624,518, dated Nov. 23, 2015, 10 pages.
Non-Final Office Action received for U.S. Appl. No. 12/270,805, dated Oct. 11, 2011, 27 pages.
Non-Final Office Action received for U.S. Appl. No. 12/270,807, dated Oct. 11, 2011, 26 pages.
Non-Final Office Action received for U.S. Appl. No. 12/270,810, dated Oct. 12, 2011, 12 pages.
Non-Final Office Action received for U.S. Appl. No. 12/270,812, dated May 17, 2012, 14 pages.
Non-Final Office Action received for U.S. Appl. No. 12/270,812, dated Oct. 13, 2011, 12 pages.
Non-Final Office Action received for U.S. Appl. No. 12/270,815, dated Aug. 23, 2013, 12 pages.
Non-Final Office Action received for U.S. Appl. No. 12/270,815, dated Jul. 11, 2014, 12 pages.
Non-Final Office Action received for U.S. Appl. No. 12/270,815, dated May 17, 2012, 13 pages.
Non-Final Office Action received for U.S. Appl. No. 12/270,815, dated Oct. 11, 2011, 12 pages.
Non-Final Office Action received for U.S. Appl. No. 14/913,345, dated Apr. 5, 2018, 15 pages.
Non-Final Office Action received for U.S. Appl. No. 15/049,049, dated Dec. 15, 2017, 23 pages.
Non-Final Office Action received for U.S. Appl. No. 15/049,049, dated Feb. 6, 2019, 21 pages.
Non-Final Office Action received for U.S. Appl. No. 15/049,049, dated Nov. 9, 2016, 21 pages.
Non-Final Office Action received for U.S. Appl. No. 15/483,743, dated Mar. 21, 2019, 10 pages.
Non-Final Office Action received for U.S. Appl. No. 14/624,518, dated Mar. 25, 2016, 8 pages.

(56) References Cited

OTHER PUBLICATIONS

Non-Final Office Action received for U.S. Appl. No. 14/913,345, dated Jun. 26, 2019, 23 pages.
Norman et al., "User Centered System Design", 1986.
Notice of acceptance dated Aug. 24, 2009, received in Australian Patent Application No. 2008201540, which corresponds to U.S. Appl. No. 11/956,969, 1 page.
Notice of acceptance dated Mar. 31, 2009, received in Australian Patent Application No. 2009200366, which corresponds to U.S. Appl. No. 11/956,969, 1 page.
Notice of Acceptance received for Australian Patent Application No. 2009208099, dated Nov. 24, 2011, 3 pages.
Notice of Acceptance received for Australian Patent Application No. 2009208103, dated Apr. 14, 2011, 3 pages.
Notice of Acceptance received for Australian Patent Application No. 2011201639, dated Nov. 9, 2011, 3 pages.
Notice of Acceptance received for Australian Patent Application No. 2012200689, dated Jun. 9, 2015, 2 pages.
Notice of Acceptance received for Australian Patent Application No. 2014315319, dated Oct. 12, 2017, 3 pages.
Notice of Acceptance received for Australian Patent Application No. 2015201905, dated Jan. 13, 2017, 3 pages.
Notice of Acceptance received for Australian Patent Application No. 2017202917, dated Jun. 7, 2019, 3 pages.
Notice of Acceptance received for Australian Patent Application No. 2018200289, dated Jul. 23, 2019, 3 pages.
Notice of Allowance received for Canadian Patent Application No. 2,759,090, dated Jun. 23, 2015, 1 page.
Notice of Allowance received for Canadian Patent Application No. 2,759,091, dated Apr. 8, 2016, 1 page.
Notice of Allowance received for Canadian Patent Application No. 2,890,732, dated Apr. 19, 2017, 1 page.
Notice of Allowance received for Canadian Patent Application No. 2,915,678, dated Dec. 27, 2017, 1 page.
Notice of Allowance received for Canadian Patent Application No. 2658177, dated Jan. 30, 2012, 1 page.
Notice of Allowance received for Chinese Patent Application No. 201310024905.8, dated Jul. 11, 2017, 2 pages.
Notice of Allowance received for Chinese Patent Application No. 201480059543.9, dated Sep. 4, 2019, 2 pages.
Notice of Allowance received for Japanese Patent Application No. 2013-102576, dated Dec. 8, 2014, 3 pages.
Notice of Allowance received for Japanese Patent Application No. 2014-140817, dated Mar. 31, 2017, 3 pages.
Notice of Allowance received for Japanese Patent Application No. 2016-537945, dated Aug. 3, 2018, 4 pages.
Notice of Allowance received for Japanese Patent Application No. 2017-090133, dated Jul. 27, 2018, 4 pages.
Notice of Allowance received for Japanese Patent Application No. 2018-090084, dated May 24, 2019, 4 pages.
Notice of Allowance received for Korean Patent Application No. 10-2009-7007114, dated Apr. 26, 2013, 2 pages.
Notice of Allowance received for Korean Patent Application No. 10-2013-7034633, dated Oct. 31, 2016, 3 pages.
Notice of Allowance received for Korean Patent Application No. 10-2017-7002923, dated Feb. 28, 2018, 3 pages.
Notice of Allowance received for Korean Patent Application No. 10-2018-7010593, dated Jan. 30, 2019, 3 pages.
Notice of Allowance received for Korean Patent Application No. 10-2018-7032106, dated Jun. 28, 2019, 5 pages.
Notice of Allowance received for Taiwanese Patent Application No. 103130520, dated Apr. 25, 2018, 4 pages.
Notice of Allowance received for U.S. Appl. No. 11/956,969, dated Oct. 29, 2008, 6 pages.
Notice of Allowance received for U.S. Appl. No. 12/270,805, dated May 17, 2012, 14 pages.
Notice of Allowance received for U.S. Appl. No. 12/270,807, dated May 11, 2012, 12 pages.
Notice of Allowance received for U.S. Appl. No. 12/270,810, dated Jul. 11, 2012, 17 pages.
Notice of Allowance received for U.S. Appl. No. 12/270,812, dated Sep. 19, 2012, 20 pages.
Notice of Allowance received for U.S. Appl. No. 12/270,815, dated Jan. 28, 2015, 12 pages.
Notice of Allowance received for U.S. Appl. No. 14/624,518, dated Dec. 30, 2016, 8 pages.
Notice of Allowance received for U.S. Appl. No. 15/049,049, dated Jul. 25, 2019, 8 pages.
Notice of Allowance received for U.S. Appl. No. 15/483,743, dated Nov. 18, 2019, 7 pages.
Notice of Appeal in Expedited Appeal in Summary Proceedings dated Sep. 14, 2011, pp. 1-51.
Notice of certification dated Nov. 7, 2008, received in Australian Patent Application No. 2008100283, which corresponds to U.S. Appl. No. 11/956,969, 1 page.
Notice of certification dated Sep. 19, 2008, received in Australian Patent Application No. 2008100372, which corresponds to U.S. Appl. No. 11/956,969, 1 page.
Notice of Intent to Issue a Reexam Certificate received for U.S. Appl. No. 90/010,963, dated Jan. 13, 2011, 9 pages.
Notice of Intent to Issue a Reexam Certificate received for U.S. Appl. No. 90/012,304, dated Jun. 12, 2013, 12 pages.
Office Action received for Australian Patent Application No. 2008201540, dated Feb. 19, 2009, 2 pages.
Office Action received for Australian Patent Application No. 2008100283, dated Jul. 1, 2008, 2 pages.
Office Action received for Australian Patent Application No. 2008201540, dated Jul. 15, 2009, 2 pages.
Office Action received for Australian Patent Application No. 2009200366, dated Feb. 11, 2009, 2 pages.
Office Action received for Australian Patent Application No. 2009208103, dated Apr. 8, 2010, 2 pages.
Office Action received for Australian Patent Application No. 2012200689, dated Sep. 9, 2013, 3 pages.
Office Action received for Australian Patent Application No. 2014315319, dated Aug. 3, 2017, 3 pages.
Office Action received for Australian Patent Application No. 2014315319, dated Oct. 17, 2016, 3 pages.
Office Action received for Australian Patent Application No. 2015201905, dated May 9, 2016, 3 pages.
Office Action received for Australian Patent Application No. 2017202917, dated Jul. 20, 2018, 3 pages.
Office Action received for Australian Patent Application No. 2018200289, dated Apr. 9, 2019, 5 pages.
Office Action received for Australian Patent Application No. 2018200289, dated Dec. 4, 2018, 4 pages.
Office Action received for Canadian Patent Application No. 2,759,066, dated Nov. 4, 2013, 3 pages.
Office Action received for Canadian Patent Application No. 2,759,090, dated Nov. 4, 2013, 3 pages.
Office Action received for Canadian Patent Application No. 2,759,090, dated Oct. 29, 2014, 4 pages.
Office Action received for Canadian Patent Application No. 2,759,091, dated Nov. 7, 2013, 4 pages.
Office Action received for Canadian Patent Application No. 2,890,732, dated May 12, 2016, 5 pages.
Office Action received for Canadian Patent Application No. 2,915,678, dated Aug. 6, 2018, 4 pages.
Office Action received for Canadian Patent Application No. 2,915,678, dated Aug. 19, 2019, 4 pages.
Office Action received for Canadian Patent Application No. 2,915,678, dated Jan. 23, 2017, 5 pages.
Office Action received for Canadian Patent Application No. 2,658,177, dated Dec. 1, 2009, 2 pages.
Office Action received for Canadian Patent Application No. 2,658,177, dated Jun. 22, 2011, 2 pages.
Office Action received for Canadian Patent Application No. 3,028,777, dated Dec. 30, 2019, 3 pages.
Office Action received for Chinese Patent Application No. 200880000019.9, dated Feb. 18, 2013, 23 pages.
Office Action received for Chinese Patent Application No. 200880000019.9, dated Jan. 5, 2012, 14 pages.

(56) References Cited

OTHER PUBLICATIONS

Office Action received for Chinese Patent Application No. 200880000019.9, dated Jul. 23, 2013, 7 pages.
Office Action received for Chinese Patent Application No. 200880000019.9, dated Nov. 23, 2010, 13 pages.
Office Action received for Chinese Patent Application No. 200880000019.9, dated Sep. 20, 2012, 22 pages.
Office Action received for Chinese Patent Application No. 201310024905.8 dated Apr. 30, 2015, 21 pages.
Office Action received for Chinese Patent Application No. 201310024905.8, dated Feb. 6, 2016, 9 pages.
Office Action received for Chinese Patent Application No. 201310024905.8, dated Oct. 21, 2016, 12 pages.
Office Action received for Chinese Patent Application No. 201480059543.9, dated Feb. 28, 2019, 16 pages.
Office Action received for Chinese Patent Application No. 201480059543.9, dated Jan. 26, 2018., 17 pages.
Office Action received for Chinese Patent Application No. 201480059543.9, dated Sep. 19, 2018, 18 pages.
Office Action received for European Application No. 08713567.9, dated Dec. 29, 2009, 5 pages.
Office Action received for European Patent Application No. 11182954.5, dated Nov. 19, 2014, 5 pages.
Office Action received for European Patent Application No. 14772494.2, dated Jun. 20, 2017, 7 pages.
Office Action received for European Patent Application No. 14772494.2, dated Oct. 2, 2018, 9 pages.
Office Action received for European Patent Application No. 17186896.1, dated Oct. 12, 2018, 5 pages.
Office Action received for German Patent Application No. 112008000144.8, dated Oct. 29, 2010, 8 pages.
Office Action received for Japanese Patent Application No. 2009-544996, dated Feb. 12, 2010, 1 page.
Office Action received for Japanese Patent Application No. 2009-544996, dated Nov. 19, 2010, 6 pages.
Office Action received for Japanese Patent Application No. 2009-544996, dated Nov. 8, 2010, 6 pages.
Office Action received for Japanese Patent Application No. 2010-157303, dated Oct. 15, 2012, 4 pages.
Office Action received for Japanese Patent Application No. 2013-102576, dated Mar. 10, 2014, 4 pages.
Office Action received for Japanese Patent Application No. 2016-537945, dated Apr. 7, 2017, 6 pages.
Office Action received for Japanese Patent Application No. 2016-537945, dated Jan. 9, 2018, 5 pages.
Office Action received for Japanese Patent Application No. 2017-090133, dated Jan. 22, 2018, 14 pages.
Office Action received for Japanese Patent Application No. 2018-090084, dated Feb. 15, 2019, 6 pages.
Office Action received for Japanese Patent Application No. 2018-158547, dated Jul. 26, 2019, 7 pages.
Office Action received for Japanese Patent Application No. 2014-140817, dated Aug. 19, 2016, 8 pages.
Office Action received for Japanese Patent Application No. 2014-140817, dated Oct. 2, 2015, 6 pages.
Office Action received for Korean Patent Application No. 10-2009-7003574, dated Aug. 27, 2009, 1 page.
Office Action received for Korean Patent Application No. 10-2013-7000337, dated Apr. 28, 2014, 7 pages.
Office Action received for Korean Patent Application No. 10-2013-7000337, dated Jun. 25, 2013, 7 pages.
Office Action received for Korean Patent Application No. 10-2013-7034633, dated Apr. 8, 2014, 4 pages.
Office Action received for Korean Patent Application No. 10-2013-7034633, dated Dec. 29, 2015, 10 pages.
Office Action received for Korean Patent Application No. 10-2013-7034633, dated Feb. 24, 2015, 3 pages.
Office Action received for Korean Patent Application No. 10-2016-7008474, dated Aug. 6, 2018, 10 pages.
Office Action received for Korean Patent Application No. 10-2016-7008474, dated Dec. 30, 2016, 10 pages.
Office Action received for Korean Patent Application No. 10-2016-7008474, dated May 15, 2018, 7 pages.
Office Action received for Korean Patent Application No. 10-2016-7008474, dated Nov. 27, 2017, 6 pages.
Office Action received for Korean Patent Application No. 10-2017-7002923, dated Apr. 28, 2017, 5 pages.
Office Action received for Korean Patent Application No. 10-2018-7010593, dated Jul. 11, 2018, 5 pages.
Office Action received for Korean Patent Application No. 10-2018-7032106, dated Dec. 26, 2018, 10 pages.
Office Action received for Korean Patent Application No. 10-2019-7012617, dated Jun. 29, 2019, 5 pages.
Office Action received for Taiwanese Patent Application No. 103130520, dated Apr. 17, 2017, 8 pages.
Office Action received for Taiwanese Patent Application No. 103130520, dated Jan. 23, 2018, 5 pages.
Office Action received for Taiwanese Patent Application No. 103130520, dated May 23, 2016, 38 pages.
Office Action received for Taiwanese Patent Application No. 103130520, dated Oct. 1, 2015, 58 pages.
Office Action received for Taiwanese Patent Application No. 103130520, dated Sep. 29, 2016, 39 pages.
Office communication received for the European Patent Application No. 08713567.9, dated Mar. 9, 2015, 4 pages.
Owen, G.S., "Principles of Animation: Slow In and Out", Mar. 13, 1999.
Oxford English Dictionary—The definitive Record of the English Language, Oxford University Press, Jun. 2015, 11 pages.
Patel et al., "An Evaluation of Techniques for Browsing Photograph Collections on Small Displays", Proceedings Mobile HCI, 2004, pp. 132-143.
Patel et al., "Improving Photo Searching Interfaces for Small-screen Mobile Computers", Proceedings Mobile HCI 2006, ACM Press, Sep. 2006, pp. 149-156.
Petzold, C., "Programming Windows", 5th Edition, 1999.
Plaisant et al., "Touchscreen Toggle Design", CHI'92, May 3-7, 1992, pp. 667-668.
"PlasmaplugsScrollBar", Website, 2006.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
Pogue, "The iPhone Matches Most of Its Hype", The New York Times, Jun. 27, 2007.
Printouts of HCIL Webpage, "Interface Supporting One-Handed Use of Small Devices", Jun. 2005.
Printouts of Microsoft Webpage, "Microsoft Opens R&D to Small Companies and Entrepreneurs", May 4, 2005.
Raghunath et al., "User Interfaces for Applications on a Wrist Watch", Journal of Personal and Ubiquitous Computing, vol. 6, 2002, pp. 17-30.
Re-exam Final Office Action received for U.S. Appl. No. 90/012,304, dated Mar. 29, 2013, 87 pages.
Re-exam Non-Final Office Action received for U.S. Appl. No. 90/012,304, dated Oct. 15, 2012, 11 pages.
Reply to communication from Examining Division dated May 5, 2010, received in European Patent No. 08713567.9, which corresponds to U.S. Appl. No. 11/956,969, 7 pages.
Request for Further Processing, dated Oct. 22, 2012, submitted in European Application No. 11182954.5, 6 pages.
Response to Examiners first report, dated Oct. 21, 2008, received in Australian Patent Application No. 2008100283, which corresponds to U.S. Appl. No. 11/956,969, 12 pages.
Response to examiners report No. 1 dated Mar. 12, 2009, received in Australian Patent Application No. 2009200366, which corresponds to U.S. Appl. No. 11/956,969, 1 page.
Response to Examiners report No. 1 dated Mar. 31, 2009, received in Australian Patent Application No. 2008201540, which corresponds to U.S. Appl. No. 11/956,969, 1 page.

(56) References Cited

OTHER PUBLICATIONS

Response to examiners report No. 1 dated Sep. 12, 2008, received in Australian Patent Application No. 20081003 72, which corresponds to U.S. Appl. No. 11/956,969, 18 pages.
Response to Examiners report No. 2 dated Jul. 9, 2009, received in Australian Patent Application No. 2008201540, which corresponds to U.S. Appl. No. 11/956,969, 28 pages.
Response to Examiners report No. 3 dated Aug. 3, 2009, received in Australian Patent Application No. 2008201540, which corresponds to U.S. Appl. No. 11/956,969, 1 page.
Robertson et al., "Data Mountain: Using Spatial Memory for Document Management", UIST '98: Proceedings of the 11th Annual ACM symposium on User Interface Software and Technology, San Francisco, 1998, pp. 153-162.
Rubine, Dean, "Combining Gestures and Direct Manipulation", CHI '92, May 3-7, 1992, pp. 659-660.
Rubine et al., "The VideoHarp", Proceedings of the 14th International Computer Music Conference, Cologne, W. Germany, Sep. 20-25, 1988, 1988, pp. 49-55.
Salmoni, "The Zooming User Interface", Advogato, available at <http://www.advogato.org/article/788.html>, Aug. 16, 2004, 14 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Shneiderman, B., "Direct Manipulation: A Step Beyond Programming Languages", Computer, vol. 16(8), Aug. 1983, pp. 57-59.
Silberschatz, et al., "Operating System Concepts", Third Edition, , 1991, pp. 1-696.
Smith et al., "The Radial Scroll Tool: Scrolling Support for Stylus- or Touch-Based Document Navigation", UIST '04 Proceedings of the 17th Annual ACM symposium on User Interface Software and Technology, Santa Fe, New Mexico, Oct. 24-27, 2004, pp. 1-4.
Sony, "The Power of a Full-Sized PC in the Palm of your Hand", 2004.
Statement of appeal for the European Patent Application No. 08713567.9, filed on Mar. 10, 2016, 54 pages.
Summons to Attend Oral Proceedings received for European Patent Application No. 08705751.9, mailed on Oct. 28, 2011, 9 pages.
Summons to Attend Oral Proceedings received for European Patent Application No. 08713567.9, mailed on Feb. 27, 2018, 13 pages.
Summons to Attend Oral Proceedings received for European Patent Application No. 11182954.5, mailed on Aug. 12, 2016, 5 pages.
Sun et al., "Flipper: A New Method of Digital Document Navigation", CHI '05 extended abstracts on Human factors in computing systems, Portland, Oregon, Apr. 2-7, 2005, pp. 2001-2004.
Technology, Safety, Community, Conference on Human Factors in Computing Systems, CHI 2005, Apr. 2-7, 2005.
Teleprompter—VBForums, 2003.
"The interview with a key person. IBM and Citizen met and applied Linux to a watch, ASCII Corporation", vol. 25, No. 12., Dec. 12, 2001, pp. 136-143.
The Technical System of Personal Computer, 2000.
Third Party Rejection received for U.S. Appl. No. 90/012,304, mailed on May 23, 2012, 89 pages.
Thomas, B.H., "Thomas Dissertation—Animating Direct Manipulation in Human Computer Interfaces", 1997, pp. 1-207.
Thomas et al., "Animating Direct Manipulation Interfaces", UIST 95 Pittsburg, PA, Nov. 1995, pp. 3-12.
Tidwell, Jenifer, "Designing Interfaces", Copyright© 2006 O'Reilly Media, Inc., Nov. 2006, 348 pages.
Tidwell, Jenifer, "Magnetism", Designing Interfaces, 2006, pp. 261-262.
Tognazzini, B., "The "Starfire" Video Prototype Project: A Case History", 1994.

U.S. ITC, Investigation No. 337-TA-797, In the Matter of Certain Portable Electronic Devices and Related Software, Complainant Apple Inc.'s Claim Construction Brief, Jan. 18, 2012, pp. 48-70.
U.S. ITC, Investigation No. 337-TA-797, In the Matter of Certain Portable Electronic Devices and Related Software, excerpts from Markman hearing, Feb. 7, 2012.
U.S. ITC, Investigation No. 337-TA-797, In the Matter of Certain Portable Electronic Devices and Related Software, excerpts from the evidentiary hearing transcript, Aug. 14, 2012.
U.S. ITC, Investigation No. 337-TA-797, In the Matter of Certain Portable Electronic Devices and Related Software, excerpts from the evidentiary hearing transcript, Aug. 15, 2012.
U.S. ITC, Investigation No. 337-TA-797, In the Matter of Certain Portable Electronic Devices and Related Software, excerpts from the evidentiary hearing transcript, Aug. 16, 2012.
U.S. ITC, Investigation No. 337-TA-797, In the Matter of Certain Portable Electronic Devices and Related Software, excerpts from the evidentiary hearing transcript, Aug. 17, 2012.
U.S. ITC, Investigation No. 337-TA-797, In the Matter of Certain Portable Electronic Devices and Related Software, excerpts from the evidentiary hearing transcript, Aug. 22, 2012.
U.S. ITC, Investigation No. 337-TA-797, In the Matter of Certain Portable Electronic Devices and Related Software, excerpts from the evidentiary hearing transcript, Aug. 24, 2012.
U.S. ITC, Investigation No. 337-TA-797, In the Matter of Certain Portable Electronic Devices and Related Software, Expert Report of Ravin Balakrishan, Ph.D. Concerning Claim Construction of U.S. Pat. No. 7,469,381, Jan. 18, 2012.
U.S. ITC, Investigation No. 337-TA-797, In the Matter of Certain Portable Electronic Devices and Related Software, HTC's Amended Notice of Prior Art, Nov. 7, 2011.
U.S. ITC, Investigation No. 337-TA-797, In the Matter of Certain Portable Electronic Devices and Related Software, Invalidity Exhibit 381-1.
U.S. ITC, Investigation No. 337-TA-797, In the Matter of Certain Portable Electronic Devices and Related Software, Invalidity Exhibit 381-2.
U.S. ITC, Investigation No. 337-TA-797, In the Matter of Certain Portable Electronic Devices and Related Software, Invalidity Exhibit 381-4.
U.S. ITC, Investigation No. 337-TA-797, In the Matter of Certain Portable Electronic Devices and Related Software, Invalidity Exhibit 381-5.
U.S. ITC, Investigation No. 337-TA-797, In the Matter of Certain Portable Electronic Devices and Related Software, Invalidity Exhibit 381-6.
U.S. ITC, Investigation No. 337-TA-797, In the Matter of Certain Portable Electronic Devices and Related Software, Invalidity Exhibit 381-7.
U.S. ITC, Investigation No. 337-TA-797, In the Matter of Certain Portable Electronic Devices and Related Software, Invalidity Exhibit 381-8.
U.S. ITC, Investigation No. 337-TA-797, In the Matter of Certain Portable Electronic Devices and Related Software, Invalidity Exhibit 381-9.
U.S. ITC, Investigation No. 337-TA-797, In the Matter of Certain Portable Electronic Devices and Related Software, Joint Motion to Amend the Joint Claim Construction Statement, Jan. 18, 2012.
U.S. ITC, Investigation No. 337-TA-797, In the Matter of Certain Portable Electronic Devices and Related Software, Notice of Prior Art, Nov. 7, 2011.
U.S. ITC, Investigation No. 337-TA-797, In the Matter of Certain Portable Electronic Devices and Related Software, Order No. 25: Granting Joint Motion to Amend the Joint Claim Construction Statement, Jan. 19, 2012.
U.S. ITC, Investigation No. 337-TA-797, In the Matter of Certain Portable Electronic Devices and Related Software, Order No. 57: Construing the Terms of the Asserted Claims of the Patent at Issue, Jun. 26, 2012, pp. 14-49.
U.S. ITC, Investigation No. 337-TA-797, In the Matter of Certain Portable Electronic Devices and Related Software, Respondent's Notice of Prior Art, Oct. 21, 2011.

(56) References Cited

OTHER PUBLICATIONS

"Watchpad 1.5 demo", YouTube.com, Online Available at <https://www.youtube.com/watch?v=7xjvVbeUn80>, Uploaded on Jun. 20, 2010, 2 pages.

"WatchPad 1.5", Online Available at http://web.archive.org/web/20011205071448/http://www.trl.ibm.com:80/projects/ngm/index_e.htm, Dec. 5, 2001, 2 pages.

Website (Tech On).

Wikipedia, "Rotary encoder", Online Available at <https://en.wikipedia.org/wiki/Rotary_encoder>, Retrieved on May 17, 2017, 17 pages.

Wireless News, "Adobe Rolls Out Flash Player 9", Jun. 28, 2006.

Zukowski, J., "Java AWT Reference (Java 1.1)".

Notice of Allowance received for Korean Patent Application No. 10-2019-7012617, dated May 27, 2020, 3 pages (1 page of English Translation and 2 pages of Official Copy).

Notice of Allowance received for U.S. Appl. No. 16/685,884, dated Jun. 1, 2020, 10 pages.

Corrected Notice of Allowance received for U.S. Appl. No. 14/913,345, dated Apr. 13, 2020, 4 pages.

Examiner-Initiated Interview Summary received for U.S. Appl. No. 16/685,884, dated May 20, 2020, 3 pages.

Notice of Allowance received for Chinese Patent Application No. 201610079785.5, dated Apr. 27, 2020, 2 pages (1 page of English Translation and 1 page of Official Copy).

Office Action received for Korean Patent Application No. 10-2019-7028736, dated May 7, 2020, 8 pages (3 pages of English Translation and 5 pages of Official Copy).

Corrected Notice of Allowance received for U.S. Appl. No. 16/685,884, dated Jun. 24, 2020, 2 pages.

Decision on Appeal received for U.S. Appl. No. 14/871,816, mailed on Oct. 29, 2020, 16 pages.

Extended European Search Report received for European Patent Application No. 20190670.8, dated Nov. 2, 2020, 10 pages.

Office Action received for Australian Patent Application No. 2019257521, dated Oct. 21, 2020, 6 pages.

Office Action received for Japanese Patent Application No. 2019-116590, dated Oct. 5, 2020, 6 pages (3 pages of English Translation and 3 pages of Official Copy).

Office Action received for Korean Patent Application No. 10-2019-7028736, dated Oct. 22, 2020, 6 pages (3 pages of English Translation and 3 pages of Official Copy).

Office Action received for Australian Patent Application No. 2019257521, dated Aug. 7, 2020, 5 pages.

Notice of Allowance received for Japanese Patent Application No. 2018-158547, dated Jul. 3, 2020, 4 pages (1 page of English Translation and 3 pages of Official Copy).

Corrected Notice of Allowance received for U.S. Appl. No. 16/685,884, dated Sep. 30, 2020, 2 pages.

Record of Oral Hearing received for U.S. Appl. No. 14/871,816, mailed on Sep. 28, 2020, 21 pages.

Decision to Grant received for European Patent Application No. 14772494.2, dated Jul. 23, 2020, 2 pages.

Office Action received for Canadian Patent Application No. 2,915,678, dated Jul. 21, 2020, 5 pages.

Notice of Allowance received for Korean Patent Application No. 10-2020-7024816, dated Nov. 27, 2020, 3 pages (1 page of English Translation and 2 pages of Official Copy).

Notice of Allowance received for Canadian Patent Application No. 3,028,777, dated Jan. 13, 2021, 1 page.

\* cited by examiner

500

502 Detect a movement of an object (e.g., a finger) on or near a touch screen display of a device.

504 Scroll a list of items displayed on the touch screen display in a first direction (e.g., vertical or horizontal).

506 Scroll the list at a speed corresponding to a speed of movement of the object.

508 Scroll the list in accordance with a simulation of an equation of motion having friction.

510 Is a terminus of the list reached while scrolling the list in the first direction while the object is still detected on or near the touch screen display?

No → 512 Process Complete

Yes ↓

514 Display an area beyond the terminus of the list.

516 Display the area in white.

518 Display the area as visually indistinct from the background of the list.

520 After the object is no longer detected on or near the touch screen display, scroll the list in a second direction opposite the first direction until the area beyond the terminus of the list is no longer displayed.

522 Scroll the list using a damped motion.

524 Make the terminus of the list appear to be elastically attached to an edge of the touch screen display or to an edge displayed on the touch screen display.

Figure 5

LIST SCROLLING AND DOCUMENT TRANSLATION, SCALING, AND ROTATION ON A TOUCH-SCREEN DISPLAY

RELATED APPLICATIONS

This application is a continuation of U.S. patent application Ser. No. 15/483,743, "List Scrolling and Document Translation, Scaling, and Rotation on a Touch-Screen Display," filed Apr. 10, 2017, which is a continuation of U.S. patent application Ser. No. 14/624,518, "Device, Method and Graphical User Interface For Zooming In On A Touch-Screen Display," filed Feb. 17, 2015, which is a continuation of U.S. patent application Ser. No. 12/270,815, "Device, Method and Graphical User Interface For Zooming In On A Touch-Screen Display," filed Nov. 13, 2008, which is a continuation of U.S. patent application Ser. No. 11/956,969, "Device, Method and Graphical User Interface For Zooming In On A Touch-Screen Display," filed Dec. 14, 2007, which claims priority to U.S. Provisional Patent Application Nos. 60/937,993, "Portable Multifunction Device," filed Jun. 29, 2007; 60/946,971, "List Scrolling and Document Translation, Scaling, and Rotation on a Touch-Screen Display," filed Jun. 28, 2007; 60/945,858, "List Scrolling and Document Translation on a Touch-Screen Display," filed Jun. 22, 2007; 60/879,469, "Portable Multifunction Device," filed Jan. 8, 2007; 60/883,801, "List Scrolling and Document Translation on a Touch-Screen Display," filed Jan. 7, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to devices with touch-screen displays, and more particularly to scrolling lists and to translating, rotating, and scaling electronic documents on devices with touch-screen displays.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

As a result of the small size of display screens on portable electronic devices and the potentially large size of electronic files, frequently only a portion of a list or of an electronic document of interest to a user can be displayed on the screen at a given time. Users thus will frequently need to scroll displayed lists or to translate displayed electronic documents. Users also will need to rotate and to scale (i.e., magnify or de-magnify) displayed electronic documents. However, the limitations of conventional user interfaces can cause these actions to be awkward to perform.

Furthermore, scrolling displayed lists and translating electronic documents can be awkward on both portable and non-portable electronic devices with touch-screen displays. A user may become frustrated if the scrolling or translation does not reflect the user's intent. Similarly, a user may become frustrated if rotation and scaling of electronic documents does not reflect the user's intent.

Accordingly, there is a need for devices with touch-screen displays with more transparent and intuitive user interfaces for scrolling lists of items and for translating, rotating, and scaling electronic documents that are easy to use, configure, and/or adapt.

SUMMARY

The above deficiencies and other problems associated with user interfaces for portable devices and devices with touch-sensitive displays are reduced or eliminated by the disclosed device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In accordance with some embodiments, a computer-implemented method for use in conjunction with a device with a touch screen display is disclosed. In the method, a movement of an object on or near the touch screen display is detected. In response to detecting the movement, an electronic document displayed on the touch screen display is translated in a first direction. If an edge of the electronic document is reached while translating the electronic document in the first direction while the object is still detected on or near the touch screen display, an area beyond the edge of the document is displayed. After the object is no longer detected on or near the touch screen display, the document is translated in a second direction until the area beyond the edge of the document is no longer displayed.

In accordance with some embodiments, a graphical user interface on a device with a touch screen display is disclosed, comprising a portion of an electronic document displayed on the touch screen display and an area beyond an edge of the document. In the graphical user interface, in response to detecting a movement of an object on or near the touch screen display, the electronic document is translated in a first direction. If the edge of the electronic document is reached while translating the electronic document in the first direction while the object is still detected on or near the touch screen display, the area beyond the edge of the document is displayed. After the object is no longer detected on or near the touch screen display, the document is translated in a second direction until the area beyond the edge of the document is no longer displayed.

In accordance with some embodiments, a device is disclosed, comprising a touch screen display, one or more processors, memory, and one or more programs. The one or more programs are stored in the memory and configured to be executed by the one or more processors. The one or more programs include instructions for detecting a movement of an object on or near the touch screen display and instructions for translating an electronic document displayed on the touch screen display in a first direction, in response to detecting the movement. The one or more programs also include instructions for displaying an area beyond an edge of the electronic document if the edge of the electronic document is reached while translating the electronic document in the first direction while the object is still detected on or near the touch screen display. The one or more programs further include instructions for translating the document in a second direction until the area beyond the edge of the document is no longer displayed, after the object is no longer detected on or near the touch screen display.

In accordance with some embodiments, a computer-program product is disclosed, comprising a computer readable storage medium and a computer program mechanism embedded therein. The computer program mechanism comprises instructions, which when executed by a device with a touch screen display, cause the device to detect a movement of an object on or near the touch screen display and to translate an electronic document displayed on the touch screen display in a first direction, in response to detecting the movement. The instructions also cause the device to display an area beyond an edge of the electronic document if the edge of the electronic document is reached while translating the electronic document in the first direction while the object is still detected on or near the touch screen display. The instructions further cause the device to translate the document in a second direction until the area beyond the edge of the document is no longer displayed, after the object is no longer detected on or near the touch screen display.

In accordance with some embodiments, a device with a touch screen display is disclosed. The device comprises means for detecting a movement of an object on or near the touch screen display and means for translating an electronic document displayed on the touch screen display in a first direction, in response to detecting the movement. The device also comprises means for displaying an area beyond an edge of the electronic document if the edge of the electronic document is reached while translating the electronic document in the first direction while the object is still detected on or near the touch screen display. The device further comprises means for translating the document in a second direction until the area beyond the edge of the document is no longer displayed, after the object is no longer detected on or near the touch screen display.

In accordance with some embodiments, a computer-implemented method for use in conjunction with a device with a touch screen display is disclosed. In the method, a movement of an object on or near the touch screen display is detected. In response to detecting the movement, a list of items displayed on the touch screen display is scrolled in a first direction. If a terminus of the list is reached while scrolling the list in the first direction while the object is still detected on or near the touch screen display, an area beyond the terminus of the list is displayed. After the object is no longer detected on or near the touch screen display, the list is scrolled in a second direction opposite the first direction until the area beyond the terminus of the list is no longer displayed.

In accordance with some embodiments, a graphical user interface on a device with a touch screen display is disclosed, comprising a portion of a list of items displayed on the touch screen display and an area beyond a terminus of the list. In response to detecting a movement of an object on or near the touch screen display, the list is scrolled in a first direction. If the terminus of the list is reached while scrolling the list in the first direction while the object is still detected on or near the touch screen display, the area beyond the terminus of the list is displayed. After the object is no longer detected on or near the touch screen display, the list is scrolled in a second direction opposite the first direction until the area beyond the terminus of the list is no longer displayed.

In accordance with some embodiments, a device is disclosed, comprising a touch screen display, one or more processors, memory, and one or more programs. The one or more programs are stored in the memory and configured to be executed by the one or more processors. The one or more programs include instructions for detecting a movement of an object on or near the touch screen display and instructions for scrolling a list of items displayed on the touch screen display in a first direction in response to detecting the movement. The one or more programs also include instructions for displaying an area beyond a terminus of the list if the terminus of the list is reached while scrolling the list in the first direction while the object is still detected on or near the touch screen display. The one or more programs further include instructions for scrolling the list in a second direction opposite the first direction until the area beyond the terminus of the list is no longer displayed, after the object is no longer detected on or near the touch screen display.

In accordance with some embodiments, a computer-program product is disclosed, comprising a computer readable storage medium and a computer program mechanism embedded therein. The computer program mechanism comprises instructions, which when executed by a device with a touch screen display, cause the device to detect a movement of an object on or near the touch screen display and to scroll a list of items displayed on the touch screen display in a first direction in response to detecting the movement. The instructions also cause the device to display an area beyond a terminus of the list if the terminus of the list is reached while scrolling the list in the first direction while the object is still detected on or near the touch screen display. The instructions further cause the device to scroll the list in a second direction opposite the first direction until the area beyond the terminus of the list is no longer displayed, after the object is no longer detected on or near the touch screen display.

In accordance with some embodiments, a device with a touch screen display is disclosed. The device comprises means for detecting a movement of an object on or near the touch screen display and means for scrolling a list of items displayed on the touch screen display in a first direction in response to detecting the movement. The device also comprises means for displaying an area beyond a terminus of the list if the terminus of the list is reached while scrolling the list in the first direction while the object is still detected on or near the touch screen display. The device further comprises means for scrolling the list in a second direction opposite the first direction until the area beyond the terminus of the list is no longer displayed, after the object is no longer detected on or near the touch screen display.

In accordance with some embodiments, a computer-implemented method for use at a device with a touch screen display includes detecting a multifinger twisting gesture on or near the touch screen display. The multifinger twisting gesture has a corresponding degree of rotation. If the corresponding degree of rotation exceeds a predefined degree of rotation, a 90° screen rotation command is executed. If the corresponding degree of rotation is less than the predefined degree of rotation, a screen rotation command with an acute angle of rotation is executed and, upon ceasing to detect the multifinger twisting gesture, a screen rotation command with an angle of rotation opposite to the acute angle is executed.

In accordance with some embodiments, a device includes a touch screen display, one or more processors, memory, and one or more programs. The one or more programs are stored in the memory and configured to be executed by the one or more processors. The one or more programs include: instructions for detecting a multifinger twisting gesture on or near the touch screen display, wherein the multifinger twisting gesture has a corresponding degree of rotation; instructions for executing a 90° screen rotation command, if the corresponding degree of rotation exceeds a predefined degree of rotation; and instructions for executing a screen rotation command with an acute angle of rotation and for executing, upon ceasing to detect the multifinger twisting gesture, a screen rotation command with an angle of rotation opposite to the acute angle, if the corresponding degree of rotation is less than the predefined degree of rotation.

In accordance with some embodiments, a computer-program product includes a computer readable storage medium and a computer program mechanism embedded therein. The computer program mechanism includes instructions, which when executed by a device with a touch screen display, cause the device to: detect a multifinger twisting gesture on or near the touch screen display, wherein the multifinger twisting gesture has a corresponding degree of rotation; execute a 90° screen rotation command, if the corresponding degree of rotation exceeds a predefined degree of rotation; and execute a screen rotation command with an acute angle of rotation and, upon ceasing to detect the multifinger twisting gesture, execute a screen rotation command with an angle of rotation opposite to the acute angle, if the corresponding degree of rotation is less than the predefined degree of rotation.

In accordance with some embodiments, a device with a touch screen display includes: means for detecting a multifinger twisting gesture on or near the touch screen display, wherein the multifinger twisting gesture has a corresponding degree of rotation; means for executing a 90° screen rotation command, if the corresponding degree of rotation exceeds a predefined degree of rotation; and means for executing a screen rotation command with an acute angle of rotation and, upon ceasing to detect the multifinger twisting gesture, for executing a screen rotation command with an angle of rotation opposite to the acute angle, if the corresponding degree of rotation is less than the predefined degree of rotation.

In accordance with some embodiments, a computer-implemented method of displaying an electronic document having a document length and a document width, for use at a device with a touch screen display, includes displaying the electronic document at a first magnification and detecting a gesture on or near the touch screen display corresponding to a command to zoom out by a user-specified amount. In response to detecting the gesture, the electronic document is displayed at a magnification less than the first magnification. If the document length or document width is entirely displayed while the gesture is still detected on or near the touch screen display, the electronic document is displayed at a magnification wherein areas beyond opposite edges of the electronic document are displayed, and upon detecting termination of the gesture, the electronic document is displayed at a magnification wherein the areas beyond opposite edges of the electronic document are no longer displayed.

In accordance with some embodiments, a graphical user interface on a device with a touch screen display includes an electronic document having a document length and a document width, to be displayed on the touch screen display at multiple magnifications including a first magnification, and areas beyond opposite edges of the electronic document. In response to detecting a gesture on or near the touch screen display corresponding to a command to zoom out by a user-specified amount, wherein the gesture is detected while displaying the electronic document at the first magnification, the electronic document is displayed at a magnification less than the first magnification. If the document length or document width is entirely displayed while the gesture is still detected on or near the touch screen display, the electronic document is displayed at a magnification wherein the areas beyond opposite edges of the electronic document are displayed, and upon detecting termination of the gesture, the electronic document is displayed at a magnification wherein the areas beyond opposite edges of the electronic document are no longer displayed.

In accordance with some embodiments, a device includes a touch screen display, one or more processors, memory, and one or more programs. The one or more programs are stored in the memory and configured to be executed by the one or more processors. The one or more programs include: instructions for displaying an electronic document at a first magnification; instructions for detecting a gesture on or near the touch screen display corresponding to a command to zoom out by a user-specified amount; instructions for displaying the electronic document at a magnification less than the first magnification, in response to detecting the gesture;

instructions for displaying the electronic document at a magnification wherein areas beyond opposite edges of the electronic document are displayed, if a document length or a document width is entirely displayed while the gesture is still detected on or near the touch screen display; and instructions for displaying the electronic document at a magnification wherein the areas beyond opposite edges of the electronic document are no longer displayed, upon detecting termination of the gesture.

In accordance with some embodiments, a computer-program product includes a computer readable storage medium and a computer program mechanism embedded therein. The computer program mechanism includes instructions, which when executed by a device with a touch screen display, cause the device to: display an electronic document at a first magnification; detect a gesture on or near the touch screen display corresponding to a command to zoom out by a user-specified amount; display the electronic document at a magnification less than the first magnification, in response to detecting the gesture; display the electronic document at a magnification wherein areas beyond opposite edges of the electronic document are displayed, if a document length or a document width is entirely displayed while the gesture is still detected on or near the touch screen display; and display the electronic document at a magnification wherein the areas beyond opposite edges of the electronic document are no longer displayed, upon detecting termination of the gesture.

In accordance with some embodiments, a device with a touch screen display includes: means for displaying an electronic document at a first magnification; means for detecting a gesture on or near the touch screen display corresponding to a command to zoom out by a user-specified amount; means for displaying the electronic document at a magnification less than the first magnification, in response to detecting the gesture; means for displaying the electronic document at a magnification wherein areas beyond opposite edges of the electronic document are displayed, if a document length or a document width is entirely displayed while the gesture is still detected on or near the touch screen display; and means for displaying the electronic document at a magnification wherein the areas beyond opposite edges of the electronic document are no longer displayed, upon detecting termination of the gesture.

In accordance with some embodiments, a computer-implemented method of displaying an electronic document, for use at a device with a touch screen display, includes displaying at least a first portion of the electronic document at a first magnification and detecting a gesture on or near the touch screen display corresponding to a command to zoom in by a user-specified amount. In response to detecting the gesture, decreasing portions of the electronic document are displayed at increasing magnifications. Upon detecting termination of the gesture, if the magnification exceeds a predefined magnification, a respective portion of the electronic document is displayed at the predefined magnification.

In accordance with some embodiments, a graphical user interface on a device with a touch screen display includes decreasing portions of an electronic document, to be displayed on the touch screen display at increasing magnifications. The decreasing portions of the electronic document include a first portion. In response to detecting a gesture on or near the touch screen display corresponding to a command to zoom in by a user-specified amount, wherein the gesture is detected while displaying at least the first portion of an electronic document at a first magnification, the decreasing portions of the electronic document are displayed at the increasing magnifications. Upon detecting termination of the gesture, if the magnification exceeds a predefined magnification, a respective portion of the electronic document is displayed at the predefined magnification.

In accordance with some embodiments, a device includes a touch screen display, one or more processors, memory, and one or more programs. The one or more programs are stored in the memory and configured to be executed by the one or more processors. The one or more programs include: instructions for displaying at least a first portion of an electronic document at a first magnification; instructions for detecting a gesture on or near the touch screen display corresponding to a command to zoom in by a user-specified amount; instructions for displaying decreasing portions of the electronic document at increasing magnifications, in response to detecting the gesture; and instructions for displaying a respective portion of the electronic document at a predefined magnification if, upon detecting termination of the gesture, the magnification exceeds the predefined magnification.

In accordance with some embodiments, a computer-program product includes a computer readable storage medium and a computer program mechanism embedded therein. The computer program mechanism includes instructions, which when executed by a device with a touch screen display, cause the device to: display at least a first portion of an electronic document at a first magnification; detect a gesture on or near the touch screen display corresponding to a command to zoom in by a user-specified amount; display decreasing portions of the electronic document at increasing magnifications, in response to detecting the gesture; and display a respective portion of the electronic document at a predefined magnification if, upon detecting termination of the gesture, the magnification exceeds a predefined magnification.

In accordance with some embodiments, a device with a touch screen display includes means for displaying at least a first portion of an electronic document at a first magnification; means for detecting a gesture on or near the touch screen display corresponding to a command to zoom in by a user-specified amount; means for displaying decreasing portions of the electronic document at increasing magnifications, in response to detecting the gesture; and means for displaying a respective portion of the electronic document at a predefined magnification if, upon detecting termination of the gesture, the magnification exceeds the predefined magnification.

The disclosed embodiments provide for easy and intuitive scrolling of lists and translating of electronic documents on a device with a touch screen display, and for easy and intuitive rotation and scaling of electronic documents on a device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 5 is a flow diagram illustrating a method of scrolling through a list in accordance with some embodiments.

DESCRIPTION OF EMBODIMENTS

Figure 1:
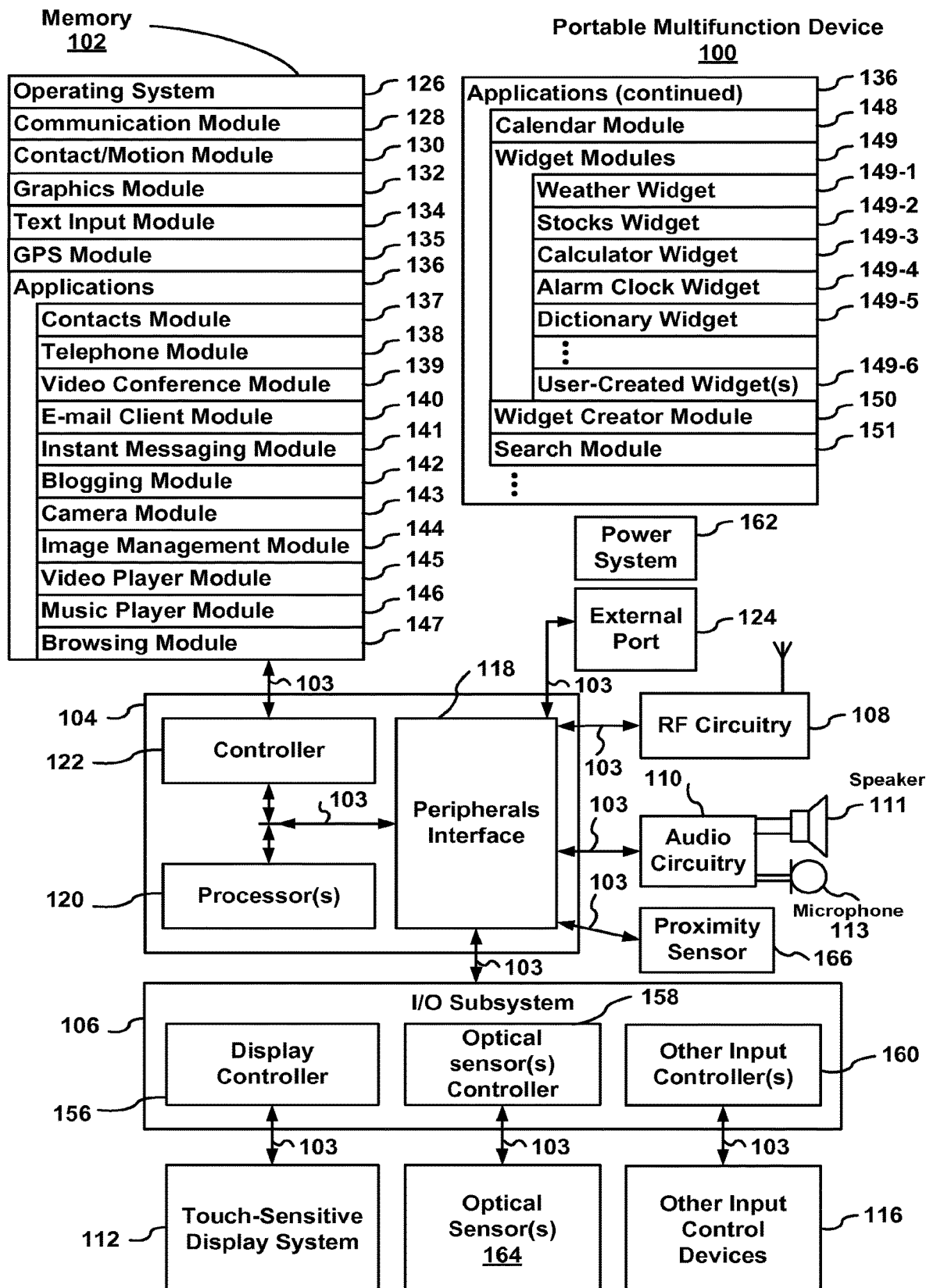
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference herein in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the display system 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference herein in its entirety. A longer press of the push button (e.g., 206) may turn power to the device 100 on or off The user may be able to customize a functionality of one or more of the buttons. The touch screen 112 is used to implement virtual or soft buttons and one or more soft keyboards.

The touch-sensitive display system 112 provides an input interface and an output interface between the device and a user. The display controller 156 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 156 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference herein in their entirety. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen in the display system 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the display system 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the display system 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen in the display system 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 detects movement of one or more objects on or near the touch screen and/or the touchpad. In some embodiments, the contact/motion module 130 and the controller 160 detects contact on a click wheel 116.

The graphics module 132 includes various known software components for rendering and displaying graphics on the display system 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with display system 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, display system 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, display system 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, display system 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, display system 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, display system 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with display system 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with display system 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with display system 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with display system 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, display system 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, display system 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, display system 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, display system 112, display system controller 156, contact module 130, graphics module 132, text input module 134, and browser module 147, the widget creator module 150 may be used by a user to create widgets (e.g., turning a user-specified portion of a web page into a widget).

In conjunction with display system 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen in the display system 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad includes navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
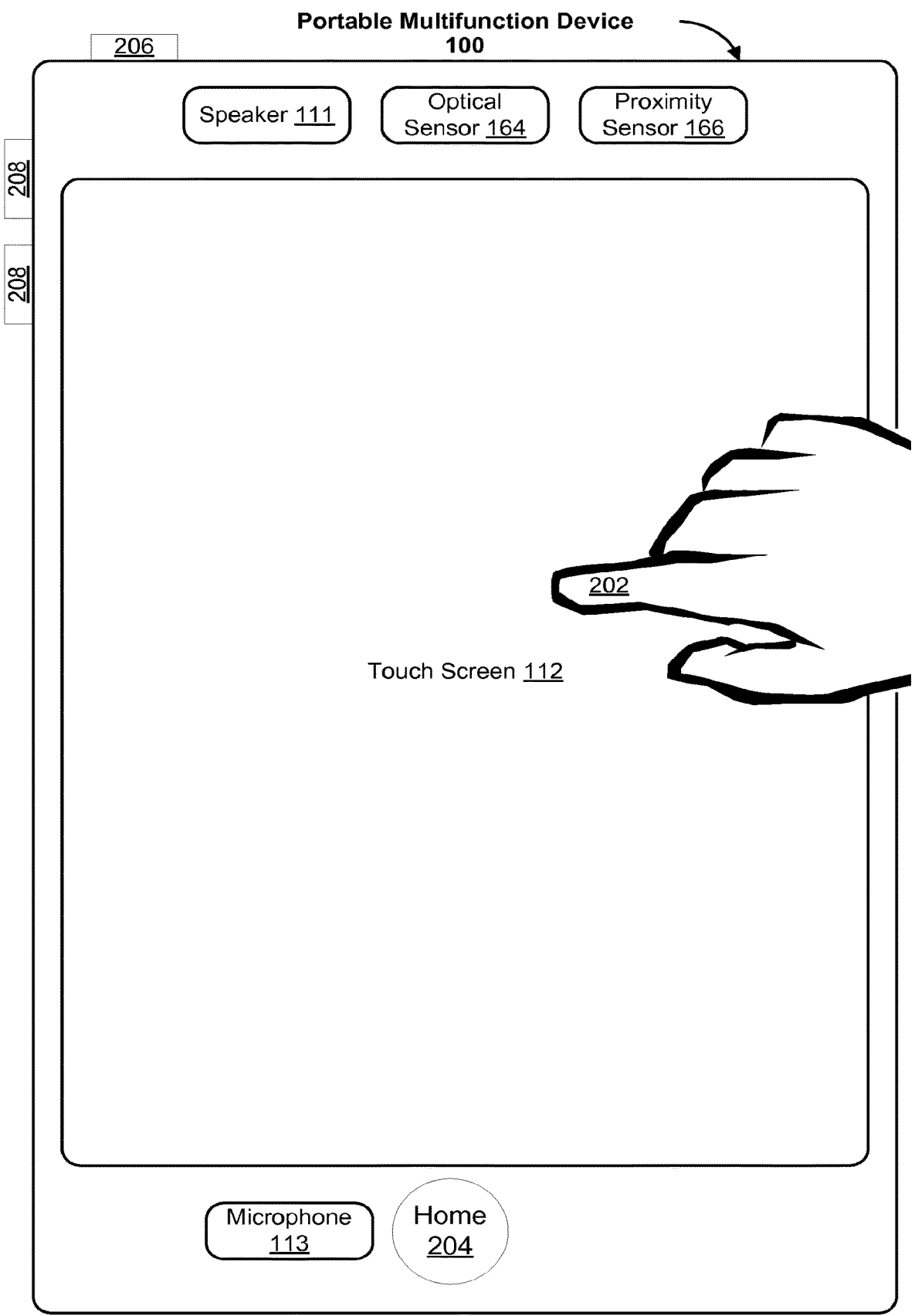
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 17:
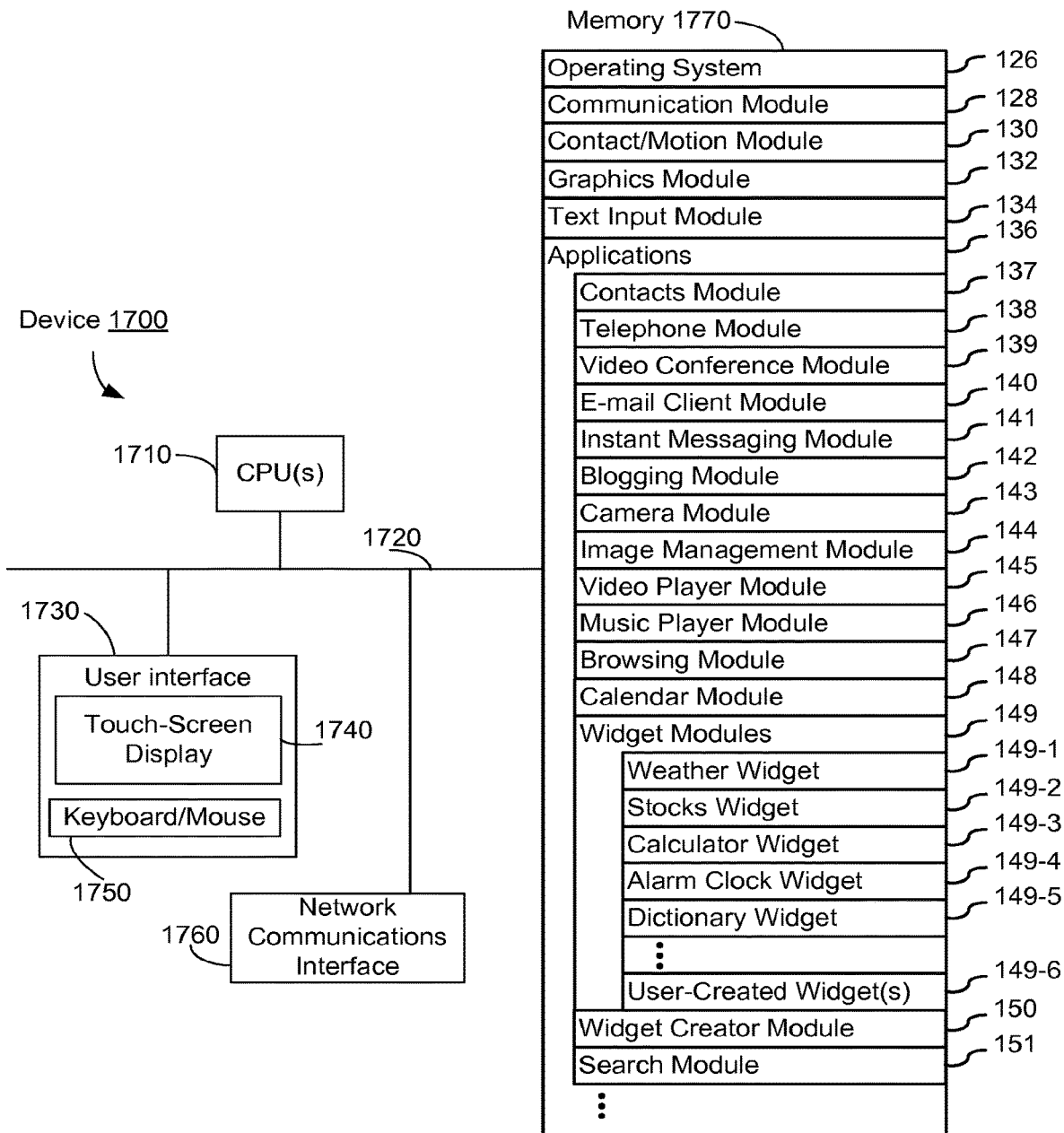
FIG. 17 is a block diagram illustrating a device with a touch-screen display in accordance with some embodiments.

Attention is now directed towards embodiments of user interfaces ("UI") and associated processes that may be implemented on a portable multifunction device 100 and/or on a device 1700 with a touch-screen display (FIG. 17).

Figure 3:
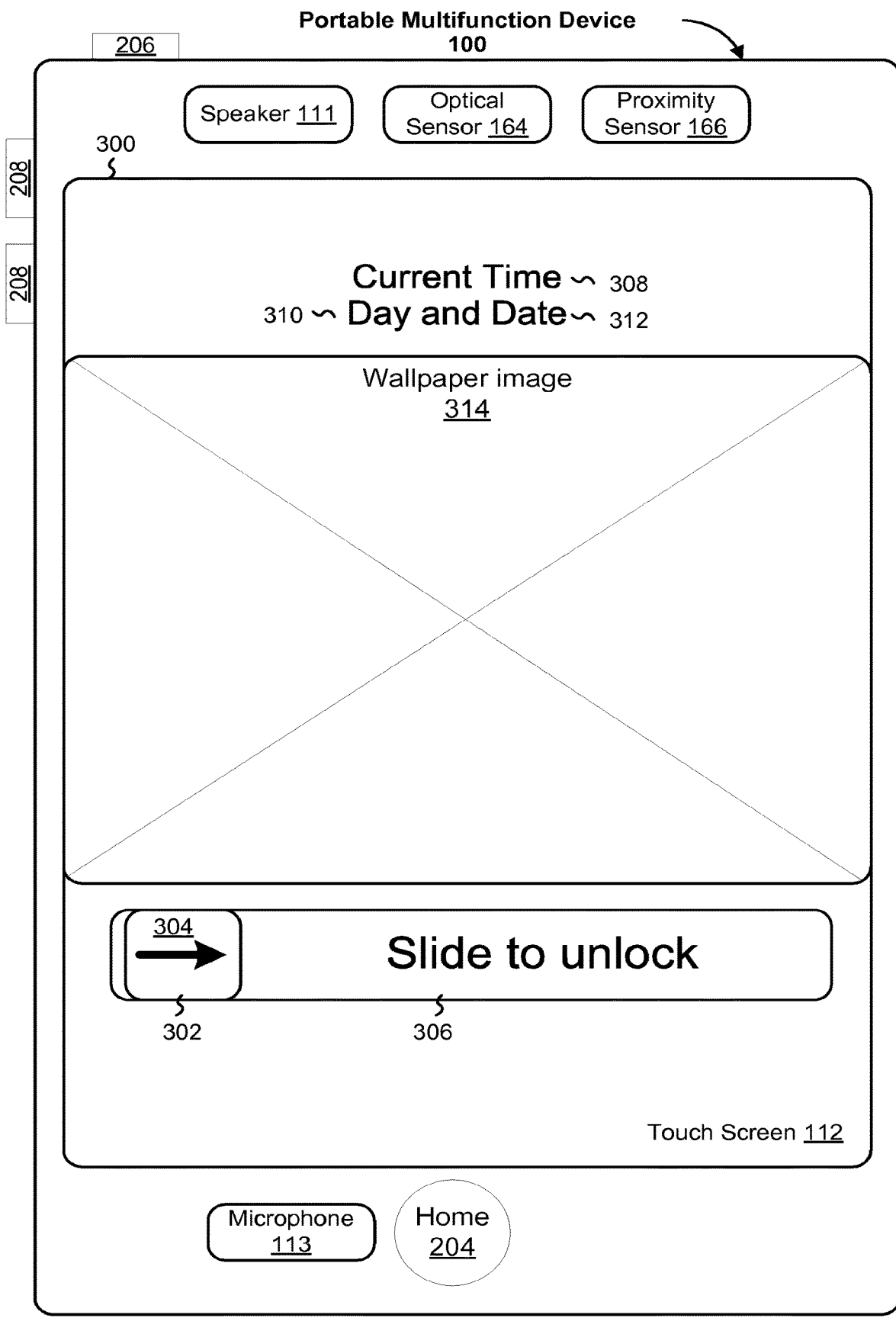
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference herein in its entirety.

Figure 4:
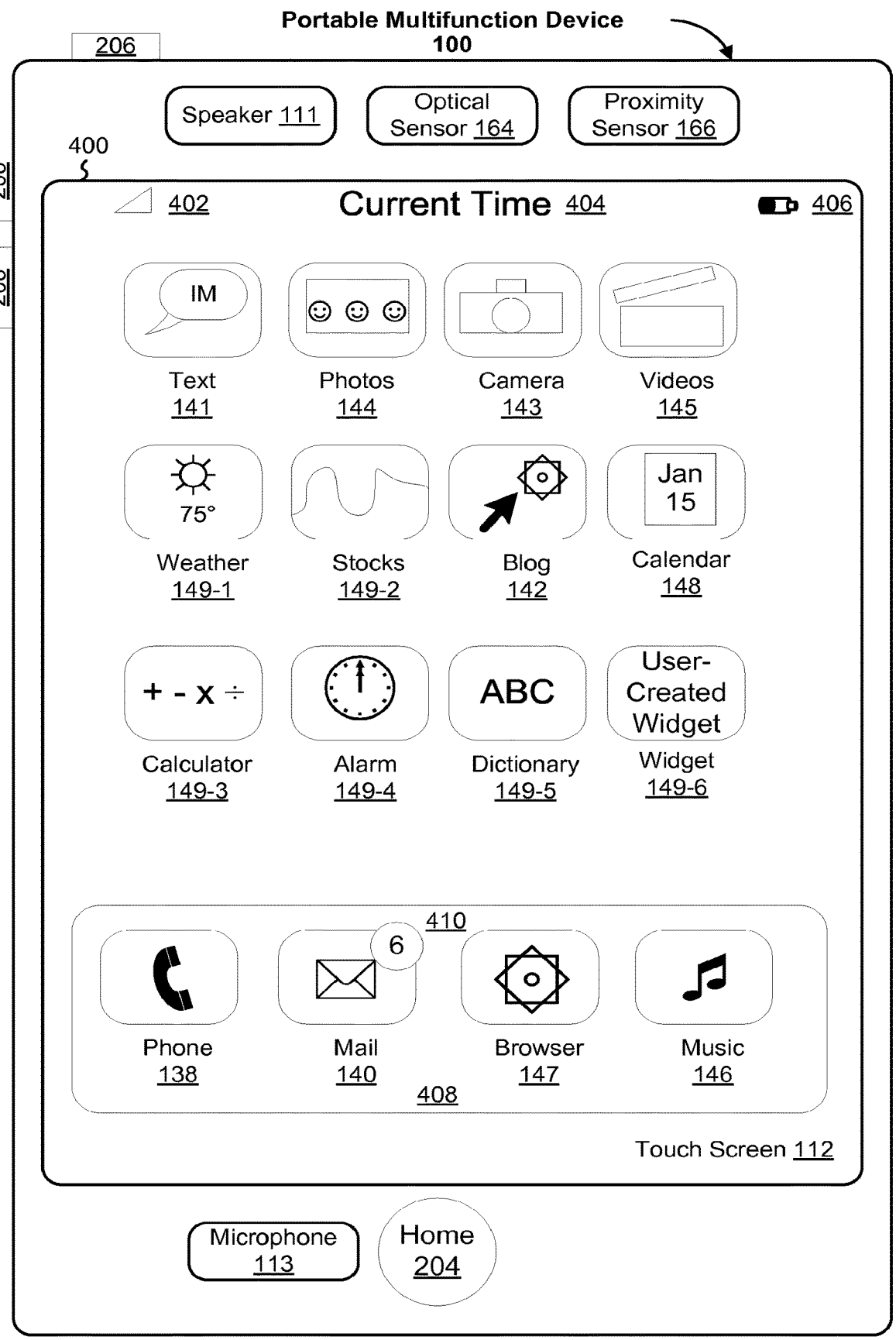
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as one or more of the following:
Phone 138;
E-mail client 140, which may include an indicator 410 of the number of unread e-mails;
Browser 147; and
Music player 146; and
Icons for other applications, such as one or more of the following:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, UI 400 displays all of the available applications 136 on one screen so that there is no need to scroll through a list of applications (e.g., via a scroll bar or via a swipe gesture). In some embodiments, as the number of applications increases, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference herein in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference herein in its entirety.

As discussed above, UI 400 may display all of the available applications 136 on one screen so that there is no need to scroll through a list of applications. However, in some embodiments a touch-sensitive display may include a GUI with one or more windows that display only a portion of a list of items (e.g., information items) or of an electronic document. In response to detecting a movement of an object on or near the touch-sensitive display, the list may be scrolled or the electronic document may be translated. Detecting the movement of the object may include determining speed (magnitude), velocity (magnitude and direction), and/or an acceleration (including magnitude and/or direction) of the object. Scrolling through the list or translating the document may be accelerated in response to an accelerated movement of the object. In some embodiments, the scrolling and acceleration of the scrolling, or translation and acceleration of the translation, may be in accordance with a simulation of a physical device having friction, i.e., damped motion. For example, the scrolling or translation may correspond to a simulation of a force law or equation of motion having a mass or inertial term, as well as a dissipative term. In some embodiments, the simulation may correspond to a cylinder rotating about its axis.

In some embodiments, accelerated movement of the detected object may include an accelerated movement of a point of contact followed by a breaking of the point of contact. For example, the user may make contact with the touch-sensitive display, swipe or sweep one or more of his or her fingers along the display (i.e., move and/or accelerate the point of contact), and optionally, break the point of contact with the display, i.e., move the one or more fingers away from the display. The swipe or sweep may be along a predefined axis of the touch-sensitive display or may be within a predetermined angle of a predefined direction on the touch-sensitive display. In other embodiments, the accelerated movement of the point of contact may include a first user gesture oriented along a predefined axis of the touch-sensitive display or oriented within a predetermined angle of a predefined direction on the touch-sensitive display.

Scrolling through the list of items or translating the electronic document may be further accelerated in response to detection of a second movement of an object on or near the touch-sensitive display, such as a second sweeping motion of the point of contact along the predefined axis or within the predetermined angle of a predefined direction on the touch-sensitive display and/or a second user gesture oriented along the predefined axis or within the predetermined angle of a predefined direction on the touch-sensitive display. For example, the user may swipe one or more of his or her fingers along the touch-sensitive display two or more times.

The scrolling through the list of items or the translation of the electronic document may be stopped in accordance with the user breaking the point of contact and then establishing a substantially stationary point of contact with the touch-sensitive display for at least a pre-determined period of time. For example, after swiping one or more of his or her fingers along the touch-sensitive display and breaking the point of contact, the user may touch the display and hold the one or more fingers that are touching the display stationary (or approximately stationary) for one or more seconds, or fractions of a second.

The direction of scrolling or translation may be reversed in response to intersecting a virtual boundary corresponding to a terminus of the list or an edge of the electronic document. The scrolling reversal or translation reversal may correspond to a damped motion. For example, during scrolling, a displayed portion of the list of items may appear to bounce off of a boundary of the window in the touch-sensitive display when a beginning or an end of the list of items is reached. Similarly, during translation, a displayed portion of the electronic document may appear to bounce off of a boundary of the window in the touch-sensitive display when an edge of the document is reached. The apparent bounce may correspond to a simulation of a viscous or elastic ball having momentum in a first direction striking an immovable and/or inelastic object, such as a wall. The subsequent motion of the document (the motion of which corresponds to the ball in the aforementioned analogy) may be damped, for example, by including a friction or dissipative term in the simulation. A parameter corresponding to the friction term in the simulation may be adjustable, allowing the document to reach equilibrium in contact with the virtual boundary, or displaced from the virtual boundary.

In some embodiments movement of the point of contact by the user over an index on the touch-sensitive display may be determined. In some embodiments, the index may be displayed in a first region or a first window of the touch-sensitive display while the list of items or information items during the scrolling may be displayed in a second region or a second window of the touch-sensitive display. The displayed index may have a sequence of index items. In an exemplary embodiment, the sequence of index items may include letters in the alphabet, i.e., the index may include an alphabetical index. The list of information items may include an alphabetically ordered list of information items. The alphabetically ordered list of information items may include contact information, for example, in a user's contact list or address book.

In response to movement of the user's point of contact over a displayed index, the list of information items on the touch-sensitive display may be scrolled. The list of information items may include a sequence of information item subsets corresponding to the sequence of index items. The subsets may include one or more categories. For example, a respective category may include contact information for one or more individuals whose first and/or last names begin with one or more respective letters, such as the letter 's'. In an exemplary embodiment, there is a subset corresponding to each letter in the alphabet that has one or more entries. In some embodiments, the scrolling may be in accordance with a simulation of an equation of motion having friction.

The scrolling may include scrolling through a respective information item subset if the point of contact moves over a corresponding respective index item in the index items. The scrolling may have an associated scroll speed based on a speed of movement of the point of contact over the respective index item and the number of items in the information item subset corresponding to the respective index item. For example, the scroll speed may be faster for subsets that have more entries than subsets with fewer entries. The scrolling may include scrolling through all items in a plurality of the information item subsets in response to the point of contact moving over the corresponding index items in the displayed index.

If it is determined that the point of contact with the index corresponds to a respective index item in the index, the list of information items may be scrolled to a corresponding subset of the list of information items. For example, if the user selects an index item, such as the letter a', in the set of index symbols, the list of items may be smoothly scrolled to the corresponding subset for the letter 'R' in the list of items. Alternatively, the displayed list of information items jump directly from a current scroll position to a scroll position in which information items corresponding to the index item 'R' are displayed.

In the present document, the term "if" may be construed to mean "when," or "upon," or "in response to determining," or "in response to detecting," depending on the context Similarly, the phrase "if it is determined" or "if [a stated condition or event] is detected" may be construed to mean "upon determining" or "in response to determining" or "upon detecting" the stated condition or event, or "in response to detecting" the stated condition or event, depending on the context.

If the point of contact with the touch-sensitive display corresponds to a user selection of a respective information item in the list of information items, information corresponding to the respective information item may be displayed on the touch-sensitive display. For example, if the user selects a respective name, the corresponding contact information may be displayed.

While scrolling through respective information subsets, an index symbol may displayed in conjunction with each respective information item subset. In some embodiments, respective index symbols may be displayed adjacent to corresponding subsets (such as displayed text) of the list of information items. In some embodiments, a respective index symbol may be displayed at an upper edge of a window containing the displayed text of the respective information item subset.

The index symbol corresponding to a respective information subset may be translucently displayed over the respective information item subset. The translucently displayed index symbol may have a different font color than that used to display text in the information item subset, and/or it may be displayed using a larger font than the font used to display text in the information item subset.

If the list of information items contains no items for a particular index symbol, i.e., no entries for a particular subset, a first index symbol preceding a particular index symbol and a second index symbol following the index symbol may be displayed in conjunction with scrolling through the list of information items from the information subset corresponding to the first index symbol to the information subset corresponding to the second index symbol. The particular index symbol may not be displayed in conjunction with the displayed text of the list of information items during the scroll through. For example, display of a respective index symbol may be skipped when the list of information items contains no items for the particular index symbol.

In some embodiments, the list scrolling described here operates without displaying a scroll bar. Similarly, in some embodiments, the translation of electronic documents described here operates without displaying scroll bars. The user's sweeping motion on the touch-sensitive display operation may be performed directly on top of the displayed list or displayed electronic document, and may include a sweeping or gliding motion, near or in contact with the display's surface, along a path anywhere within a display window in which the list or electronic document is displayed. While a scroll bar could potentially be displayed in conjunction with the displayed list, the scrolling or translation described here can be independent of any such scroll bar. In some embodiments, if a scroll bar is used, then an upward movement of a point of contact on the scroll bar may cause earlier entries in the list to be displayed, whereas a downward movement of the point of contact on the scroll bar may cause later entries in the list to be displayed.

In some embodiments, scrolling or translation may be in accordance with a speed of movement of a detected object, such as a speed of movement of a point of contact. The speed may be a time average of values determined during several time intervals. In an exemplary embodiment, the speed, velocity and/or acceleration may be determined over five time intervals, where a respective time interval corresponds to an inverse of a frame rate, such as 0.0167 s, of a display. In some embodiments, the speed, velocity and/or acceleration may be determined even when a variable frame rate is used, such as when one or more frames are skipped or not displayed. In these embodiments, the speed, velocity, and/or acceleration may be determined two or more times for the respective time interval and/or may be projected based on values determined in a preceding and/or a subsequent time interval.

In some embodiments, the scrolling or translation after a user optionally breaks the contact may be in accordance with the change in the acceleration and the speed or the velocity in one or more time intervals prior to the breaking of the contact. For example, the velocity $v_f$ of scrolling or translation one or more time intervals after breaking contact may be determined using $$v_f = v_o + a\Delta t,$$

where $v_o$ is a current value of the velocity when the contact is broken, a is a current value of the acceleration when the contact is broken and $\Delta t$ is an elapsed time, such as one time interval. The velocities and/or acceleration in such a calculation may be projected along an axis or direction of the scrolling or translation. In some embodiments, in subsequent time intervals following the determination of the velocity based on the acceleration and/or the velocity in one or more time intervals prior to the breaking of the contact, the velocity of the scrolling or translation may be tapered. For example, in each successive time interval the velocity may be decreased by 5%. When the velocity crosses a lower threshold, it may be set to zero.

FIG. 5 is a flow diagram illustrating a method 500 of scrolling through a list in accordance with some embodiments. The method 500 provides a simple visual indicator to a user that a terminus of a list has been reached.

Movement of an object is detected on or near a touch screen display of a device (502). In some embodiments, the object is a finger. In some embodiments, the device is a portable multifunction device.

In response to detecting the movement, a list of items displayed on the touch screen display is scrolled in a first direction (504). In some embodiments, the list is a list of email messages, as illustrated in FIGS. 6A-6D. In some embodiments, the list of items is a list of instant message conversations, a list of favorite phone numbers, a list of contact information (sometimes called a contact list or address book list), a list of labels, a list of email folders, a list of email addresses, a list of physical addresses, a list of ringtones, a list of album names, or a list of bookmarks. In some embodiments, the first direction is a vertical direction; in some other embodiments, the first direction is a horizontal direction. In some embodiments, scrolling the list in the first direction prior to reaching a terminus of the list has an associated scrolling speed corresponding to a speed of movement of the object (506). In some embodiments, the list is scrolled in accordance with a simulation of an equation of motion having friction (508).

If a terminus of the list is reached (e.g., upon reaching the terminus of the list) while scrolling the list in the first direction while the object is still detected on or near the touch screen display, an area beyond the terminus of the list is displayed (510—Yes, 514). In some embodiments, the list has a first item and a last item and the terminus is either the first item or the last item. For example, in FIG. 6B the email 3534 from Aaron Jones is the first item and thus the terminus of the corresponding list of emails. In some embodiments, the area beyond the terminus of the list is white (516). In some embodiments, the list of items has a background and the area beyond the terminus of the list is visually indistinct from the background (518). For example, in FIG. 6C both the area 3536 and the background of the listed emails are white.

After the object is no longer detected on or near the touch screen display, the list of items is scrolled in a second direction opposite the first direction until the area beyond the terminus of the list is no longer displayed (520). In some embodiments, the list is scrolled in the second direction using a damped motion (522). In some embodiments, the change from scrolling the list in the first direction to scrolling the list in the second direction until the area beyond the terminus of the list is no longer displayed makes the terminus of the list appear to be elastically attached to an edge of the touch screen display or to an edge displayed on the touch screen display (524).

In some embodiments, scrolling in the first direction prior to reaching the terminus of the list has a first associated scrolling distance that corresponds to a distance of movement of the object prior to reaching the terminus of the list. For example, a scrolling distance prior to reaching the terminus of the list shown in FIGS. 6A-6D may correspond to a distance traversed on the touch screen display by the swipe gesture 3514 before the terminus is reached. Displaying an area beyond the terminus of the list includes scrolling the list in the first direction for a second associated scrolling distance that is less than a distance of movement of the object after the terminus is reached. For example, in FIG. 6C, after the terminus is reached the list is scrolled for a distance 3538, which may be less than a distance traversed on the touch screen display by the swipe gesture 3514 after the terminus is reached.

In some embodiments, scrolling in the first direction prior to reaching a terminus of the list has a first associated scrolling speed that corresponds to a speed of movement of the object. For example, a scrolling speed prior to reaching the terminus of the list shown in FIGS. 6A-6D may correspond to a speed on the touch screen display of the swipe gesture 3514 before the terminus is reached. Displaying an area beyond the terminus of the list includes scrolling the list in the first direction at a second associated scrolling speed. The second associated scrolling speed is slower than the first associated scrolling speed. For example, in FIG. 6C, displaying the area 3536 beyond the terminus of the list may include scrolling the list at a speed that is slower than the scrolling speed before the terminus is reached. In some embodiments, the second associated speed is a fraction (e.g., one-half or one-third) of the first associated speed. In some embodiments, the second associated speed is the square root of the first associated speed.

If a terminus of the list is not reached while scrolling the list in the first direction while the object is still detected on or near the touch screen display, the process 500 is complete (510—No, 512). The process 500 may be re-initiated upon subsequent detection of another movement of an object on or near the touch screen display (502).

FIGS. 6A-6D illustrate the scrolling of a list of items to a terminus of the list, at which point an area beyond the terminus is displayed and the list is then scrolled in an opposite direction until the area beyond the terminus is no longer displayed, in accordance with some embodiments. While FIGS. 6A-6D illustrate this scrolling in the context of a portable multifunction device 100, this scrolling is not limited to portable multifunction devices. In the example of FIGS. 6A-6D, the listed items are email messages; FIGS. 6A-6D illustrate an exemplary user interface 3500A for managing an inbox in accordance with some embodiments. An analogous user interface may be used to display and manage other mailboxes (e.g., drafts, sent, trash, personal, etc.). In addition, other types of lists are possible, including but not limited to lists of instant message conversations, favorite phone numbers, contact information, labels, email folders, email addresses, physical addresses, ringtones, album names or bookmarks.

Figure 6A:
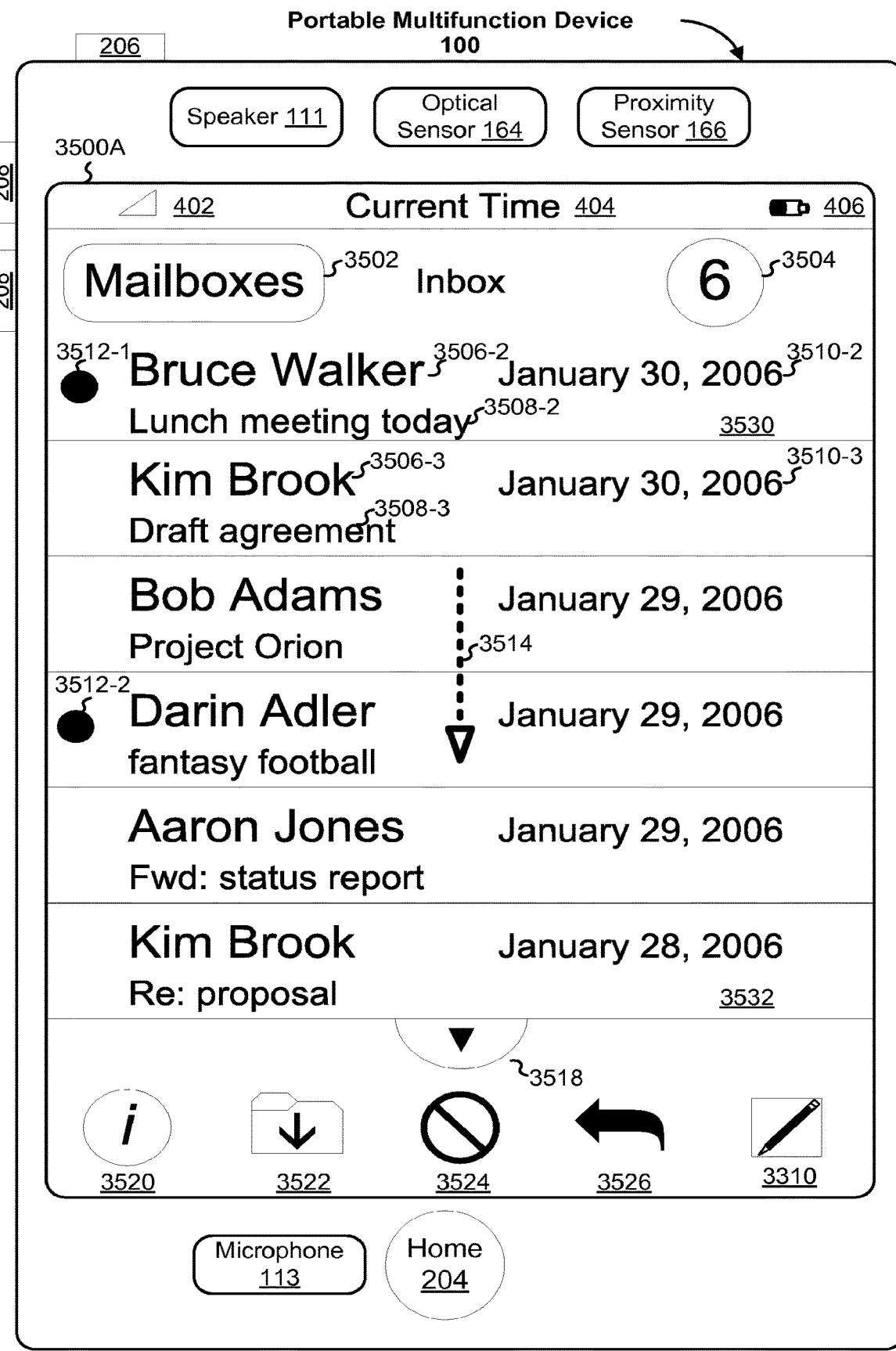
FIGS. 6A-6D illustrate an exemplary user interface for managing an inbox in accordance with some embodiments.

In some embodiments, user interface 3500A include the following elements, or a subset or superset thereof:

- 402, 404, and 406, as described above;
- a create email icon 3310 that when activated (e.g., by a finger tap on the icon) initiates display of a UI to create a new email message;
- mailboxes icon 3502 that when activated (e.g., by a finger tap on the icon) initiates the display of a UI listing email mailboxes (i.e., folders);
- unread messages icon 3504 that displays the number of unread messages in the inbox;
- names 3506 of the senders of the email messages;
- subject lines 3508 for the email messages;
- dates 3510 of the email messages;
- unread message icons 3512 that indicate messages that have not been opened;
- preview pane separator 3518 that separates the list of messages from a preview of a selected message in the list;
- settings icon 3520 that when activated (e.g., by a finger tap on the icon) initiates the display of a UI to modify settings;
- move message icon 3522 that when activated (e.g., by a finger tap on the icon) initiates the display of a UI to move messages;
- Delete symbol icon 3524 that when activated (e.g., by a finger tap on the icon) initiates display of a UI to confirm that the user wants to delete the selected email;
- Reply/Forward icon 3526 that when activated (e.g., by a finger tap on the icon) initiates display of a UI to select how to reply or forward the selected email;

If the list of emails fills more than the allotted screen area, the user may scroll through the emails using vertically upward and/or vertically downward swipe gestures on the touch screen. In the example of FIG. 6A, a portion of a list of emails is displayed in the screen area, including a top displayed email 3530 from Bruce Walker and a bottom displayed email 3532 from Kim Brook. A user performs a vertically downward swipe gesture 3514 to scroll toward the top of the list. The vertically downward gesture 3514, which may be a finger gesture, corresponds to the movement of an object on or near the touch screen that is detected in operation 502 of process 500 (FIG. 5). The vertically downward gesture 3514 need not be exactly vertical; a substantially vertical gesture is sufficient. In some embodiments, a gesture within a predetermined angle of being perfectly vertical results in vertical scrolling. In one embodiment, a gesture within 27 degrees of being perfectly vertical results in vertical scrolling.

Figure 6B:
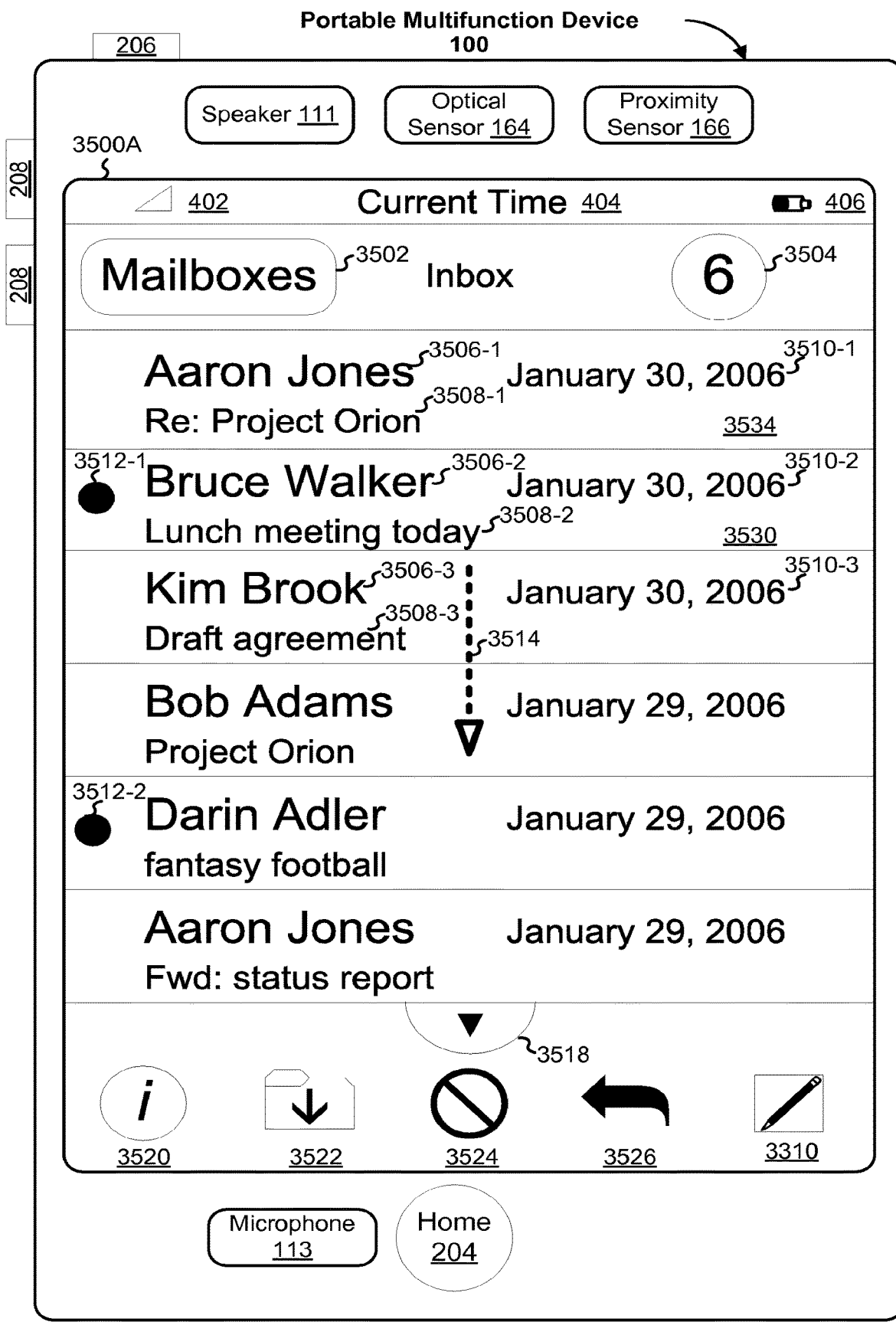

As a result of detecting the vertically downward gesture 3514, in FIG. 6B the displayed emails have shifted down, such that the previous bottom displayed email 3532 from Kim Brook is no longer displayed, the previous top displayed email 3530 from Bruce Walker is now second from the top, and the email 3534 from Aaron Jones, which was not displayed in FIG. 6A, is now displayed at the top of the list. This shifting of emails is an example of the scrolling described in operation 504 of process 500 (FIG. 5).

Figure 6C:
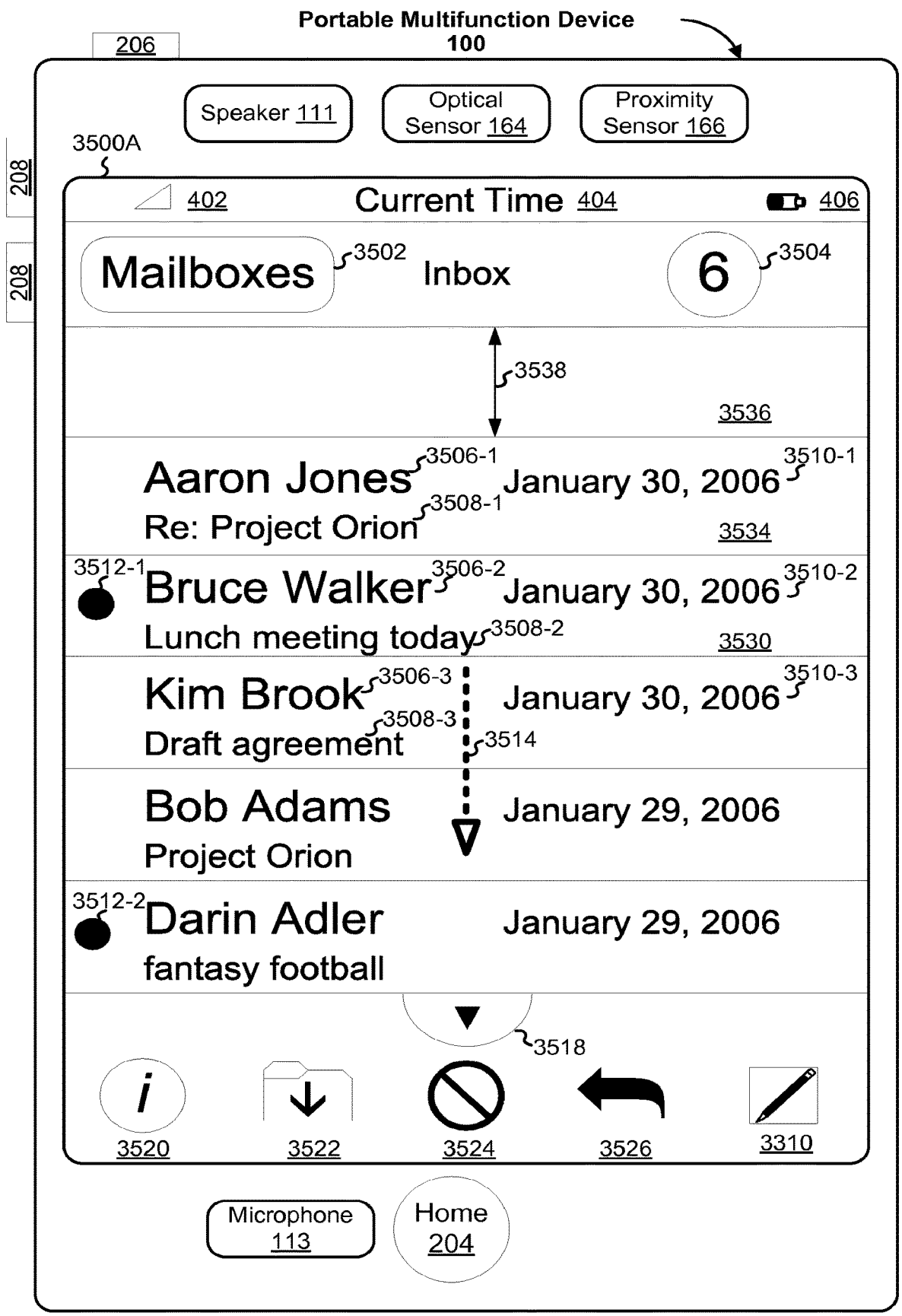

In this example, the email 3534 from Aaron Jones is the first email in the list and thus is the terminus of the list. Upon reaching this email 3534, in response to continued detection of the vertically downward gesture 3514, an area 3536 (FIG. 6C) above the first email 3534 (i.e., beyond the terminus of the list) is displayed, as described in operation 514 of process 500 (FIG. 5). In some embodiments, the area displayed beyond the terminus of the list is visually indistinct from the background of the list, as described in operation 518 of process 500 (FIG. 5). In FIG. 6C, both the area 3536 and the background of the emails (e.g., emails 3534 and 3530) are white and thus are visually indistinct.

Figure 6D:
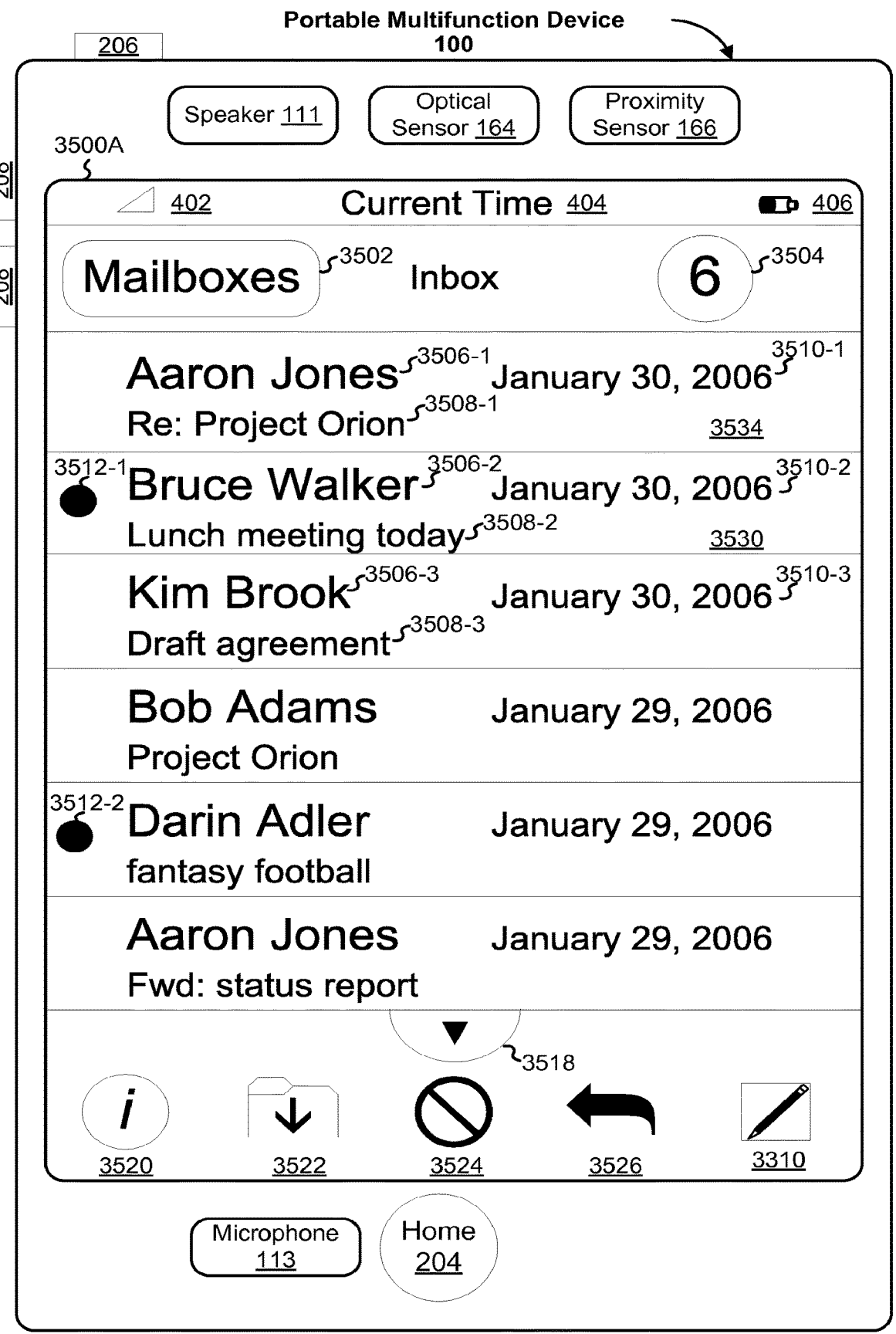

Once vertically downward gesture 3514 is complete, such that a corresponding object is no longer detected on or near the touch screen display, the list is scrolled in an opposite direction until the area 3536 is no longer displayed. FIG. 6D illustrates the result of this scrolling in the opposite direction, which corresponds to operation 520 of process 500 (FIG. 5): the email 3534 from Aaron Jones is now displayed at the top of the screen area allotted to the list and the area 3536 is not displayed.

In the example of FIGS. 6A-6D, a vertically downward gesture resulted in display of an area beyond the first item in the list. Similarly, a vertically upward gesture may result in display of an area beyond the last item of the list, if the vertically upward gesture continues once the list has been scrolled to the last item. The last item may be considered a terminus of the list, similar to the first item. As discussed above, the gesture need not be exactly vertical to result in vertical scrolling; a gesture within a predefined range of angles from perfectly vertical is sufficient.

In some embodiments, instead of scrolling a list of items in one dimension, a user may desire to translate an electronic document in two dimensions. If the electronic document fills more than the screen area allotted to display the document, the screen will only display a portion of the document. The user may translate the electronic document to view portions of the document that are not initially displayed.

Figure 7:
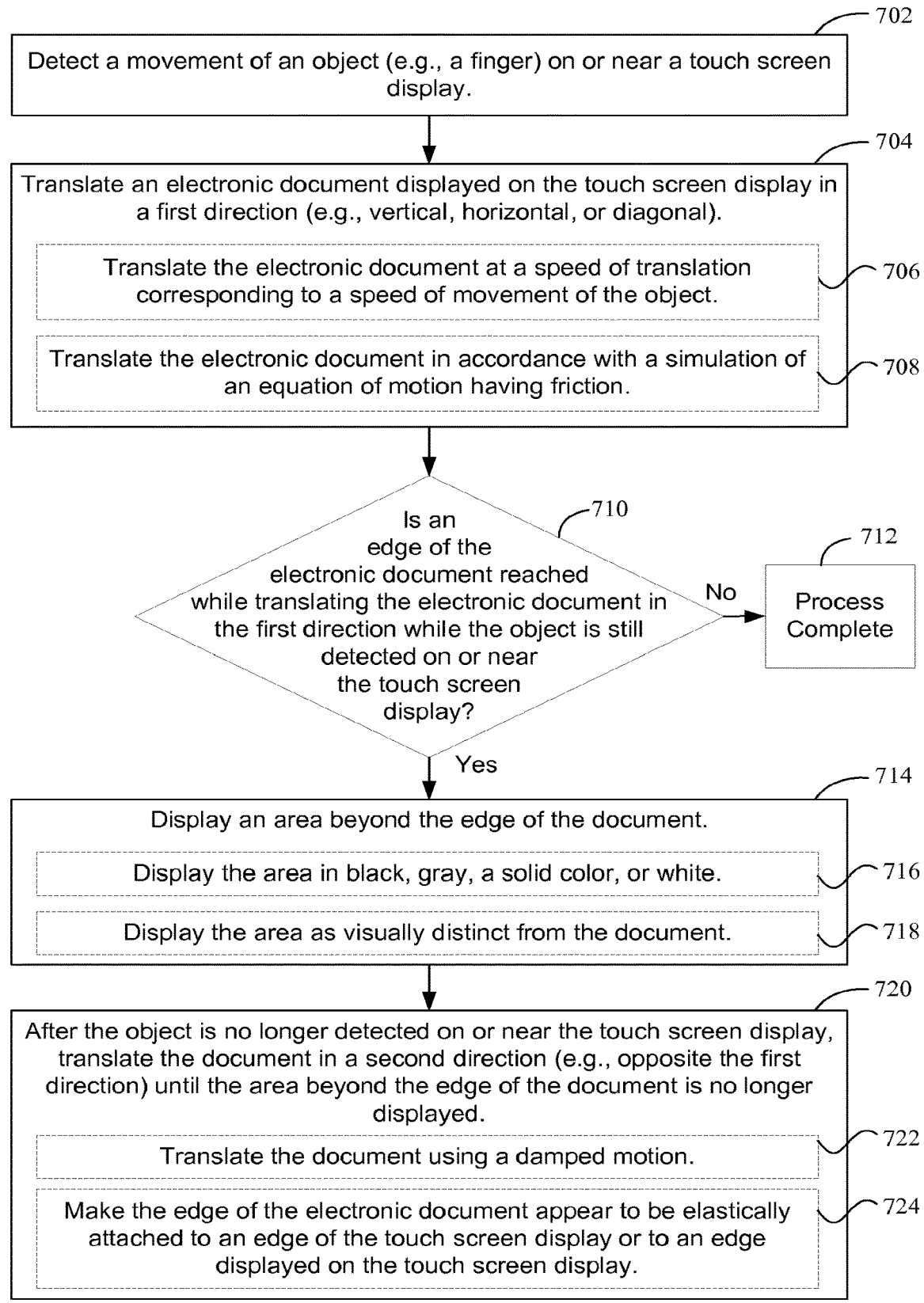
FIG. 7 is a flow diagram illustrating a method of translating an electronic document in accordance with some embodiments.

FIG. 7 is a flow diagram illustrating a method 700 of translating an electronic document in accordance with some embodiments. The method 700 provides a simple visual indicator to a user that one or more edges of an electronic document are being displayed.

Movement of an object is detected on or near a touch screen display of a device (702). In some embodiments, the object is a finger. In some embodiments, the device is a portable multifunction device.

In response to detecting the movement, an electronic document displayed on the touch screen display is translated in a first direction (704). In some embodiments, the electronic document is a web page, as illustrated in FIGS. 8A-8D. In some embodiments, the electronic document is a digital image. In some embodiments, the electronic document is a word processing, spreadsheet, email, or presentation document. In some embodiments, the first direction is a vertical direction, a horizontal direction, or a diagonal direction. In some embodiments, the first direction corresponds to the direction of movement of the object detected on or near the display but is not necessarily identical to the direction of movement of the object.

In some embodiments, translating the electronic document in the first direction prior to reaching an edge of the electronic document has an associated speed of translation corresponding to a speed of movement of the object (706). In some embodiments, the electronic document is translated in accordance with a simulation of an equation of motion having friction (708).

If an edge of the electronic document is reached (e.g., upon reaching the edge of the document) while translating the electronic document in the first direction while the object is still detected on or near the touch screen display, an area beyond the edge of the electronic document is displayed (710—Yes, 714). In some embodiments, the area beyond the edge of the electronic document is black, gray, a solid color, or white (716). In some embodiments, the area beyond the edge of the electronic document is visually distinct from the document (718). For example, the area 3930 beyond the edge of the web page 3912 in FIG. 8C is black, in contrast to the white background of the web page 3912. In some other embodiments, a wallpaper image such as a picture or pattern may be displayed in the area beyond the edge of the electronic document.

After the object is no longer detected on or near the touch screen display, the electronic document is translated in a second direction until the area beyond the edge of the electronic document is no longer displayed (720). For example, in FIG. 8D the web page 3912 has been translated such that the area 3930 beyond its edge is no longer displayed. In some embodiments, the second direction is opposite the first direction. In some embodiments, the electronic document is translated in the second direction using a damped motion (722). In some embodiments, the change from translating the electronic document in the first direction to translating the electronic document in the second direction until the area beyond the edge of the electronic document is no longer displayed makes the edge of the electronic document appear to be elastically attached to an edge of the touch screen display or to an edge displayed on the touch screen display (724).

In some embodiments, translating in the first direction prior to reaching an edge of the electronic document has a first associated translating distance that corresponds to a distance of movement of the object prior to reaching the edge of the electronic document. For example, a distance of translation of the web page 3912 shown in FIGS. 8A-8D prior to reaching the edge of the document may correspond to a distance traversed on the touch screen display by the swipe gesture 3925 before the edge is reached. In some embodiments, displaying an area beyond the edge of the electronic document includes translating the electronic document in the first direction for a second associated translating distance, wherein the second associated translating distance is less than a distance of movement of the object after reaching the edge of the electronic document. For example, in FIG. 8C, after the edge is reached the web page 3912 is translated by a distance indicated by opposing arrows 3928-1 and 3928-2, which may be less than a distance traversed on the touch screen display by the swipe gesture 3925 after the terminus is reached.

In some embodiments, translating in the first direction prior to reaching an edge of the electronic document has a first associated translating speed that corresponds to a speed of movement of the object. For example, a speed of translation prior to reaching the edge of the web page 3912 shown in FIGS. 8A-8D may correspond to a speed of movement of the swipe gesture 3925. Displaying an area beyond the edge of the electronic document includes translating the electronic document in the first direction at a second associated translating speed. The second associated translating speed is slower than the first associated translating speed. For example, in FIG. 8C, displaying the area 3930 beyond the edge of the web page 3912 may include translating the web page 3912 at a speed that is slower than the speed of translation before the edge is reached. In some embodiments, the second associated speed is a fraction (e.g., one-half or one-third) of the first associated speed. In some embodiments, the second associated speed is the square root of the first associated speed.

If an edge of the electronic document is not reached while translating the electronic document in the first direction while the object is still detected on or near the touch screen display, the process 700 is complete (710—No, 712). The process 700 may be re-initiated upon subsequent detection of another movement of an object on or near the touch screen display (702).

FIGS. 8A-8D illustrate the translation of an electronic document to an edge of the document, at which point an area beyond the edge is displayed and the document is then translated in a second direction until the area beyond the edge of the document is no longer displayed, in accordance with some embodiments. While FIGS. 8A-8D illustrate this translation in the context of a portable multifunction device 100, this translation is not limited to portable multifunction devices. In the example of FIGS. 8A-8D, the document is a web page 3912; FIGS. 8A-8D illustrate an exemplary user interface for a browser in accordance with some embodiments. An analogous user interface may be used to display other types of electronic documents, such as word processing, spreadsheet, email, presentation documents, or digital images.

In some embodiments, user interface 3900A of FIGS. 8A-8D includes the following elements, or a subset or superset thereof:

402, 404, and 406, as described above;
Previous page icon 3902 that when activated (e.g., by a finger tap on the icon) initiates display of the previous web page;
Web page name 3904;
Next page icon 3906 that when activated (e.g., by a finger tap on the icon) initiates display of the next web page;
URL (Uniform Resource Locator) entry box 3908 for inputting URLs of web pages;
Refresh icon 3910 that when activated (e.g., by a finger tap on the icon) initiates a refresh of the web page;
Web page 3912 or other structured document, which is made of blocks 3914 of text content and other graphics (e.g., images);
Settings icon 3916 that when activated (e.g., by a finger tap on the icon) initiates display of a settings menu for the browser;
Bookmarks icon 3918 that when activated (e.g., by a finger tap on the icon) initiates display of a bookmarks list or menu for the browser;
Add bookmark icon 3920 that when activated (e.g., by a finger tap on the icon) initiates display of a UI for adding bookmarks; and
New window icon 3922 that when activated (e.g., by a finger tap on the icon) initiates display of a UI for adding new windows to the browser.

In some embodiments, the device analyzes the render tree of the web page 3912 to determine the blocks 3914 in the web page. In some embodiments, a block 3914 corresponds to a render node that is: replaced; a block; an inline block; or an inline table.

Figure 8A:
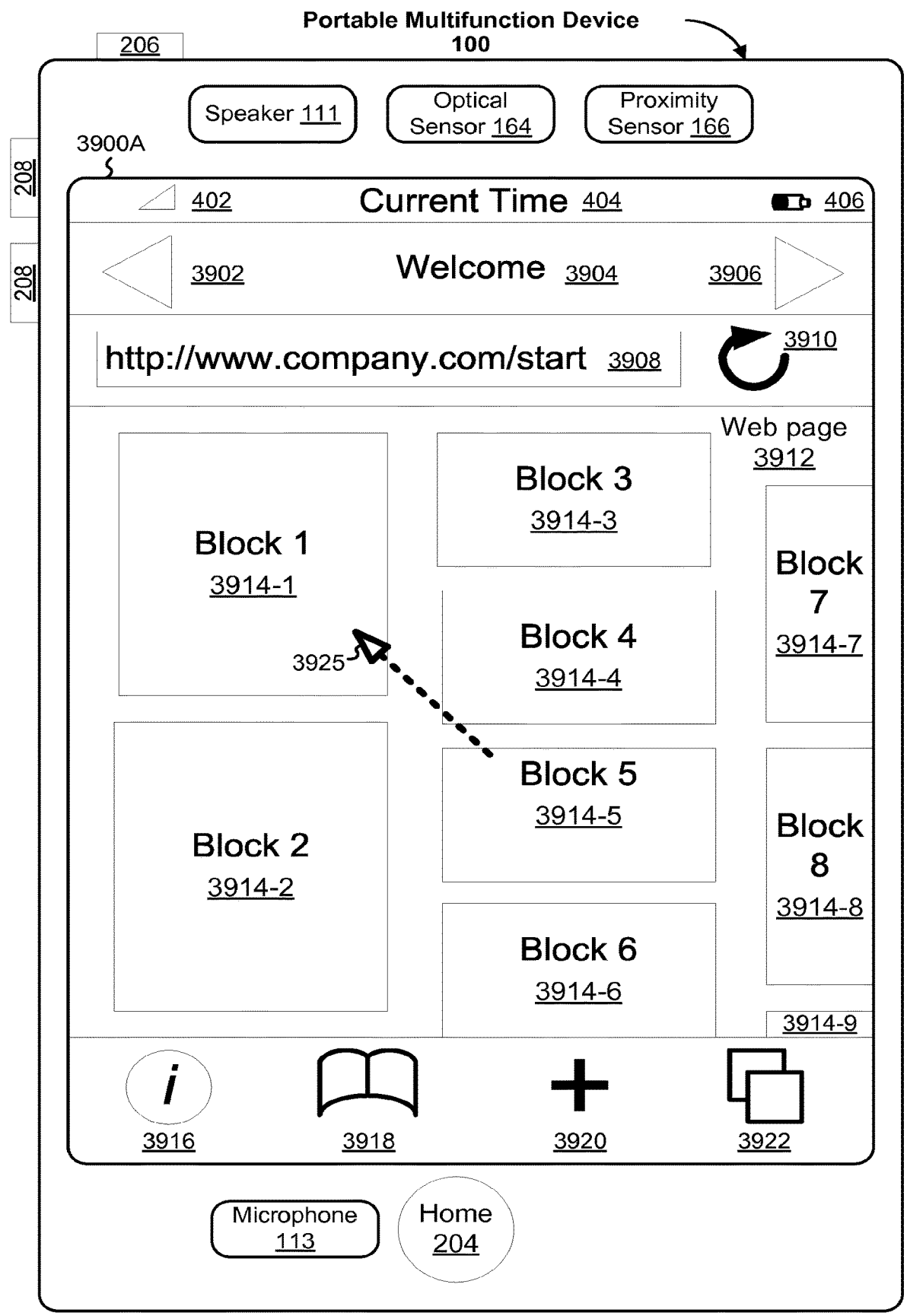
FIGS. 8A-8D illustrate an exemplary user interface for a browser in accordance with some embodiments.

In FIG. 8A, the web page fills more than the allotted screen area: only the left sides of block 7 (3914-7) and block 8 (3914-8) are displayed and only the top left corner of block 9 (3914-9) is displayed. To view the partially displayed blocks, a user may translate the displayed document by gesturing on the touch screen in accordance with some embodiments.

In some embodiments, in response to a substantially vertical upward (or downward) swipe gesture by the user, the web page (or, more generally, other electronic documents) may translate one-dimensionally upward (or downward) in the vertical direction. In some embodiments, a gesture is considered substantially vertical if it is within a predetermined angle of being perfectly vertical. For example, in response to an upward swipe gesture by the user that is within a predetermined angle (e.g., 27°) of being perfectly vertical, the web page may scroll one-dimensionally upward in the vertical direction.

Conversely, in some embodiments, in response to a gesture that is not within a predetermined angle (e.g., 27°) of being perfectly vertical, the web page may translate two-dimensionally (i.e., with simultaneous movement in both the vertical and horizontal directions). For example, in response to an upward swipe gesture by the user that is not within a predetermined angle (e.g., 27°) of being perfectly vertical, the web page may translate two-dimensionally along the direction of the swipe.

Figure 8B:
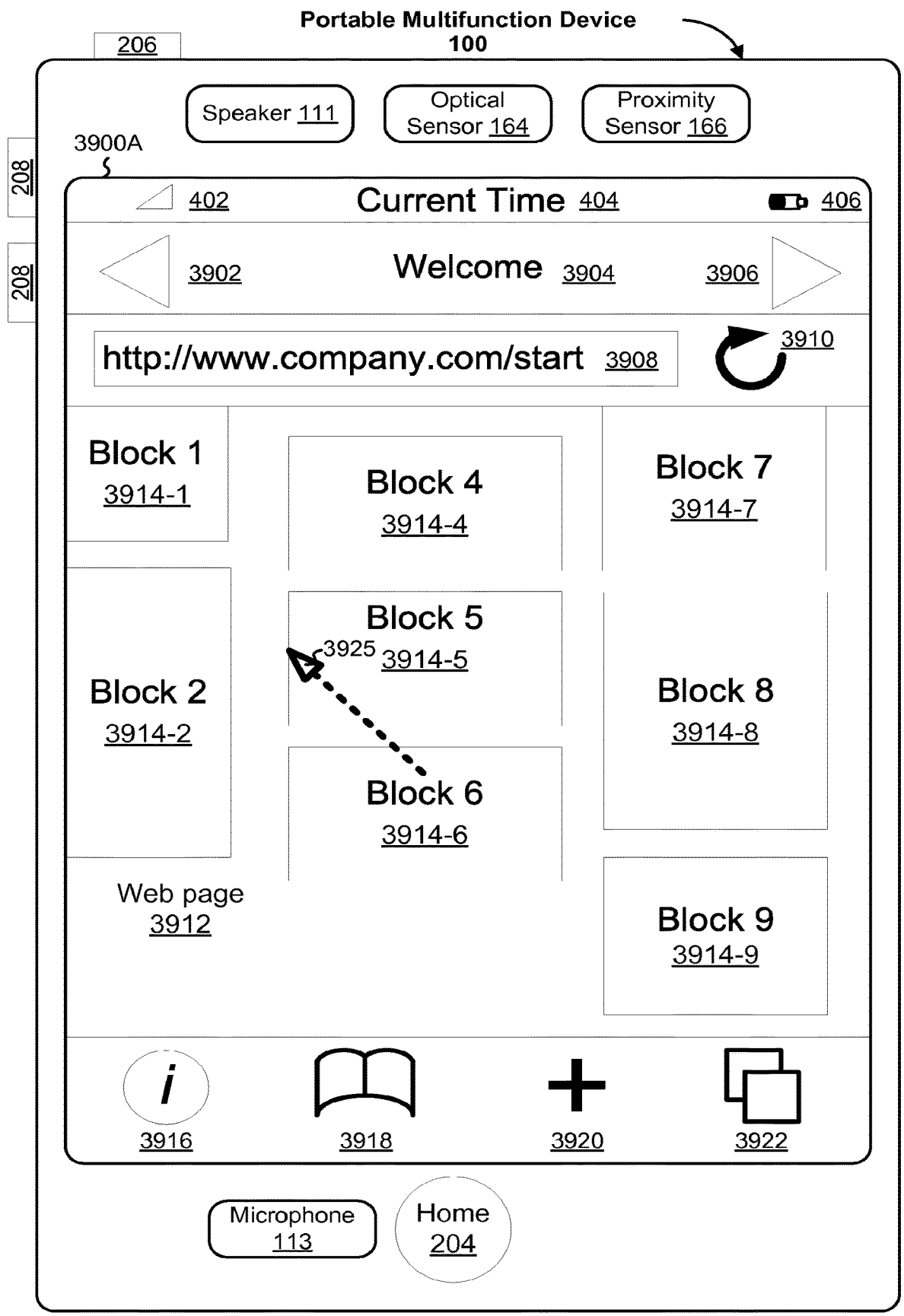
Figure 8C:
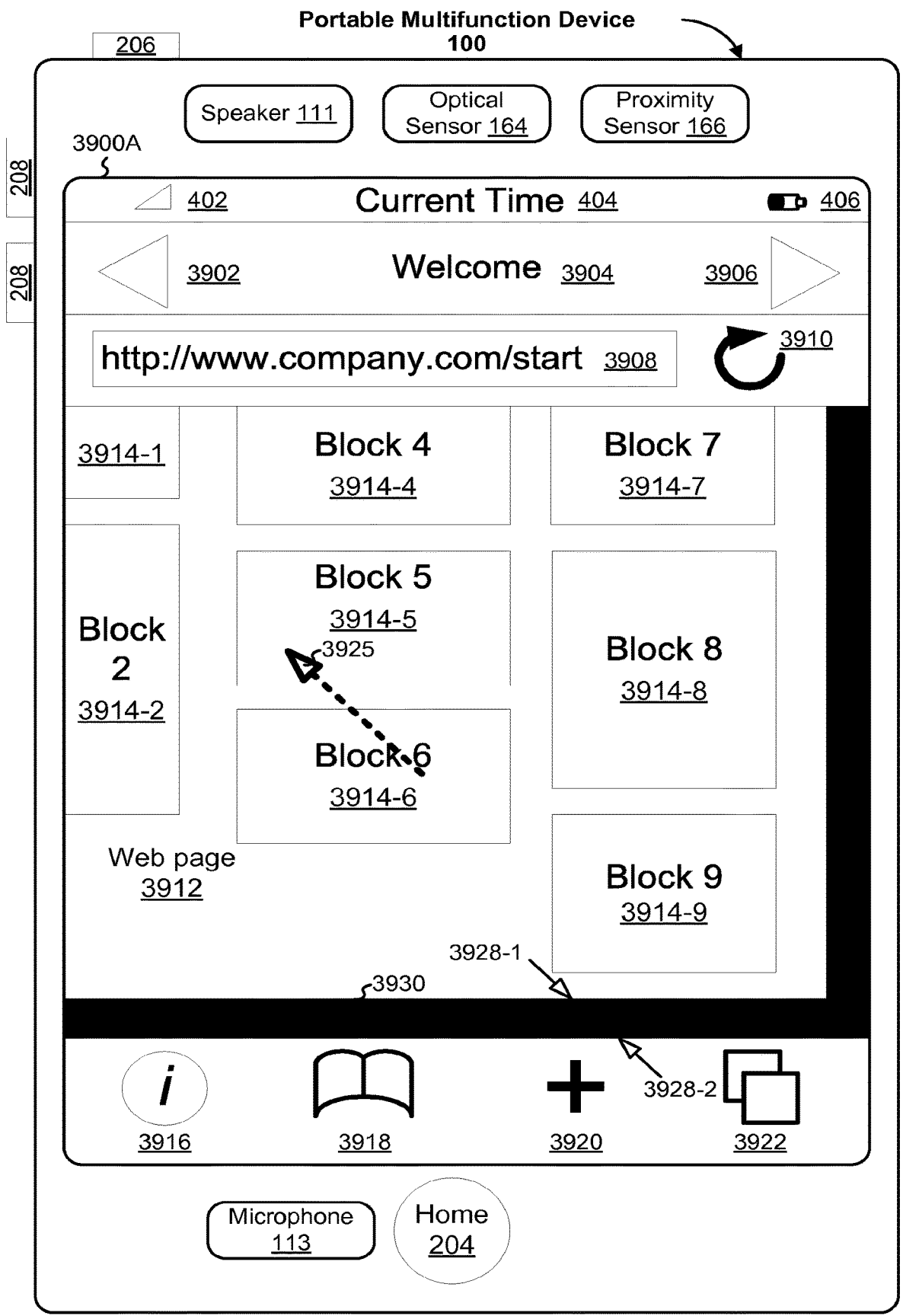

In the example of FIG. 8A, an upward swipe gesture 3925 is not within a predetermined angle of being perfectly vertical. Therefore, as a result of detecting the upward swipe gesture 3925, the web page is translated in two dimensions. In this example, the translation is approximately diagonal. FIG. 8B illustrates the result of this translation: blocks 8 (3914-8) and 9 (3914-9) are now fully displayed; blocks 1 (3914-1) and 2 (3914-2) are now only partially displayed, and block 3 (3914-3) is no longer displayed at all. This translation is an example of the translation described in operation 704 of process 700 (FIG. 7).

In FIG. 8B, block 9 (3914-9) is in the lower right-hand corner of the web page 3912; both the bottom and right edges of the web page have been reached while translating the web page. Upon reaching these edges of the document, in response to continued detection of the upward gesture 3925, an area 3930 (FIG. 8C) beyond the bottom and right edges of the web page is displayed. In some embodiments, the area displayed beyond the edge(s) of an electronic document is visually distinct from the document, as described in operation 718 of process 700 (FIG. 7). In FIG. 8C, the area 3930 is black and thus is visually distinct from the white background of the web page 3912.

Figure 8D:
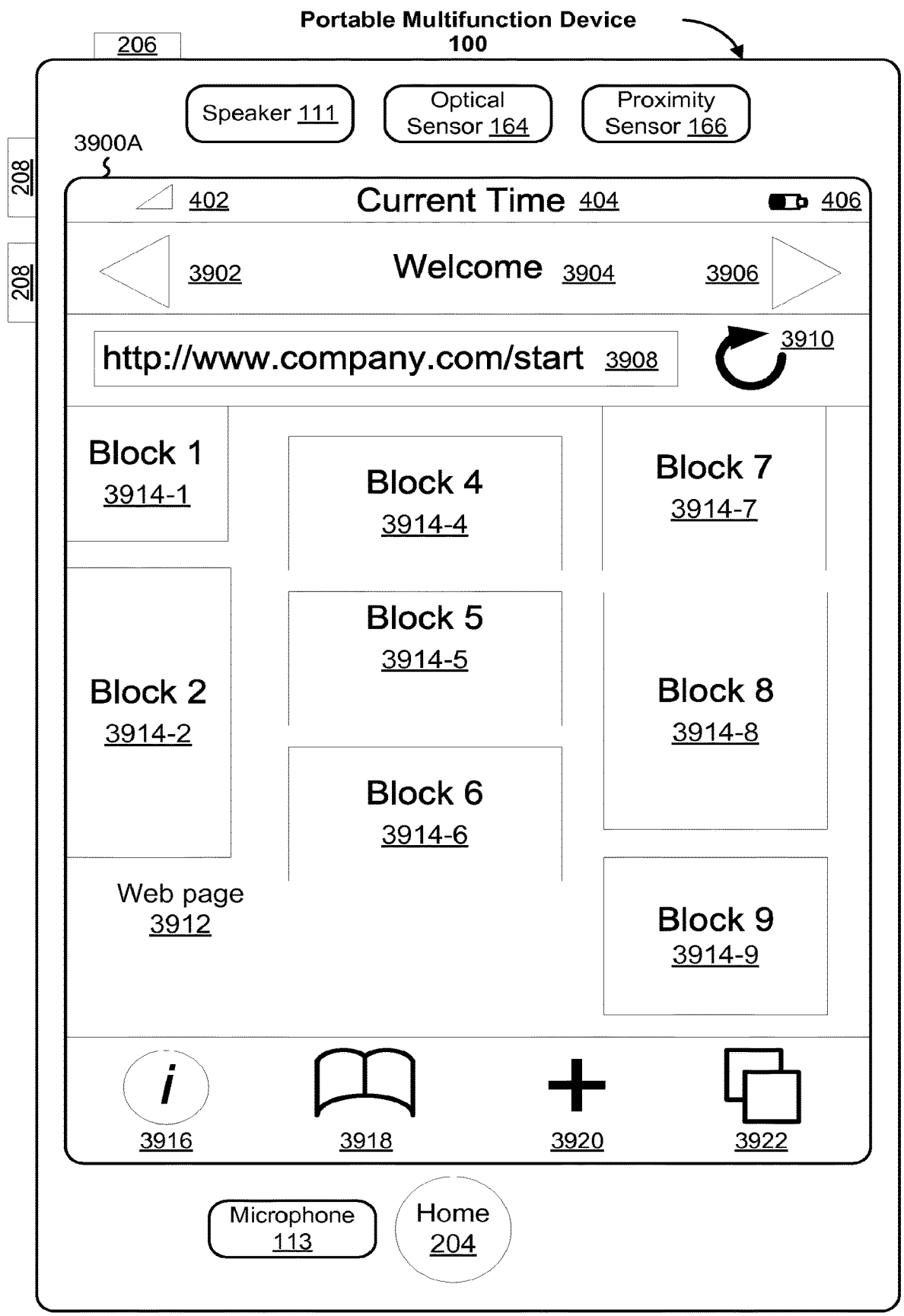

Once the upward gesture 3925 is complete, such that a corresponding object is no longer detected on or near the touch screen display, the web page 3912 is translated (e.g., in a direction opposite to the original direction of translation) until the area 3930 is no longer displayed. FIG. 8D illustrates the result of this translation, which corresponds to operation 720 of process 700 (FIG. 7): block 9 (3914-9) is now displayed in the lower right-hand corner of the portion of the screen allotted to display the web page 3912 and the area 3930 not displayed. In some embodiments, the direction of translation is not necessarily opposite to the original direction but may be in any direction such that, upon completion of the translation, the area beyond the edge(s) of the electronic document is no longer displayed.

Figure 9:
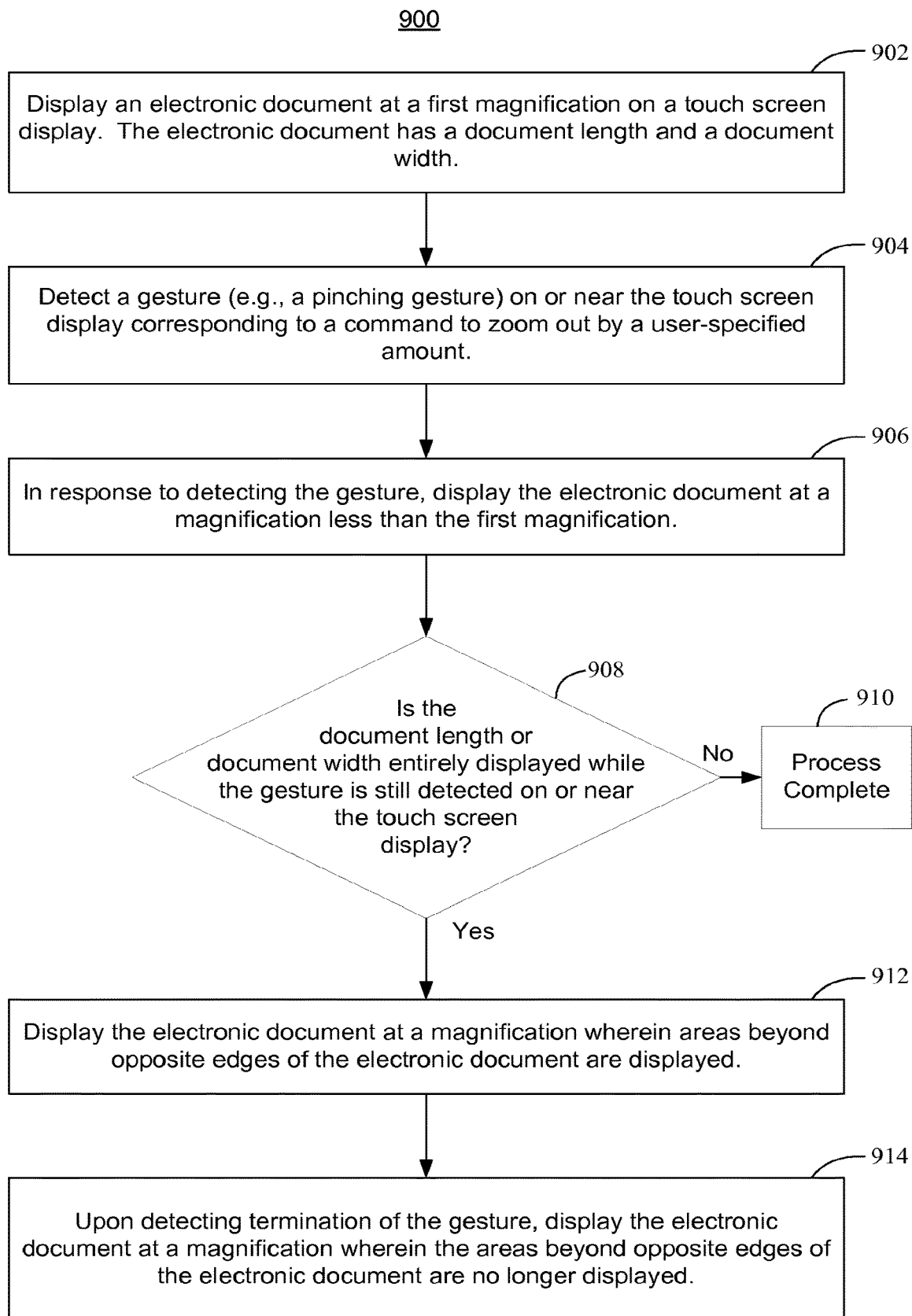
FIG. 9 is a flow diagram illustrating a process of displaying an electronic document at multiple magnifications in accordance with some embodiments.

FIG. 9 is a flow diagram illustrating a process 900 of displaying an electronic document having a document length and a document width, in accordance with some embodiments. The process 900 provides a simple visual indicator to a user that an electronic document is being displayed at a minimum magnification (e.g., the electronic document cannot be zoomed out and/or demagnified further).

The process 900 is performed at a device with a touch screen display. In some embodiments, the device is a portable multifunction device. In some embodiments, the electronic document is a web page (e.g., web page 3912, FIGS. 10A-10C). In some embodiments, the electronic document is a digital image. In some embodiments, the electronic document is a word processing, spreadsheet, email or presentation document.

The electronic document is displayed (902) at a first magnification on the touch screen display. A gesture is detected (904) on or near the touch screen display corresponding to a command to zoom out by a user-specified amount. In some embodiments, the gesture is a pinching gesture (e.g., gesture 3951/3953, FIG. 10A).

In response to detecting the gesture, the electronic document is displayed (906) at a magnification less than the first magnification. For example, the web page 3912 is shown at a lesser magnification in FIG. 10B than in FIG. 10A.

If the document length or document width is not entirely displayed (908—No) while the gesture is still detected on or near the touch screen display, the process 900 is complete (910).

If, however, the document length (e.g., 3957, FIG. 10B) or document width (e.g., 3959, FIG. 10B) is entirely displayed (908—Yes) while the gesture (e.g., 3951/3953) is still detected on or near the touch screen display, the electronic document is displayed (912) at a magnification wherein areas beyond opposite edges of the electronic document (e.g., areas 3955, FIG. 10B) are displayed.

In some embodiments, the areas beyond opposite edges of the electronic document include an area beyond a top edge of the document and an area beyond a bottom edge of the document. In some embodiments, the areas beyond opposite edges of the electronic document include an area beyond a right edge of the document and an area beyond a left edge of the document. In some embodiments, the areas beyond opposite edges of the electronic document include an area beyond a top edge of the document, an area beyond a bottom edge of the document, an area beyond a right edge of the document, and an area beyond a left edge of the document (e.g., FIG. 10B).

In some embodiments, the areas beyond opposite edges of the electronic document are black, gray, a solid color, or white. In some embodiments, the areas beyond opposite edges of the electronic document are visually distinct from the document. For example, the areas 3955 (FIG. 10B) are black and thus are visually distinct from the web page 3912.

Upon detecting termination of the gesture, the electronic document is displayed (914) at a magnification wherein the areas beyond opposite edges of the electronic document are no longer displayed. For example, the areas 3955 are not displayed in FIG. 10C.

Figure 10A:
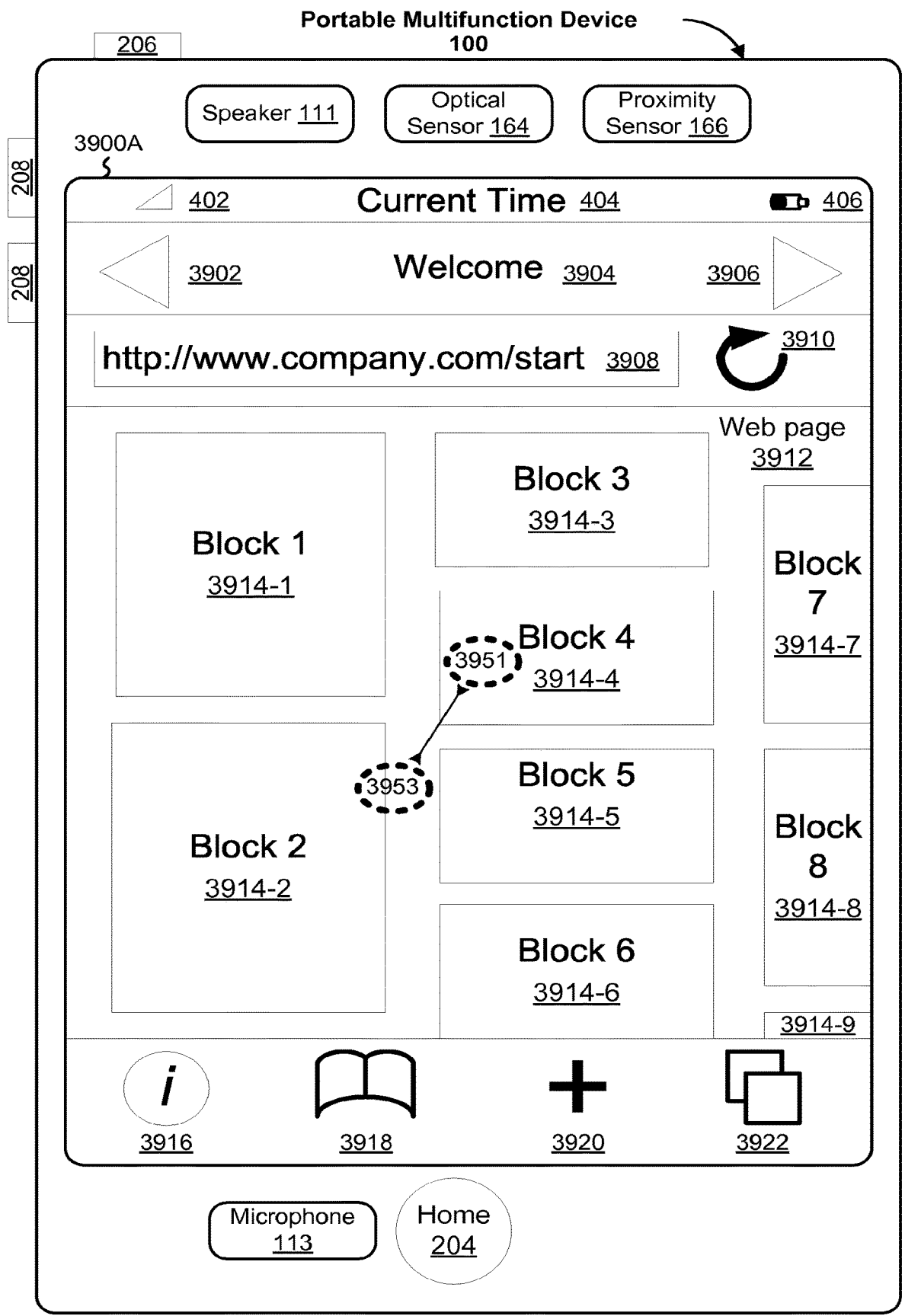
FIGS. 10A-10C illustrate the display of an electronic document at multiple magnifications in accordance with some embodiments.
Figure 10B:
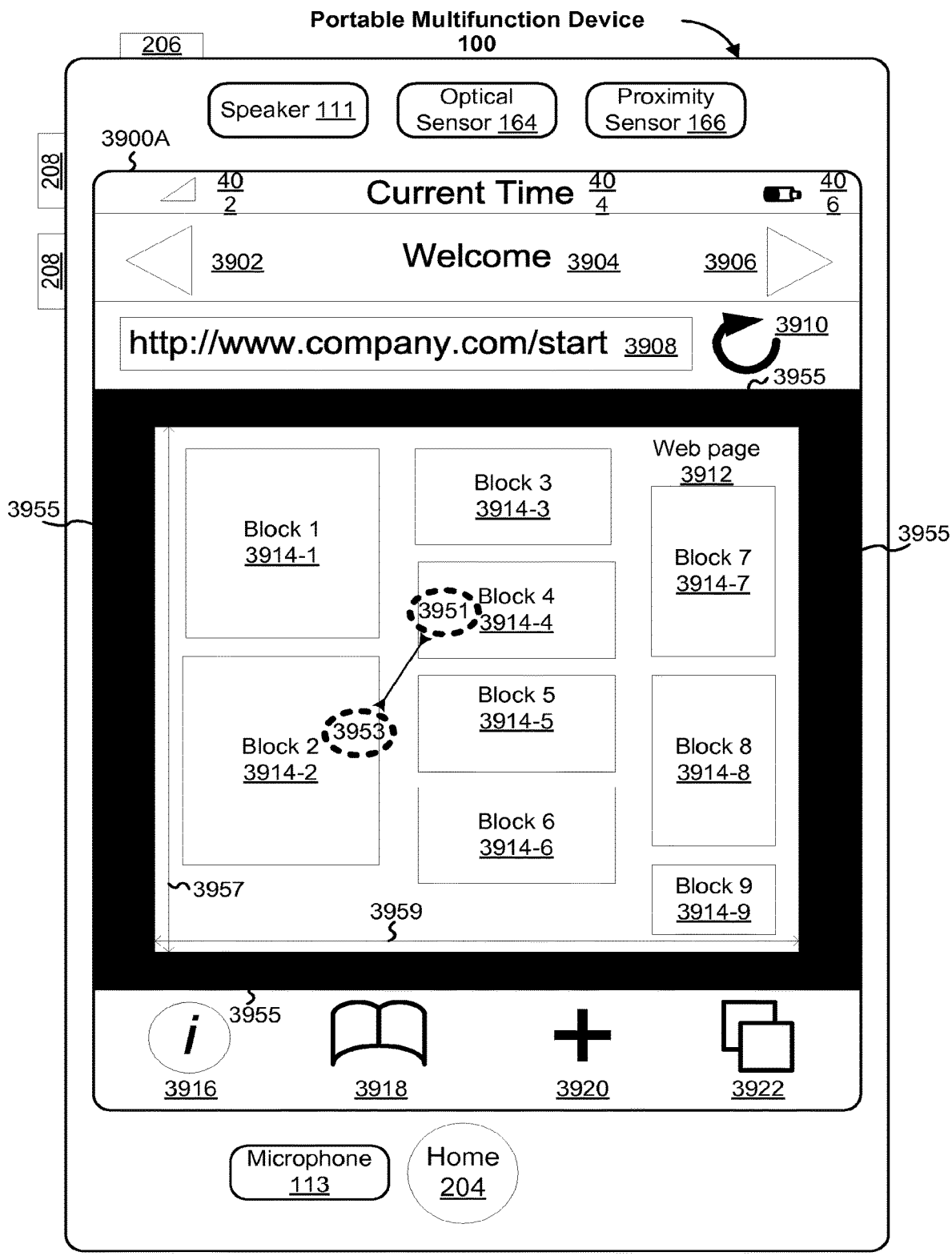
Figure 10C:
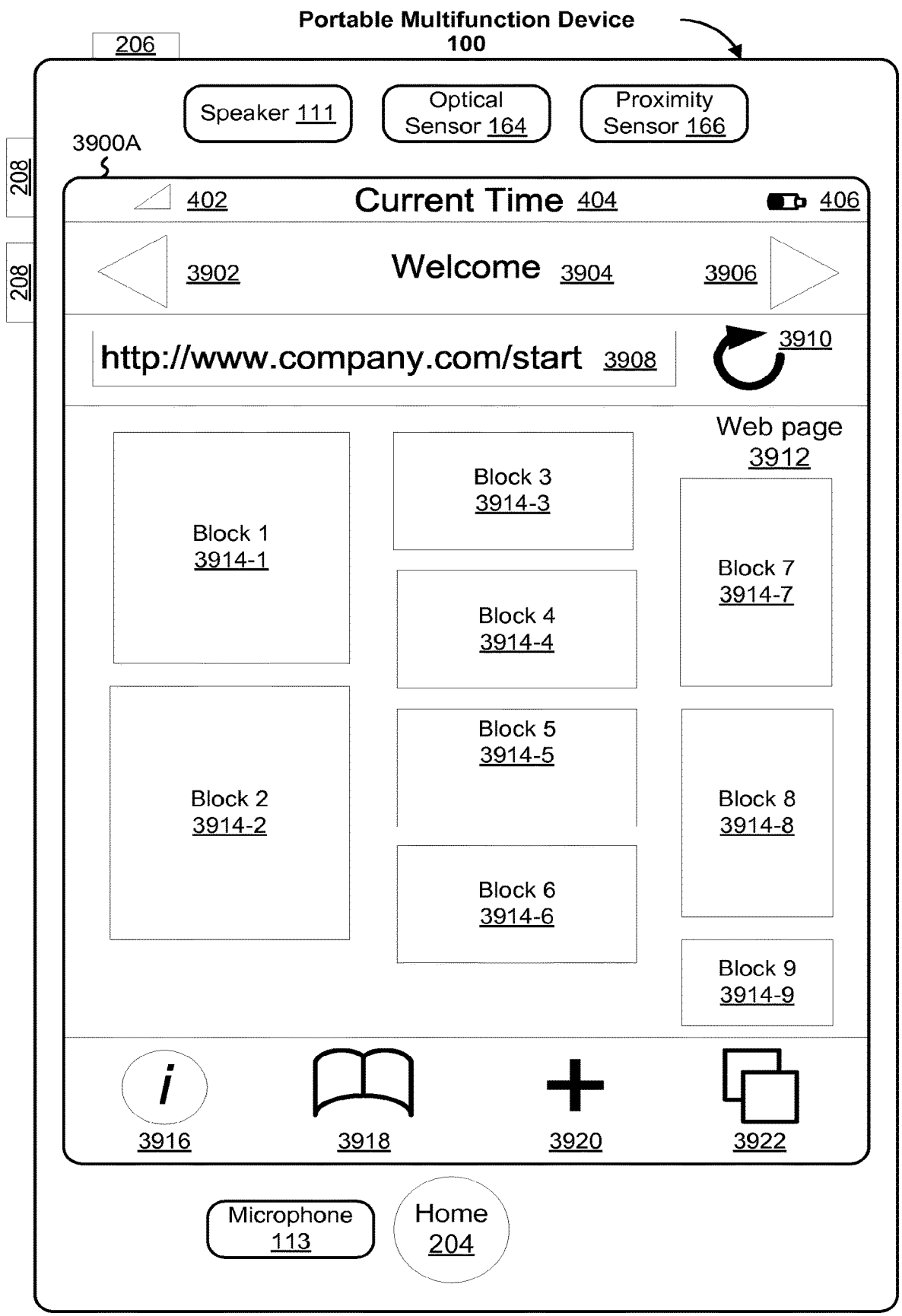

FIGS. 10A-10C illustrate the display of an electronic document at multiple magnifications in accordance with some embodiments. While FIGS. 10A-10C illustrate displaying these multiple magnifications in the context of a portable multifunction device 100, displaying these multiple magnifications is not limited to portable multifunction devices. In the example of FIGS. 10A-10C, the document is a web page 3912; FIGS. 10A-10C (like FIGS. 8A-8D) illustrate an exemplary user interface for a browser in accordance with some embodiments. An analogous user interface may be used to display other types of electronic documents, such as digital images or word processing, spreadsheet, email, or presentation documents.

In FIG. 10A, the web page 3912 is displayed at a first magnification. The web page 3912 fills more than the allotted screen area: only the left sides of block 7 (3914-7) and block 8 (3914-8) are displayed and only the top left corner of block 9 (3914-9) is displayed.

In response to detecting a pinching gesture 3951/3953 (FIG. 10A), the web-page is displayed at a magnification less than the first magnification, as shown in FIG. 10B. If a document length 3957 or a document width 3959 is entirely displayed while the gesture 3951/3953 is still detected, areas 3955 beyond opposite edges of the web page 3912 are displayed. Upon detecting termination of the gesture 3951/3953, the web page 3912 is displayed at a magnification wherein the areas 3955 are no longer displayed, as shown in FIG. 10C.

Figure 11:
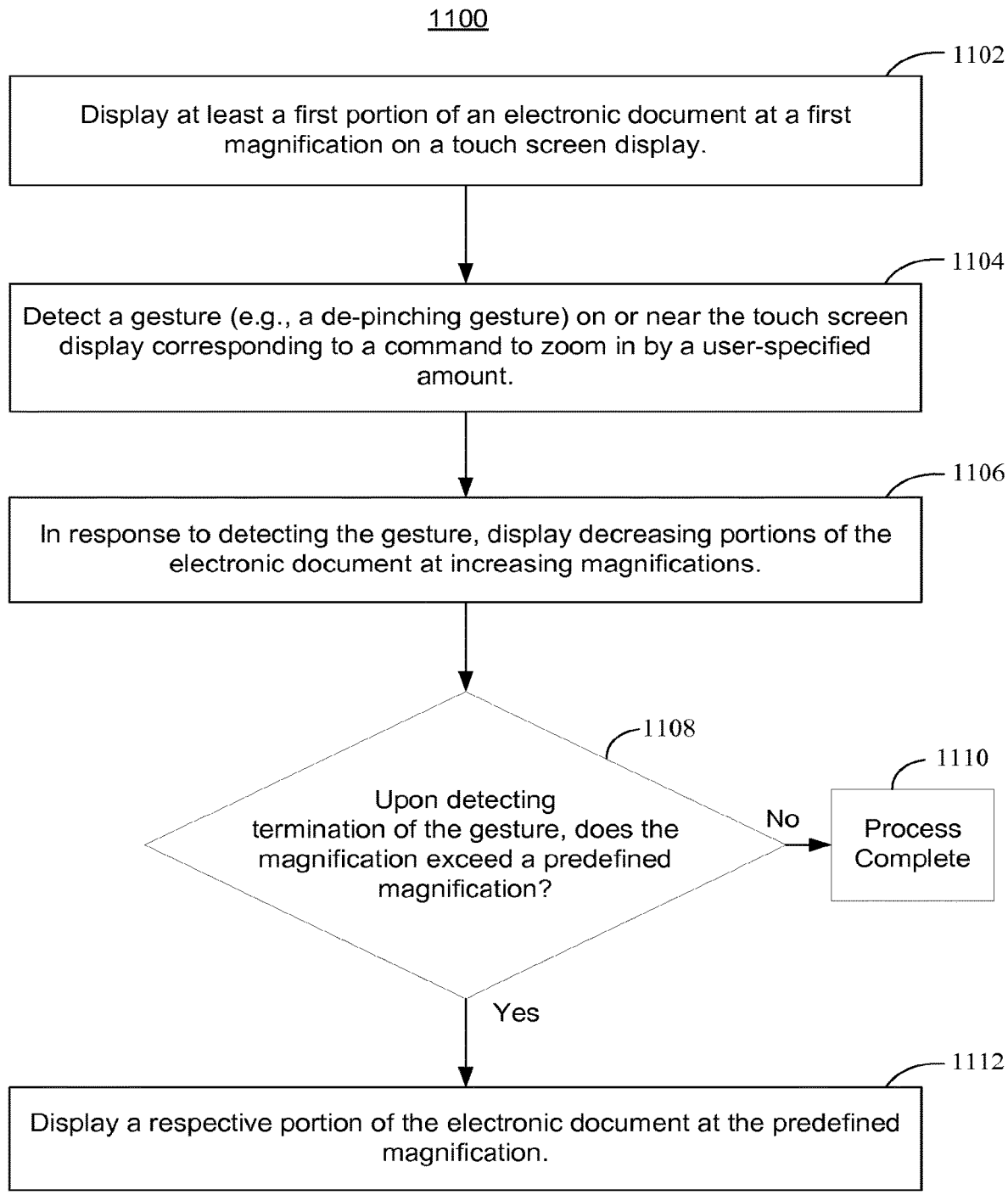
FIG. 11 is a flow diagram illustrating a process of displaying an electronic document at multiple magnifications in accordance with some embodiments.

FIG. 11 is a flow diagram illustrating a process 1100 of displaying an electronic document at multiple magnifications in accordance with some embodiments. The process 1100 provides a simple visual indicator to a user that an electronic document is being displayed at a maximum magnification (e.g., the electronic document cannot be zoomed in and/or magnified further).

The process 1100 is performed at a device with a touch screen display. In some embodiments, the device is a portable multifunction device. In some embodiments, the electronic document is a web page (e.g., web page 3912, FIGS. 12A-12C). In some embodiments, the electronic document is a digital image (e.g., digital image 1302, FIGS. 13A-13C). In some embodiments, the electronic document is a word processing, spreadsheet, email or presentation document.

At least a first portion of the electronic document is displayed (1102) at a first magnification. A gesture is detected (1104) on or near the touch screen display corresponding to a command to zoom in by a user-specified amount. In some embodiments, the gesture is a de-pinching gesture (e.g., 3931/3933, FIGS. 12A and 13A).

In response to detecting the gesture, decreasing portions of the electronic document are displayed (1106) at increasing magnifications. For example, in FIG. 12B a decreased portion of the web page 3912 is displayed at a higher magnification than the portion in FIG. 12A, and in FIG. 13B a decreased portion of the digital image 1302 is displayed at a higher magnification than the portion in FIG. 13A.

If, upon detecting termination of the gesture, the magnification does not exceed a predefined magnification (1108—No), the process 1100 is complete (1110).

If, however, upon detecting termination of the gesture, the magnification exceeds a predefined magnification (1108—Yes), a respective portion of the electronic document is displayed (1112) at the predefined magnification. In the examples of FIGS. 12B and 13B, the magnification exceeds a predefined magnification. Upon detecting termination of the gesture 3931/3933, a portion of the web page 3912 is displayed at the predefined magnification, as illustrated in FIG. 12C, and a portion of the digital image 1302 is displayed at the predefined magnification, as illustrated in FIG. 13C.

In some embodiments, immediately prior to detecting termination of the gesture, a last decreased portion of the electronic document is displayed at a first resolution. Upon detecting termination of the gesture, the respective portion of the electronic document is displayed at a second resolution that is greater than the first resolution.

Figure 12A:
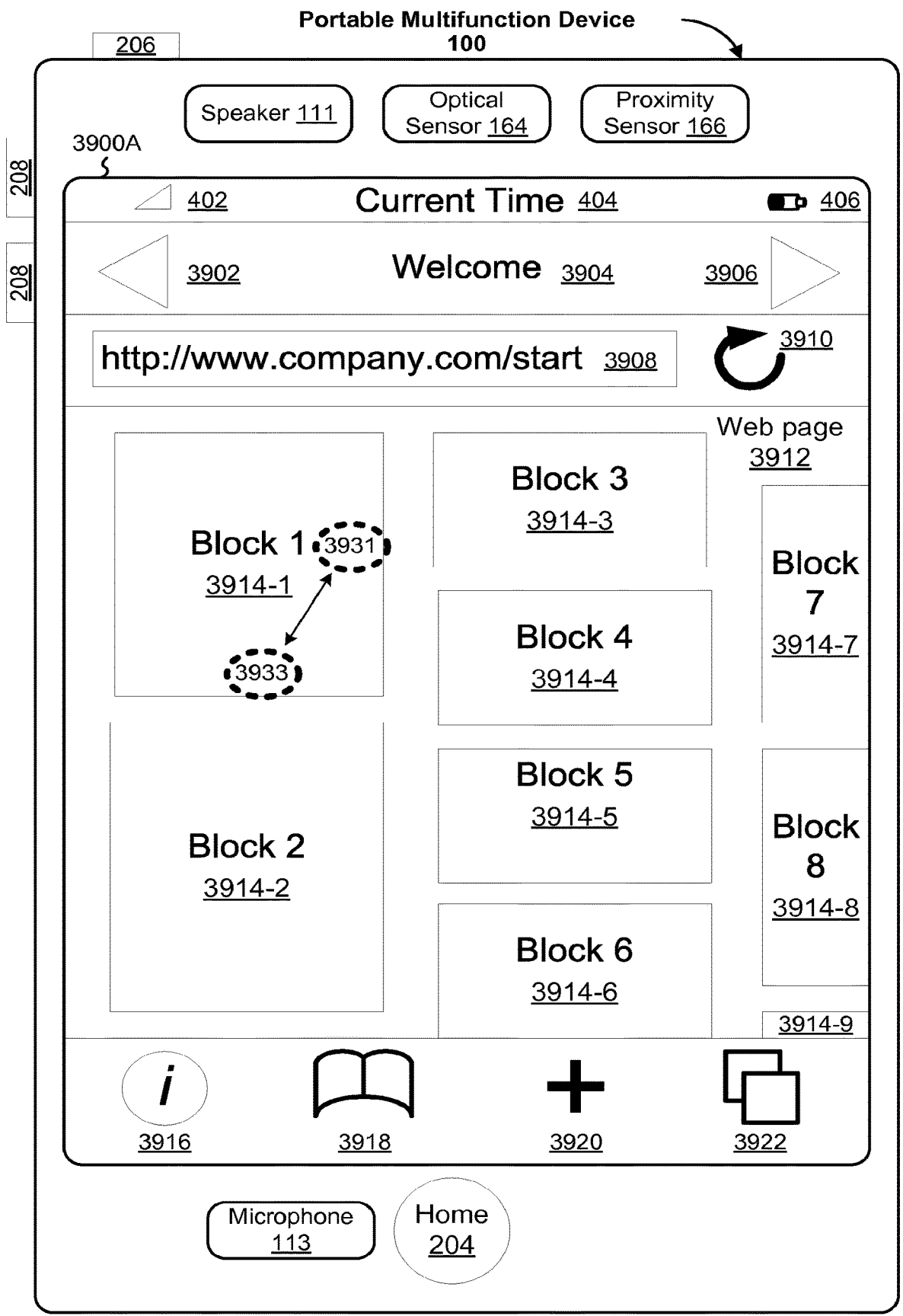
FIGS. 12A-12C illustrate the display of an electronic document at multiple magnifications in accordance with some embodiments.
Figure 12B:
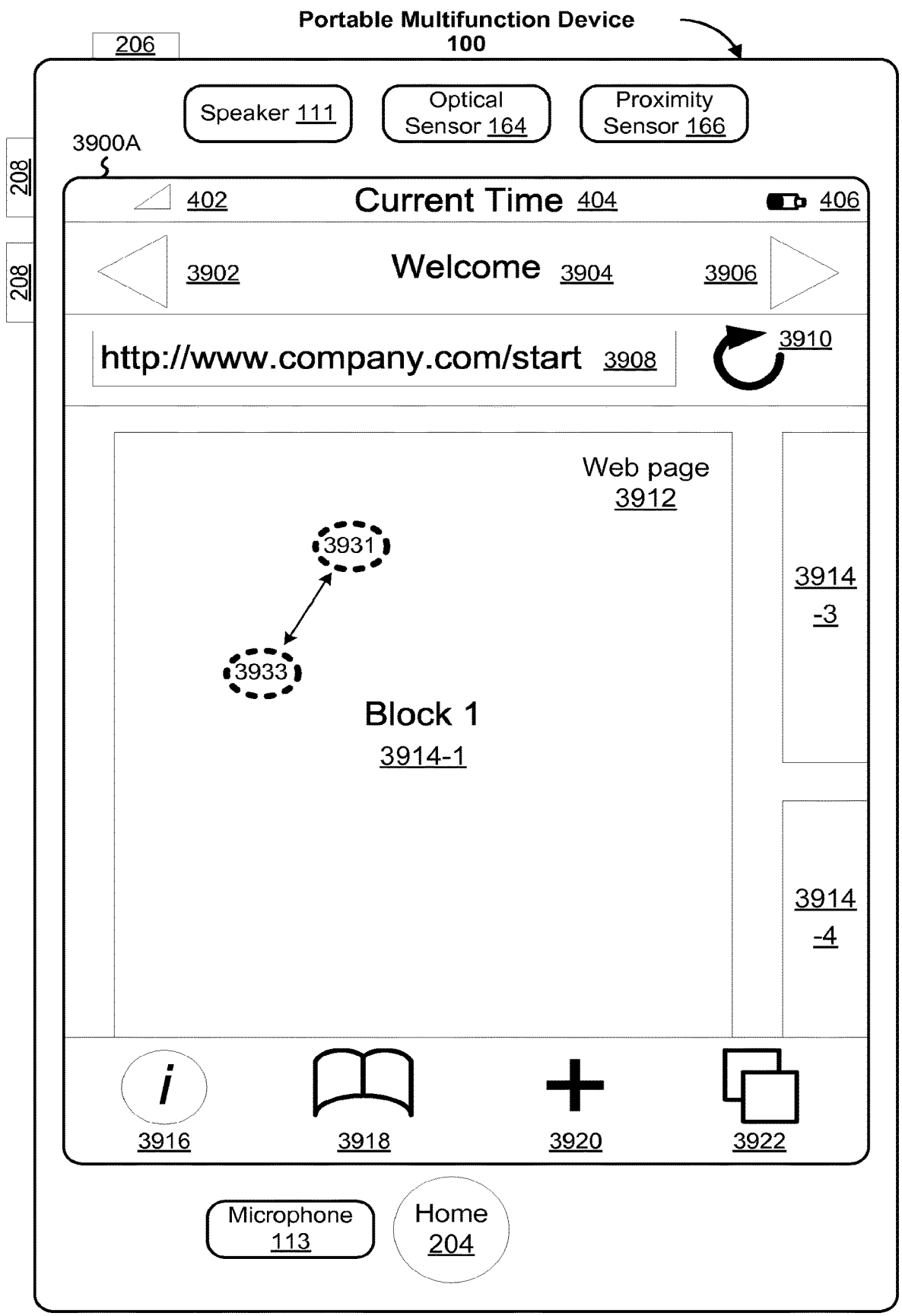
Figure 12C:
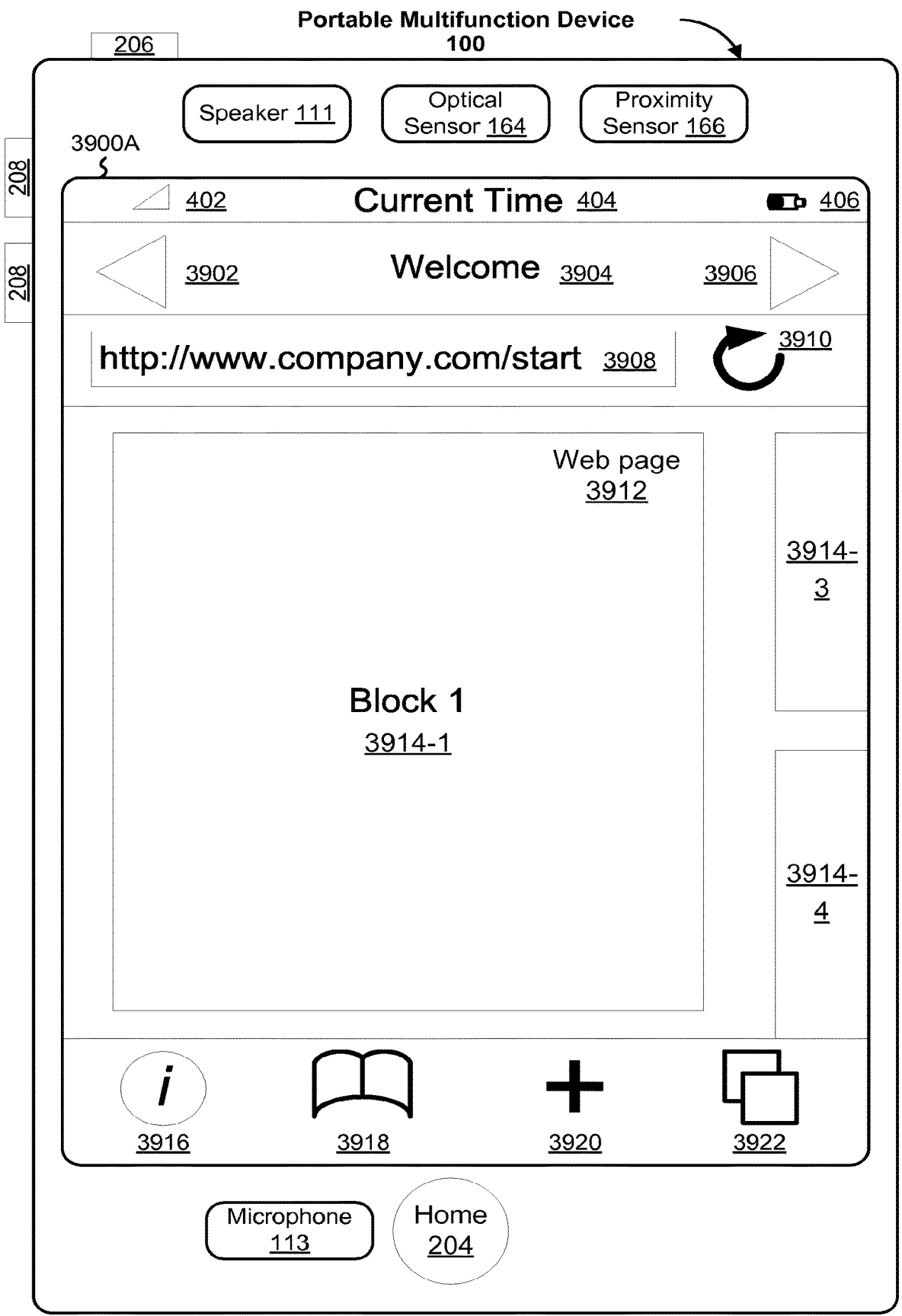

FIGS. 12A-12C illustrate the display of an electronic document at multiple magnifications in accordance with some embodiments. While FIGS. 12A-12C illustrate displaying these multiple magnifications in the context of a portable multifunction device 100, displaying these multiple magnifications is not limited to portable multifunction devices. In the example of FIGS. 12A-12C, the document is a web page 3912; FIGS. 12A-12C (like FIGS. 8A-8D) illustrate an exemplary user interface for a browser in accordance with some embodiments. An analogous user interface may be used to display other types of electronic documents, such as digital images or word processing, spreadsheet, email, or presentation documents.

In FIG. 12A, a first portion of the web page 3912 is displayed at a first magnification. The web page 3912 fills more than the allotted screen area: only the left sides of block 7 (3914-7) and block 8 (3914-8) are displayed and only the top left corner of block 9 (3914-9) is displayed.

In response to detecting a de-pinching gesture 3931/3933 (FIG. 12A), decreasing portions of the web-page 3912 are displayed at increasing magnifications compared to the magnification shown in FIG. 12A. For example, the portion of the web page 3912 shown in FIG. 12B is smaller than and has a higher magnification than the portion of the web page 3912 shown in FIG. 12A.

In the example of FIG. 12B, the magnification exceeds a predefined magnification. Upon detecting termination of the gesture 3931/3933, a portion of the web page 3912 is displayed at the predefined magnification, as illustrated in FIG. 12C.

Figure 13A:
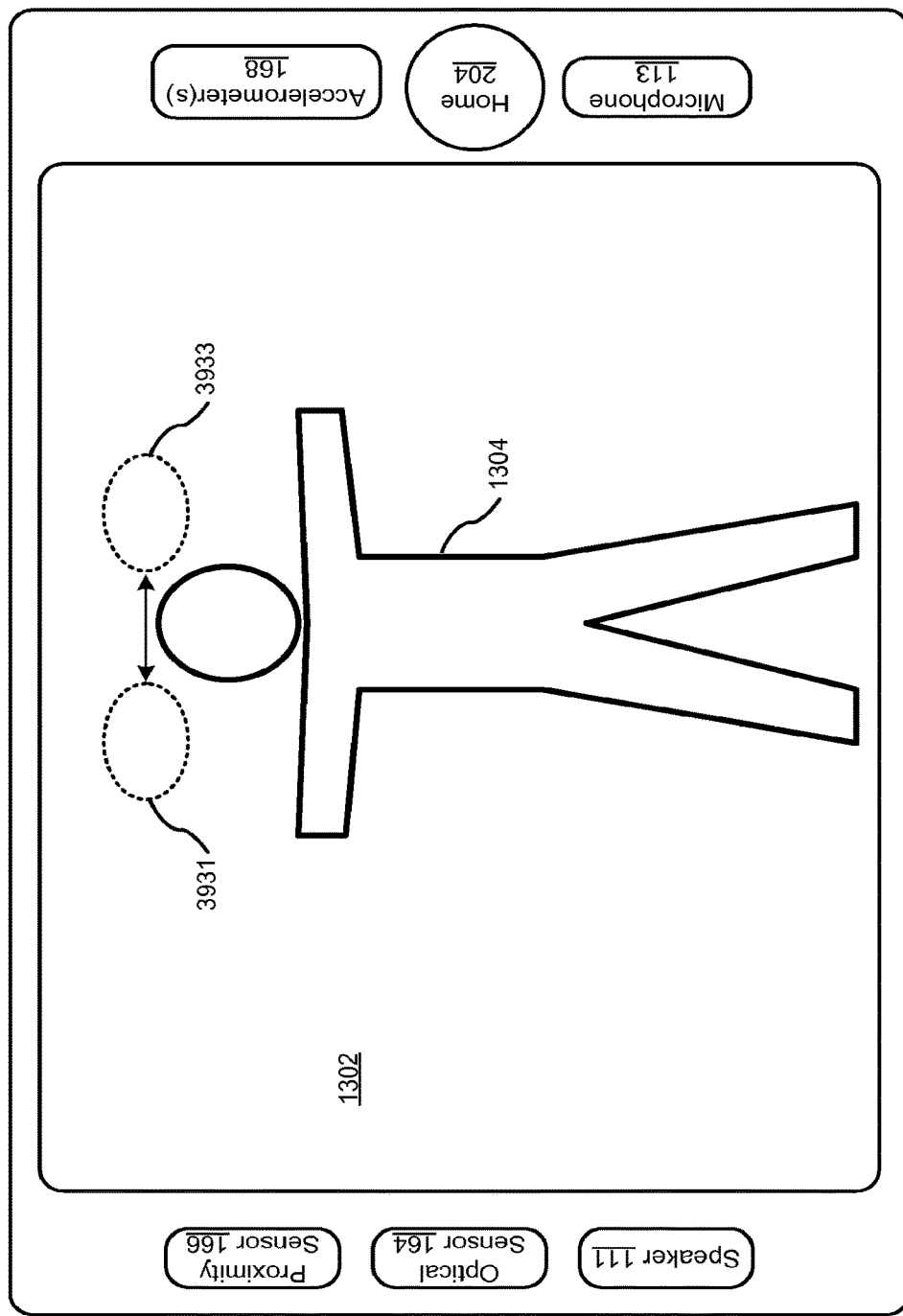
FIGS. 13A-13C illustrate the display of an electronic document at multiple magnifications in accordance with some embodiments.
Figure 13B:
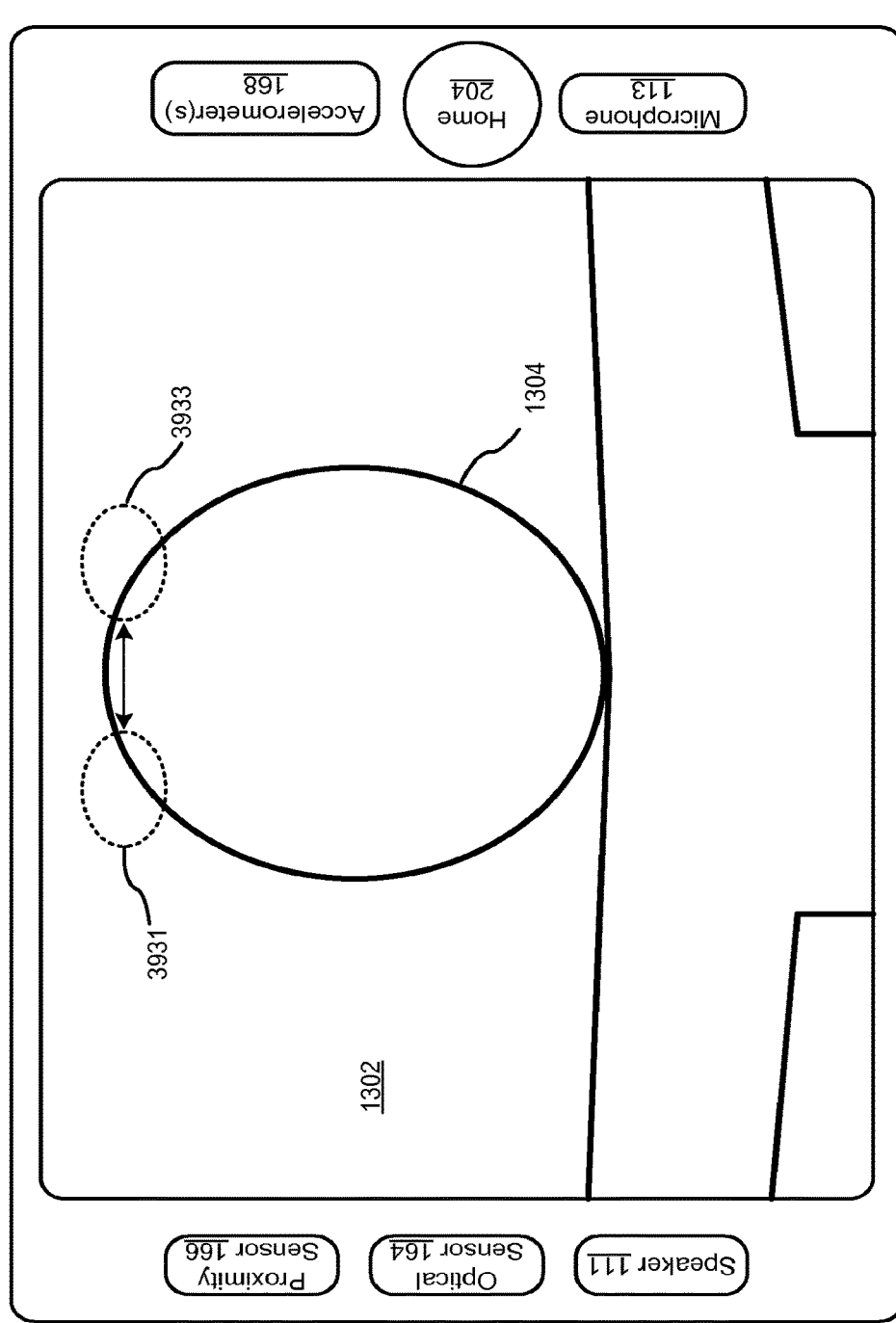
Figure 13C:
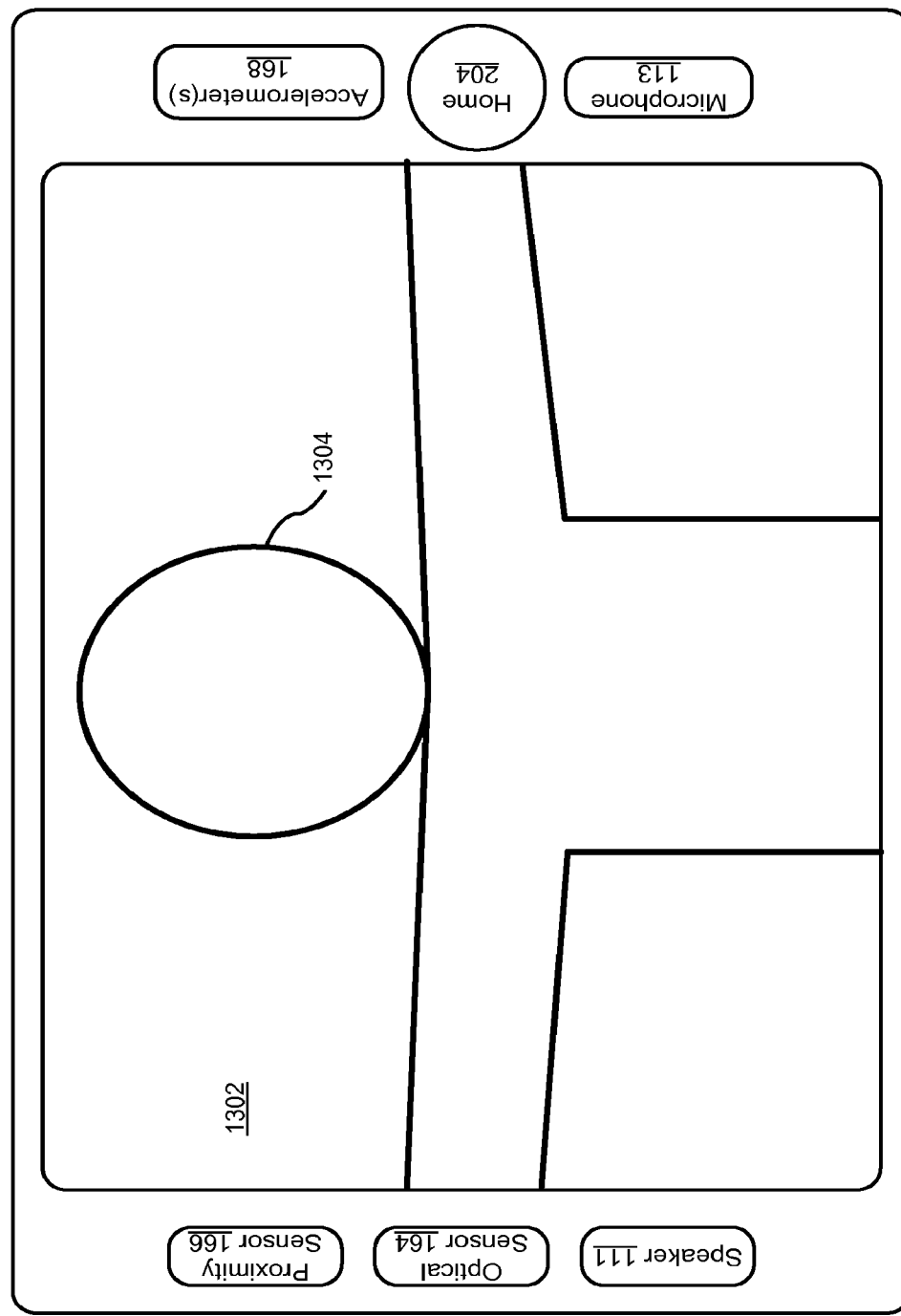

FIGS. 13A-13C illustrate the display of an electronic document at multiple magnifications in accordance with some embodiments. While FIGS. 13A-13C illustrate displaying these multiple magnifications in the context of a portable multifunction device 100, displaying these multiple magnifications is not limited to portable multifunction devices. In the example of FIGS. 13A-13C, the document is a digital image 1302 that includes an image of a person 1304.

In FIG. 13A, a digital image 1302 is displayed at a first magnification. In response to detecting a de-pinching gesture 3931/3933, decreasing portions of the digital image 1302 are displayed at increasing magnifications compared to the magnification shown in FIG. 13A. For example, the portion of the digital image 1302 shown in FIG. 13B is smaller than and has a higher magnification than the portion of the digital image 1302 shown in FIG. 13A.

In the example of FIG. 13B, the magnification exceeds a predefined magnification. Upon detecting termination of the gesture 3931/3933, a portion of the digital image 1302 is displayed at the predefined magnification, as illustrated in FIG. 13C.

Figure 14:
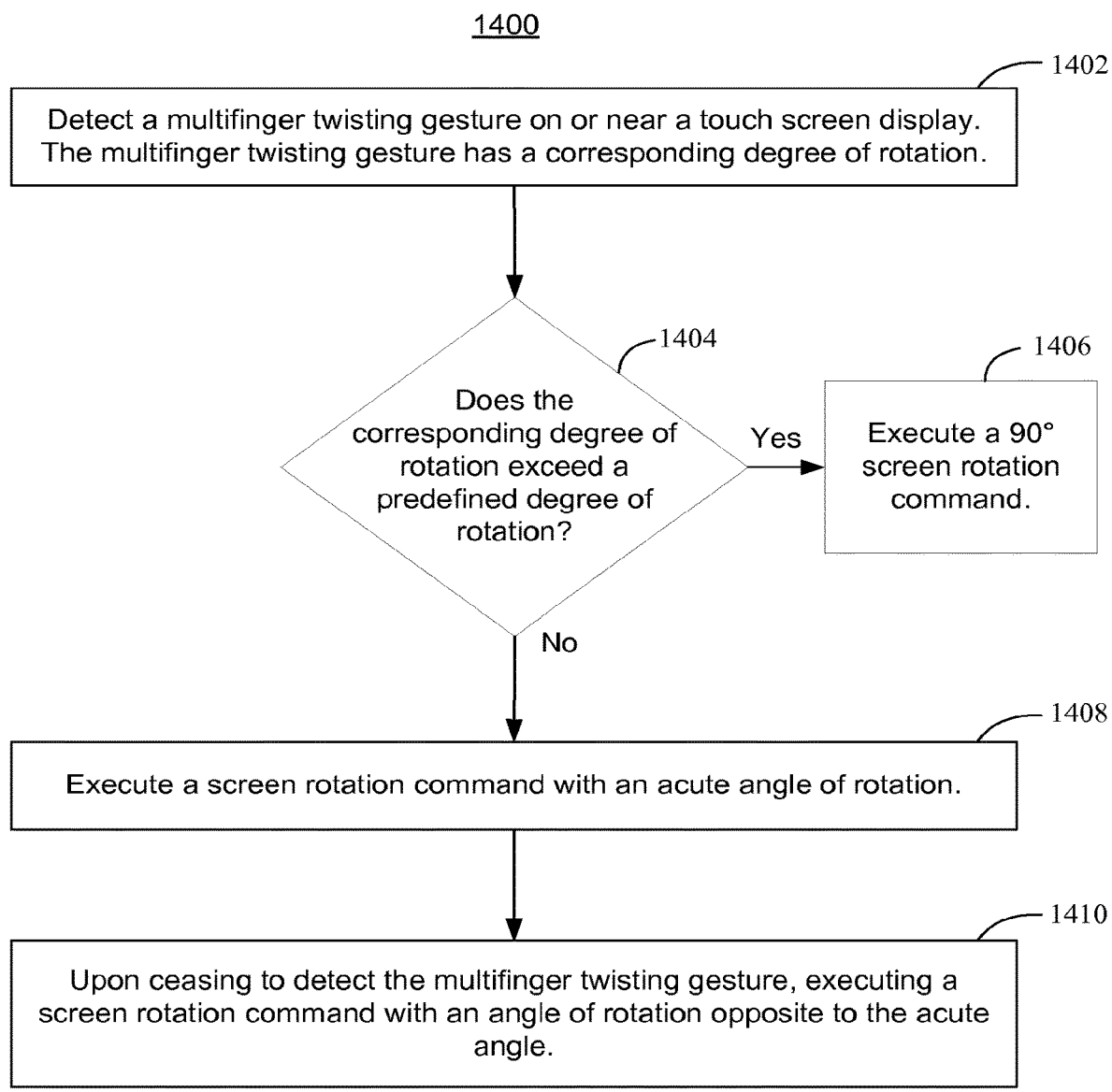
FIG. 14 is a flow diagram illustrating a process of executing a screen rotation command in accordance with some embodiments.

FIG. 14 is a flow diagram illustrating a process 1400 of executing a screen rotation command in accordance with some embodiments. The process 1400 provides a simple visual indicator to a user that the user has not provided a sufficient gesture to initiate a 90° screen rotation command.

The process 1400 is performed at a device with a touch screen display. In some embodiments, the device is a portable multifunction device.

A multifinger twisting gesture (e.g., 1506, FIG. 15A, or 1508, FIG. 15C) is detected (1402) on or near the touch screen display. The multifinger twisting gesture has a corresponding degree of rotation. In some embodiments, the multifinger twisting gesture includes gestures by two thumbs 1604-L and 1604-R (FIGS. 16A and 16D).

If the corresponding degree of rotation exceeds a predefined degree of rotation (1404—Yes), a 90° screen rotation command is executed (1406). For example, the digital image 1502 of FIGS. 15A and 16A is rotated from a portrait orientation to a landscape orientation, as shown respectively in FIGS. 15B and 16B.

If the corresponding degree of rotation does not exceed a predefined degree of rotation (1404—No), a screen rotation command with an acute angle of rotation (i.e., less than 90°) is executed (1408). For example, the digital image 1502 of FIGS. 15C and 16D is rotated by an acute angle, as shown respectively in FIGS. 15D and 16E. Upon ceasing to detect the multifinger twisting gesture, a screen rotation command is executed (1410) with an angle of rotation opposite to the acute angle (e.g., with the result shown in FIGS. 15E and 16F).

FIGS. 15A-15E illustrate rotating the display of an electronic document or other digital object in accordance with some embodiments. While FIGS. 15A-15E illustrate display rotation in the context of a portable multifunction device 100, display rotation is not limited to portable multifunction devices. In the example of FIGS. 15A-15E, the electronic document is a digital image 1502.

Figure 15A:
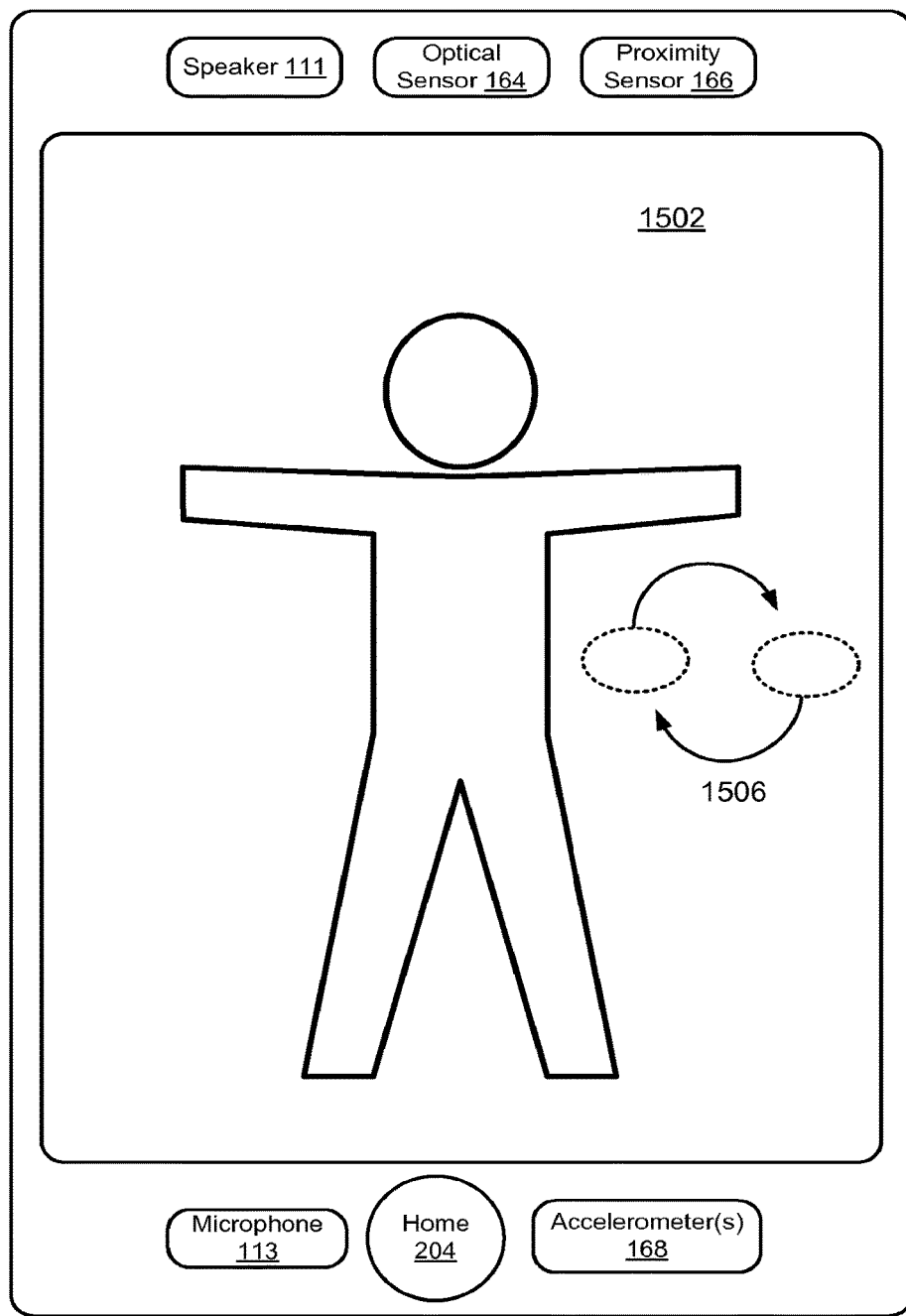
FIGS. 15A-15E illustrate rotating the display of an electronic document or other digital object in accordance with some embodiments.
Figure 15B:
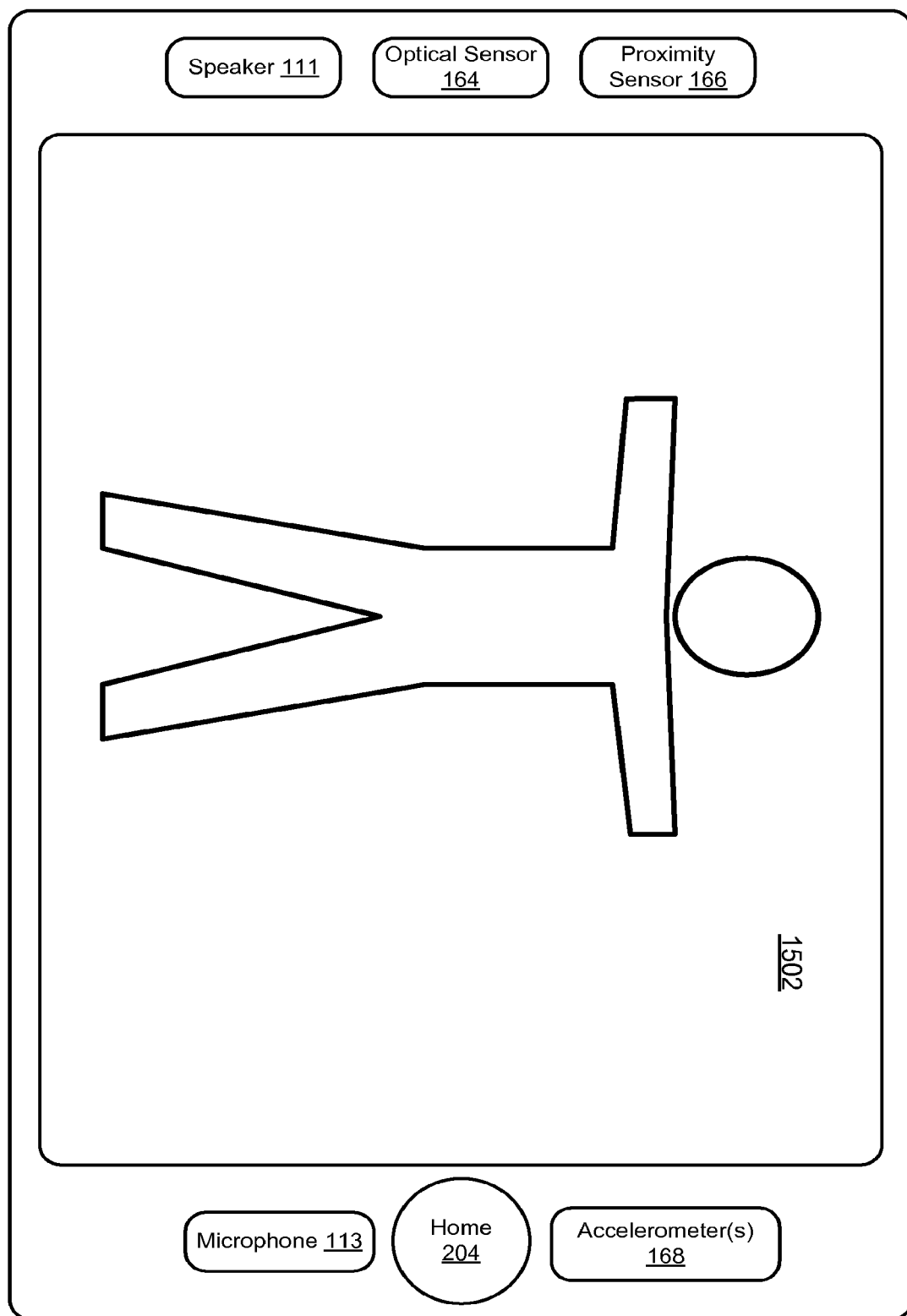
Figure 15C:
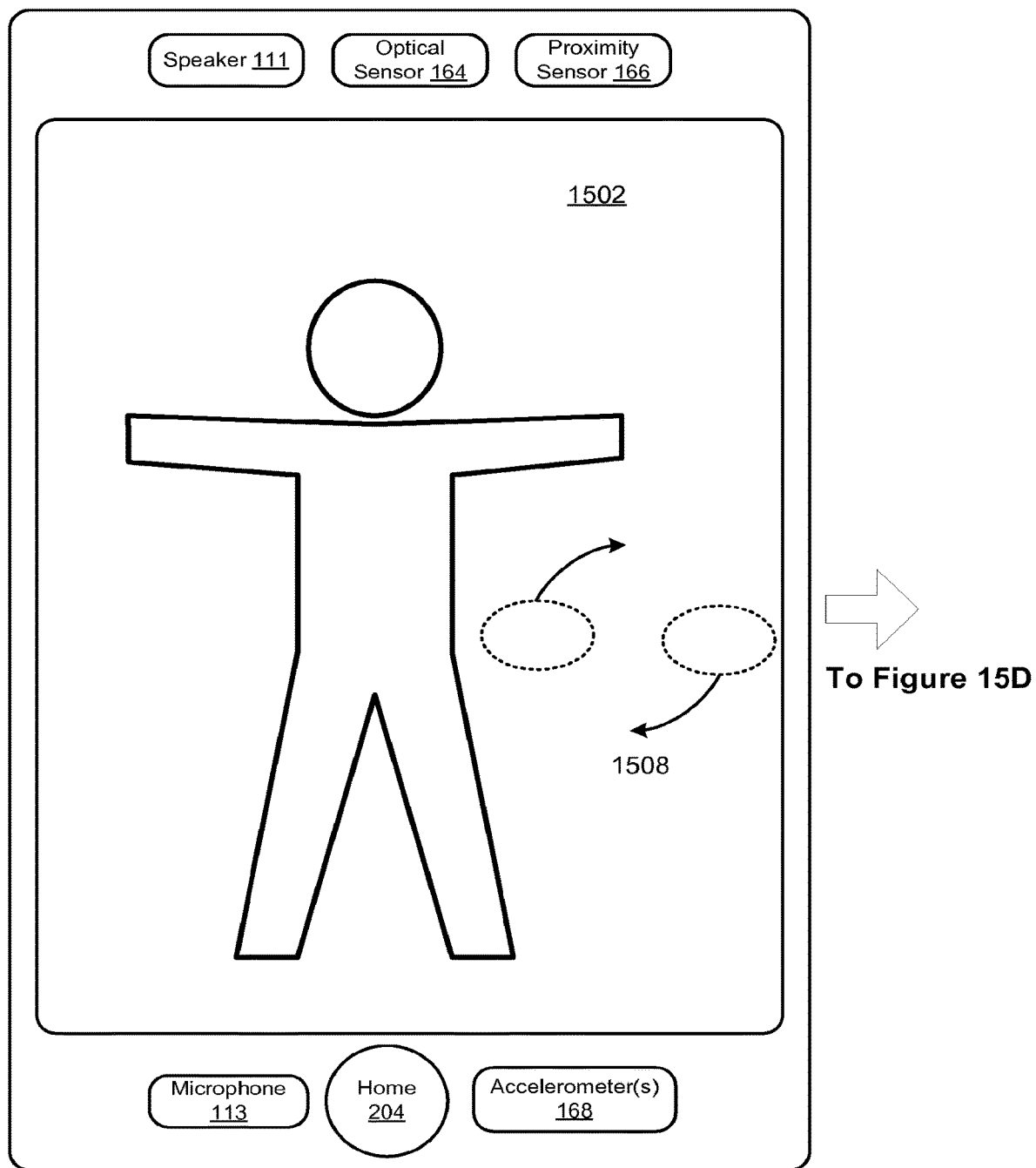
Figure 15D:
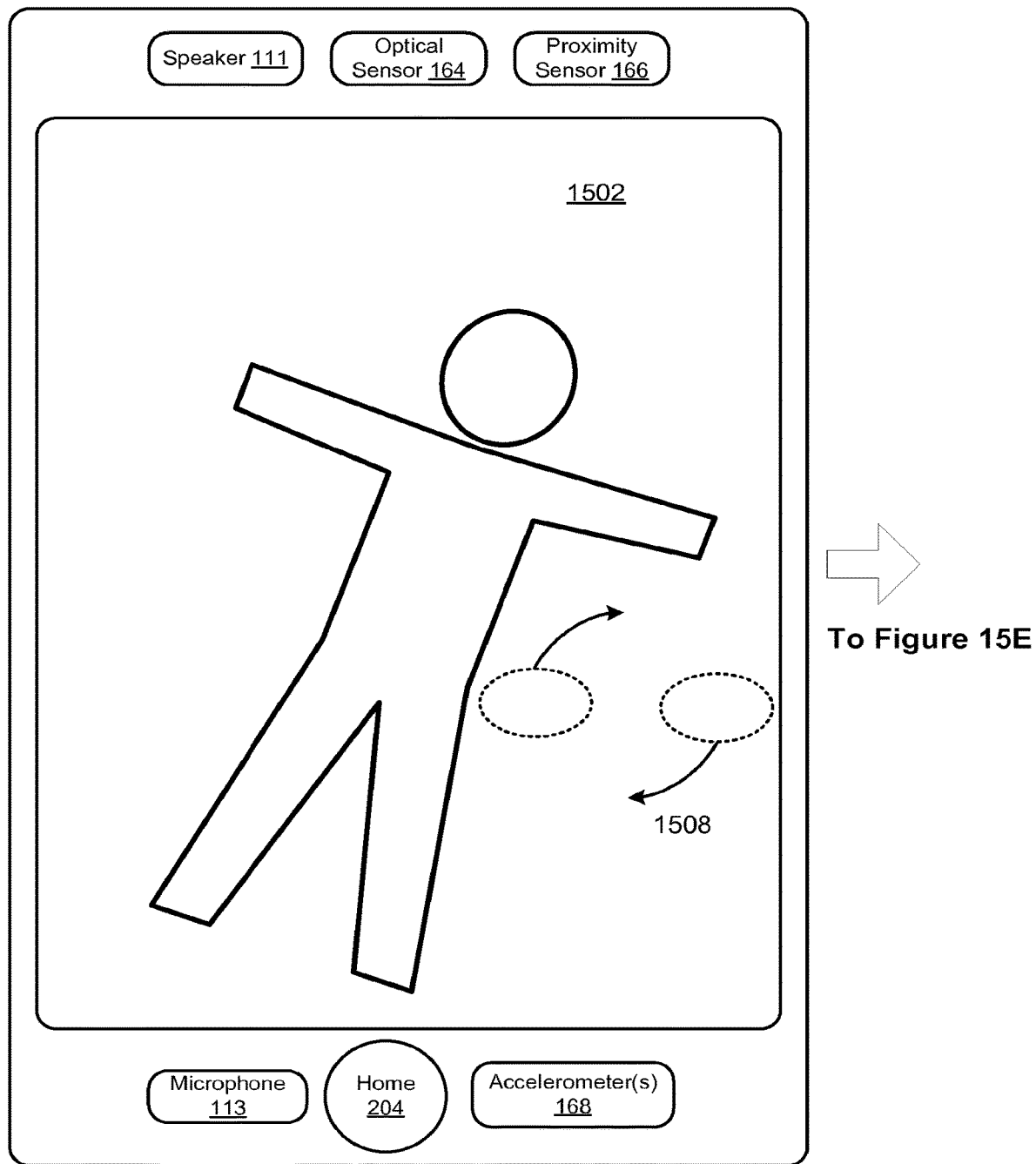
Figure 16A:
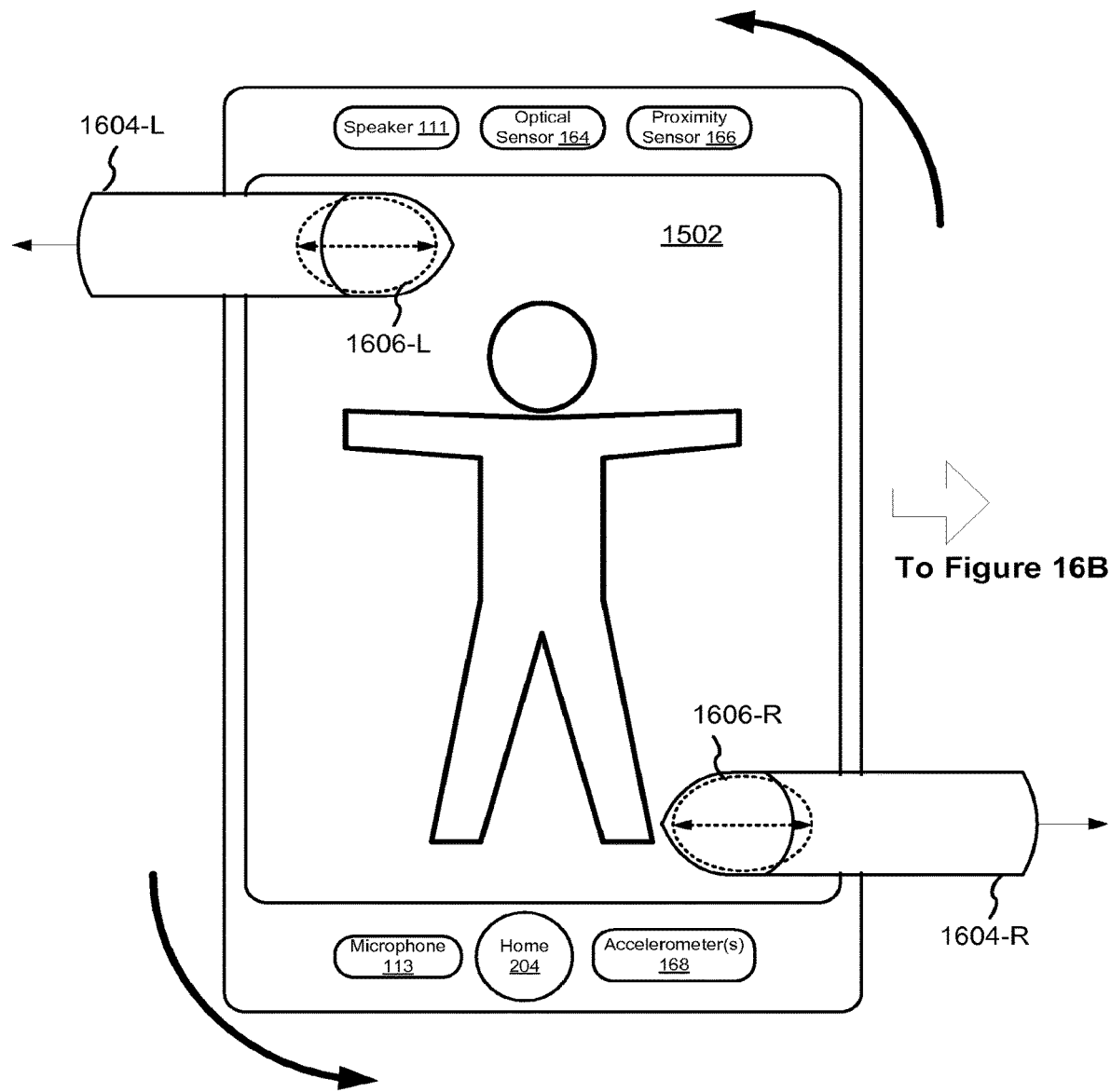
FIGS. 16A-16F illustrate an exemplary screen rotation gesture in accordance with some embodiments.
Figure 16B:
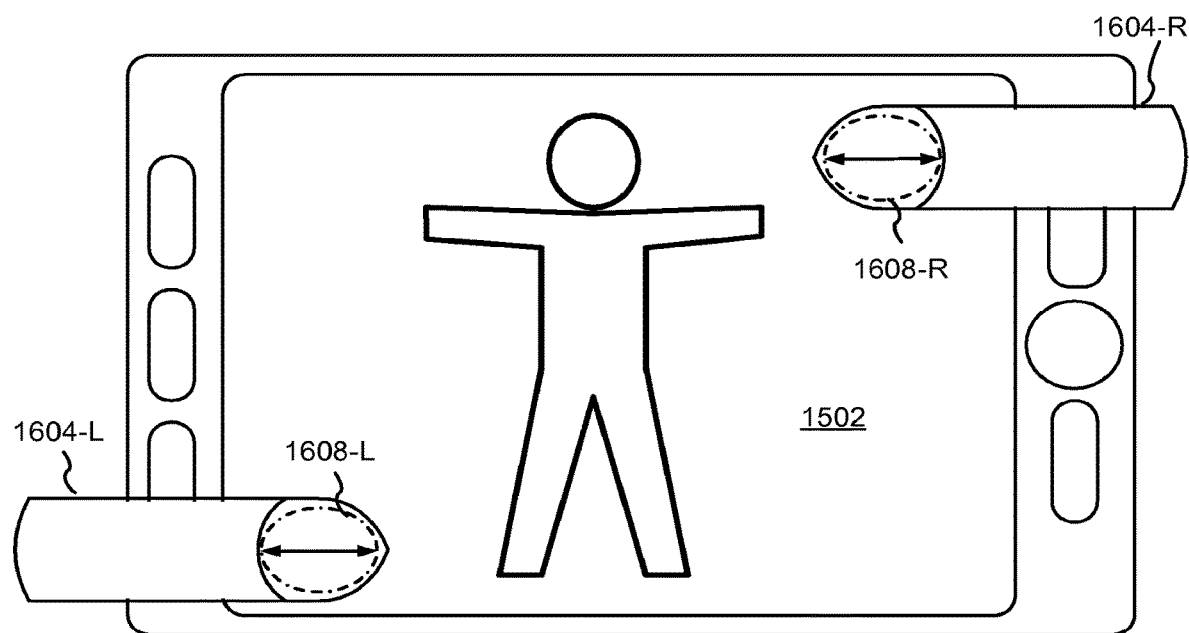
Figure 16C:
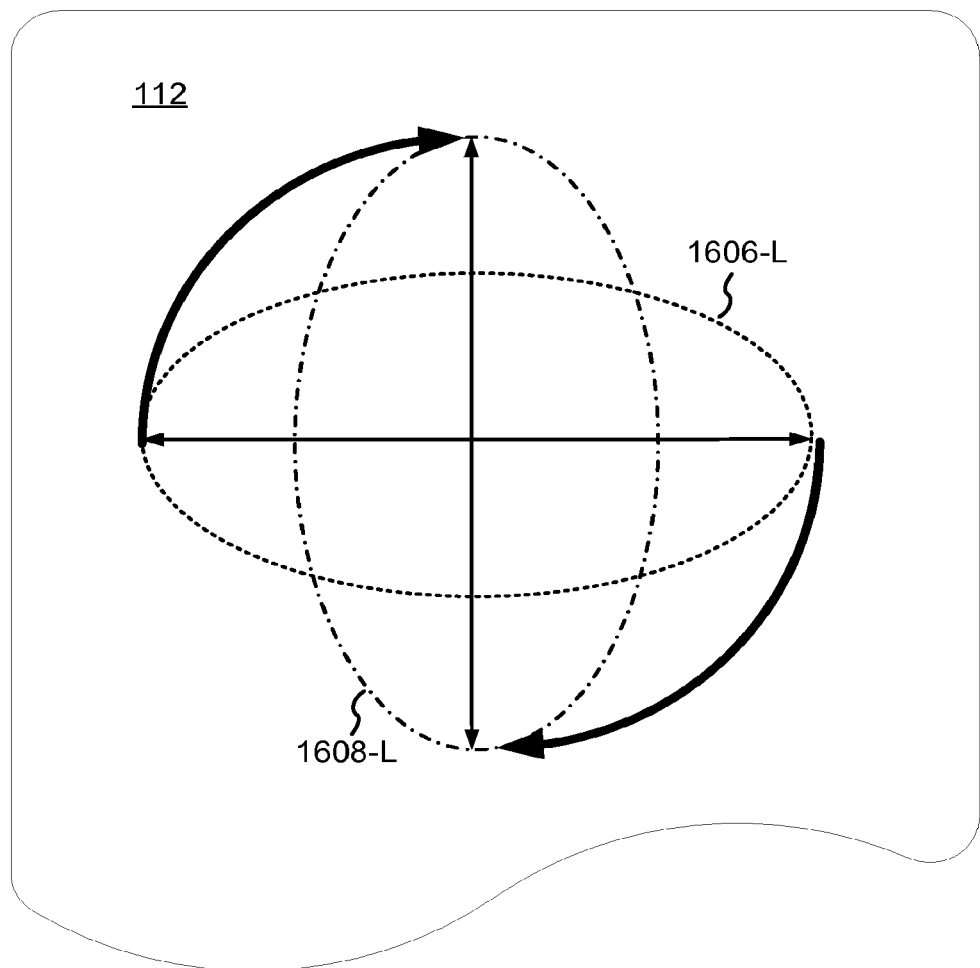
Figure 16D:
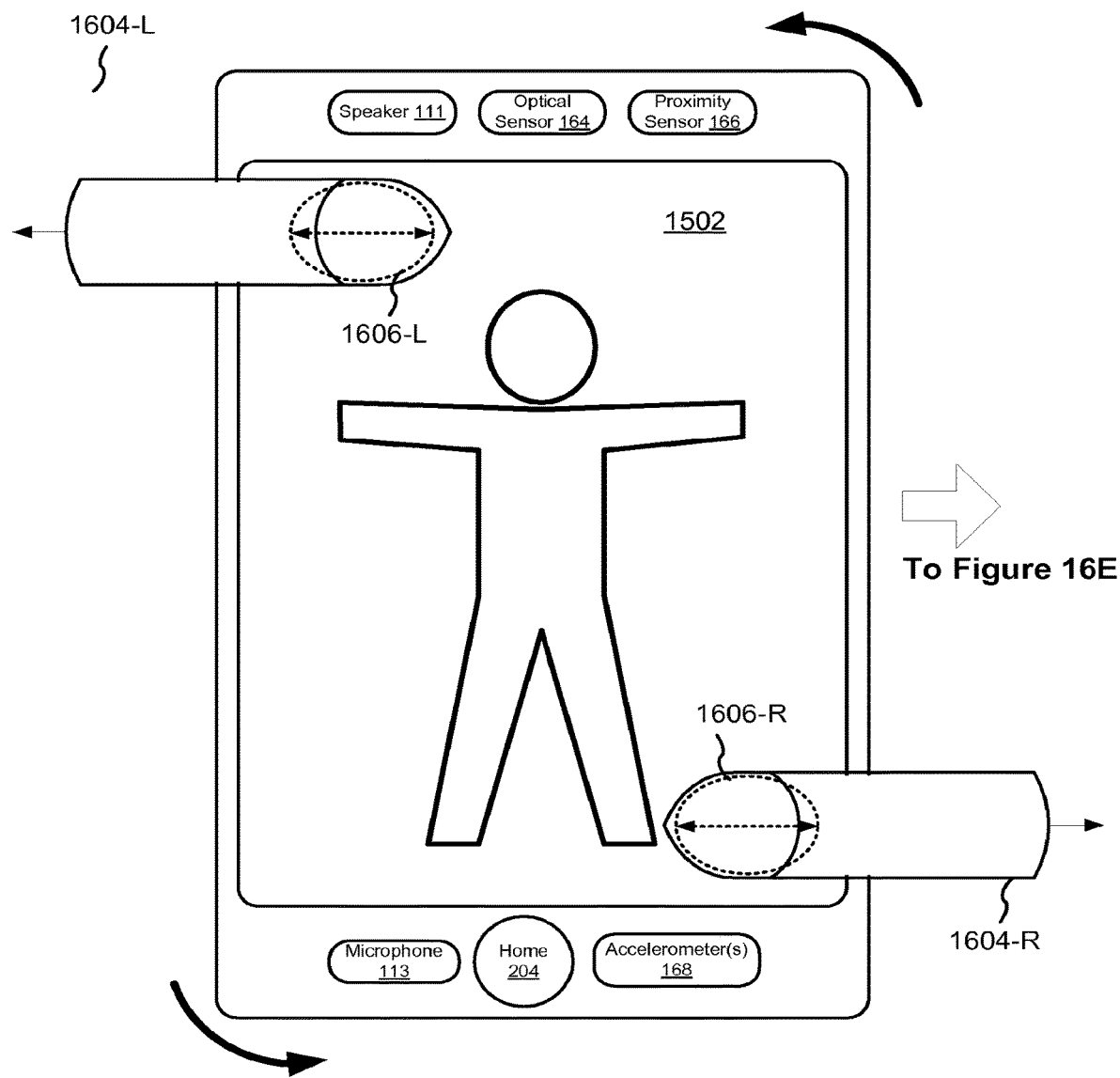
Figure 16E:
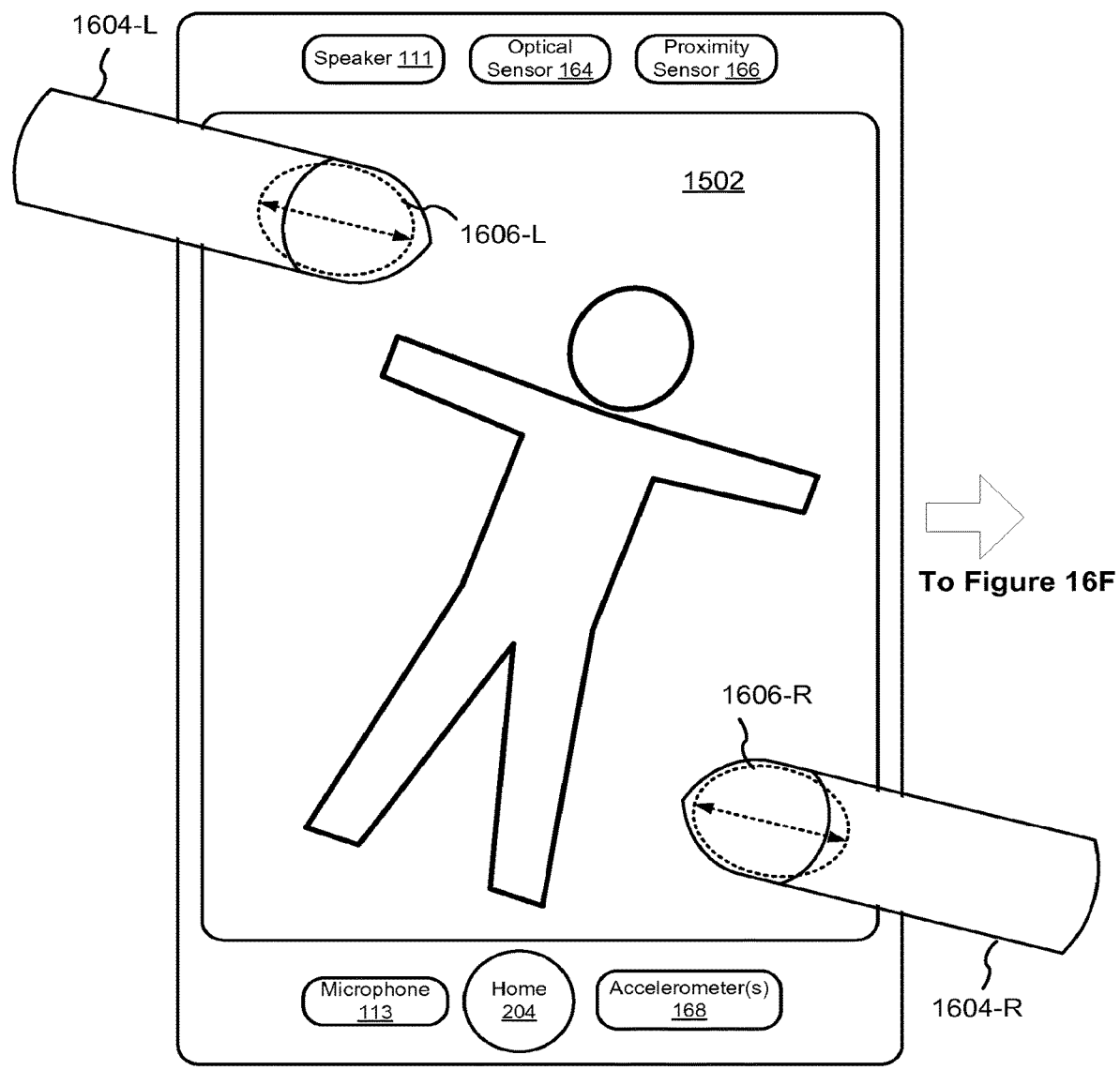

In FIGS. 15A and 15C, the digital image 1502 is displayed in a portrait orientation. A multifinger twisting gesture 1506 (FIG. 15A) or 1508 (FIG. 15C) is detected on the touch screen display. The multifinger twisting gesture 1506 or 1508 has a corresponding degree of rotation. In some embodiments, the degree of rotation corresponds to a degree of rotation of an axis between the contact points on the touch screen display of the two fingers in the multifinger gesture (e.g., an axis between the center points or centroids of the contact regions of the two fingers).

Figure 15E:
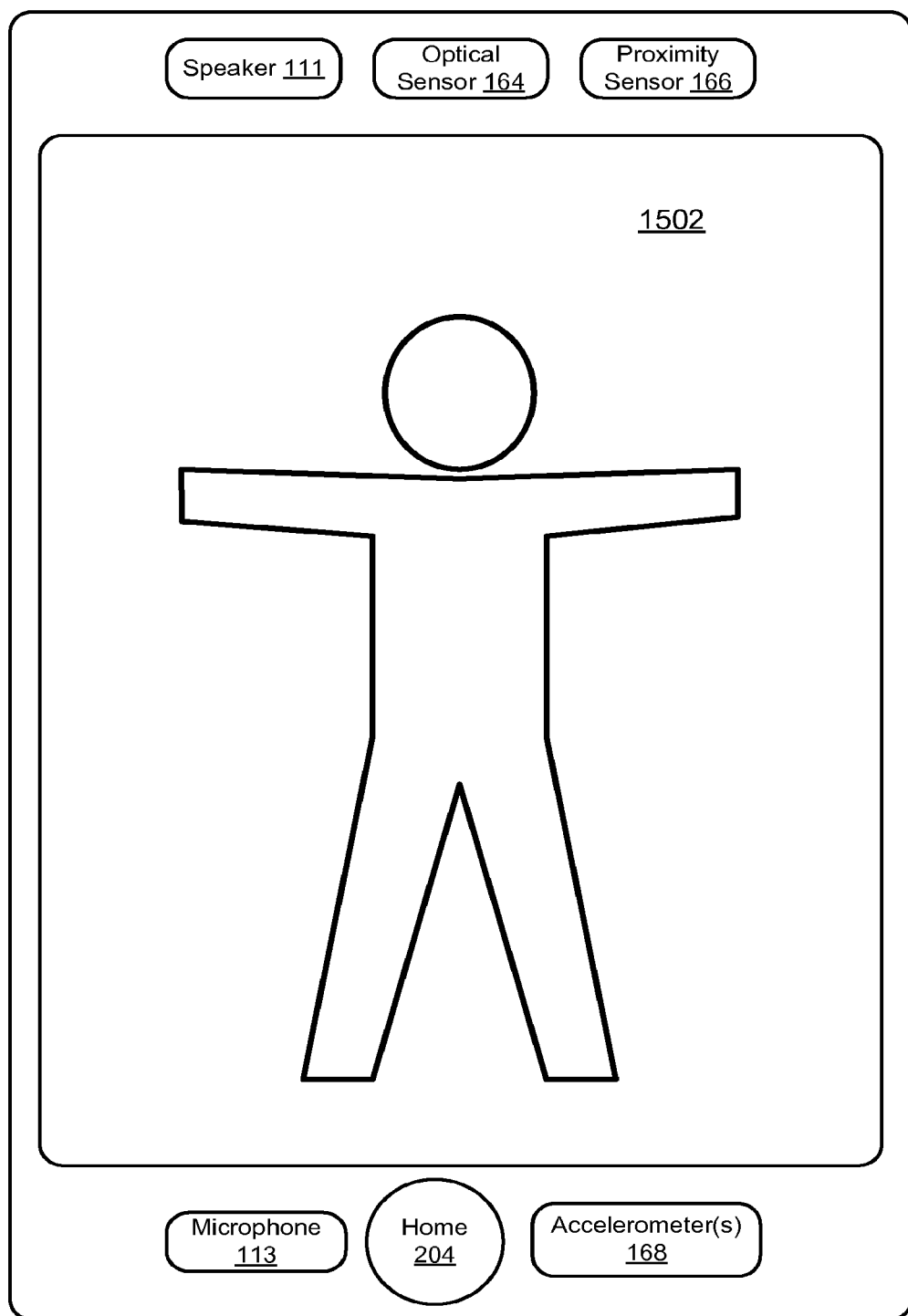

In the example of FIG. 15A, the multifinger twisting gesture 1506 has a corresponding degree of rotation that exceeds a predefined degree of rotation. Thus, a 90° screen rotation command is executed, with the result that the digital image is displayed in a landscape orientation, as shown in FIG. 15B. In the example of FIG. 15C, however, the multifinger twisting gesture 1508 has a corresponding degree of rotation that does not exceed a predefined degree of rotation. A screen rotation command with an acute angle of rotation is executed, with the result shown in FIG. 15D. Upon ceasing to detect the multifinger twisting gesture 1508, a screen rotation command with an angle opposite to the acute angle is executed, with the result that the portrait orientation of the digital image 1502 is restored, as shown in FIG. 15E.

FIGS. 16A-16F illustrate an exemplary screen rotation gesture in accordance with some embodiments. While FIGS. 16A-16F illustrate this screen rotation gesture in the context of a portable multifunction device 100, this screen rotation gesture is not limited to portable multifunction devices. In the example of FIGS. 16A-16F, this screen rotation gesture is used to rotate the digital image 1502.

In FIG. 16A, the device 100 displays the digital image 1502 in a portrait orientation. Simultaneous rotation of two thumbs (e.g., 1604-L and 1604-R) in a first sense of rotation is detected on the touch screen display 112. In some embodiments, the first sense of rotation is a clockwise rotation (e.g., FIG. 16C). The simultaneous rotation of the two thumbs has a corresponding degree of rotation.

In some embodiments, the sense of rotation for each thumb is detected by monitoring the change in orientation of the contact area of the thumb with the touch screen display. For example, if the contact area of the thumb is elliptical, the change in the orientation of an axis of the ellipse may be detected (e.g., from contact ellipse 1606-L in FIG. 16A to contact ellipse 1608-L in FIG. 16B, as shown on an enlarged portion of touch screen 112 in FIG. 16C). In some embodiments, the change in the orientation of the axis of the ellipse determines the corresponding degree of rotation. In some embodiments, at least some of a user's other fingers (i.e., fingers other than thumbs 1604-L and 1604-R) support the device 100 by contacting the backside of the device.

In some embodiments, the first sense of rotation is a counterclockwise rotation. For example, if thumb 1604-L is initially on the lower left side of touch screen 112 (rather than the upper left side in FIG. 16A), thumb 1604-R is initially on the upper right side of touch screen 112 (rather than the lower right side in FIG. 16A), and the thumbs are moved apart from each other, then the sense of rotation detected by the touch screen 112 will be counterclockwise for both thumbs.

If the corresponding degree of rotation exceeds a predefined degree of rotation, a 90° screen rotation command is executed. For example, display of the digital image 1502 is rotated from the portrait orientation of FIG. 16A to a landscape orientation in FIG. 16B.

Figure 16F:
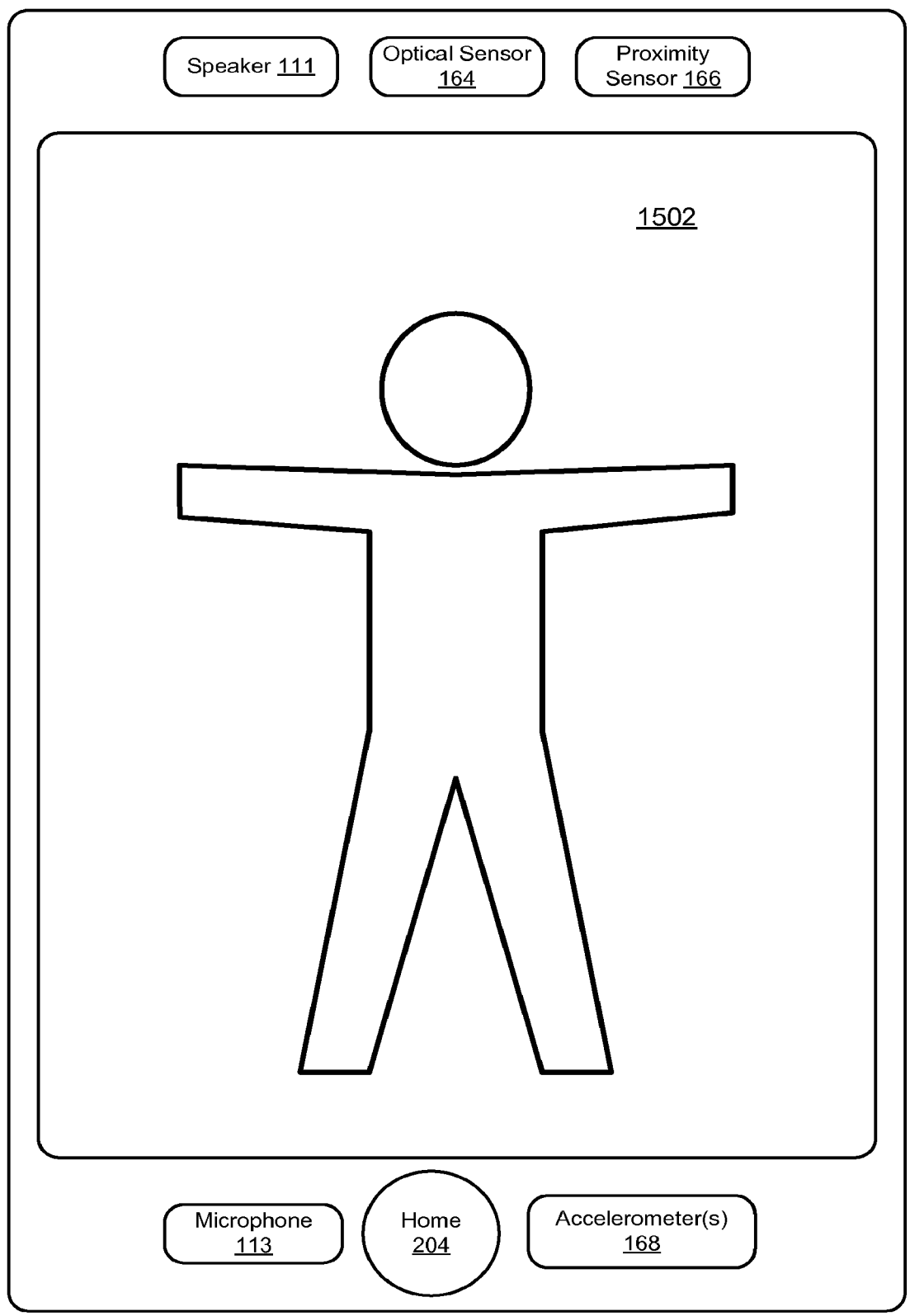

If, however, the corresponding degree of rotation does not exceed a predefined degree of rotation, a screen rotation command with an acute angle of rotation is executed. For example, the digital image 1502 in FIG. 16D is rotated by an acute angle, with the result shown in FIG. 16E. Once detection of the two thumbs 1604-L and 1604-R ceases, a screen rotation command with an angle of rotation opposite to the acute angle is executed, thereby restoring the digital image 1502 to a portrait orientation, as shown in FIG. 16F.

While FIGS. 6A-6D, 8A-8D, 10A-10C, 12A-12C, 13A-13C, 15A-15E, and 16A-16F illustrate scrolling, translation, scaling, and rotation operations in the context of a portable multifunction device 100, similar operations may be performed on any device with a touch-screen display, in accordance with some embodiments. The device, such as device 1700 below, may or may not be portable and the function or functions performed by the device may vary.

FIG. 17 is a block diagram illustrating a device 1700 with a touch-screen display in accordance with some embodiments. Device 1700 need not be portable. The device 1700 typically includes one or more processing units (CPU's) 1710, one or more network or other communications interfaces 1760, memory 1770, and one or more communication buses 1720 for interconnecting these components. The communication buses 1720 may include circuitry (sometimes called a chipset) that interconnects and controls communications between system components. The device 1700 includes a user interface 1730 comprising a touch-screen display 1740. The user interface 1730 also may include a keyboard and/or mouse (or other pointing device) 1750. Memory 1770 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1770 may optionally include one or more storage devices remotely located from the CPU(s) 1710. In some embodiments, memory 1770 stores programs, modules, and data structures analogous to the programs, modules, and data structures stored in the memory 102 of portable multifunction device 100 (FIG. 1), or a subset thereof. Furthermore, memory 1770 may store additional programs, modules, and data structures (not shown) not present in the memory 102 of portable multifunction device 100.

Each of the above identified elements in FIG. 17 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1770 may store a subset of the modules and data structures identified above. Furthermore, memory 1770 may store additional modules and data structures not described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch screen display;
one or more processors;
memory; and
one or more programs, wherein the one or more programs are stored in the memory and configured to be executed by the one or more processors, the one or more programs including instructions for:
displaying one or more of a series of items in a list;
detecting a movement of an object on the touch screen display;
in response to detecting the movement, translating the displayed one or more items in a first direction;
in response to continuing to detect movement of the object on the touch screen display after a terminus of the list has been reached, displaying an indication that the terminus of the list has been reached; and
in response to detecting that the object is no longer in contact with the touch screen display, ceasing to display the indication.

2. The electronic device of claim 1, wherein the one or more programs further include instructions for: in response to detecting that the object is no longer in contact with the touch screen display, translating the one or more items in a second direction.

3. The electronic device of claim 1, wherein displaying the indication includes displaying a colored indication visually distinct from the one or more items.

4. The electronic device of claim 1, wherein a direction of movement of the object corresponds to the translation of the one or more items in the first direction.

5. The electronic device of claim 1, wherein the object is a finger.

6. The electronic device of claim 1, wherein the first direction is a vertical direction, a horizontal direction, or a diagonal direction.

7. The electronic device of claim 2, wherein the second direction is opposite the first direction.

8. The electronic device of claim 1, wherein translating in the first direction prior to reaching the terminus of the list has an associated speed of translation that corresponds to a speed of movement.

9. The electronic device of claim 1, wherein translating in the first direction is in accordance with a simulation of an equation of motion having friction.

10. The electronic device of claim 2, wherein translating the one or more items in the second direction is a damped motion.

11. The electronic device of claim 1, wherein displaying the indication comprises displaying an area beyond the terminus of the list.

12. The electronic device of claim 11, wherein the area beyond the terminus of the list is black, gray, a solid color, or white.

13. The electronic device of claim 2, wherein changing from translating in the first direction to translating in the second direction makes the terminus of the list appear to be elastically attached to an edge of the touch screen display or to an edge displayed on the touch screen display.

14. The electronic device of claim 1, wherein the indication that the terminus of the list has been reached is an indication that movement of the object on the touch screen display continues to be detected after the terminus of the list has been reached.

15. A non-transitory computer-readable storage medium storing one or more programs configured to be executed by one or more processors of an electronic device with a touch screen display, the one or more programs including instructions for:
displaying one or more of a series of items in a list;
detecting a movement of an object on the touch screen display;
in response to detecting the movement, translating the displayed one or more items in a first direction;
in response to continuing to detect movement of the object on the touch screen display after a terminus of the list has been reached, displaying an indication that the terminus of the list has been reached; and
in response to detecting that the object is no longer in contact with the touch screen display, ceasing to display the indication.

16. A method, comprising:
at an electronic device having a touch screen display:
displaying one or more of a series of items in a list;
detecting a movement of an object on the touch screen display;
in response to detecting the movement, translating the displayed one or more items in a first direction;
in response to continuing to detect movement of the object on the touch screen display after a terminus of the list has been reached, displaying an indication that the terminus of the list has been reached; and
in response to detecting that the object is no longer in contact with the touch screen display, ceasing to display the indication.

17. The non-transitory computer-readable storage medium of claim 15, wherein the one or more programs further include instructions for: in response to detecting that the object is no longer in contact with the touch screen display, translating the one or more items in a second direction.

18. The non-transitory computer-readable storage medium of claim 15, wherein displaying the indication includes displaying a colored indication visually distinct from the one or more items.

19. The non-transitory computer-readable storage medium of claim 15, wherein a direction of movement of the object corresponds to the translation of the one or more items in the first direction.

20. The non-transitory computer-readable storage medium of claim 15, wherein the object is a finger.

21. The non-transitory computer-readable storage medium of claim 15, wherein the first direction is a vertical direction, a horizontal direction, or a diagonal direction.

22. The non-transitory computer-readable storage medium of claim 17, wherein the second direction is opposite the first direction.

23. The non-transitory computer-readable storage medium of claim 15, wherein translating in the first direction prior to reaching the terminus of the list has an associated speed of translation that corresponds to a speed of movement.

24. The non-transitory computer-readable storage medium of claim 15, wherein translating in the first direction is in accordance with a simulation of an equation of motion having friction.

25. The non-transitory computer-readable storage medium of claim 17, wherein translating the one or more items in the second direction is a damped motion.

26. The non-transitory computer-readable storage medium of claim 15, wherein displaying the indication comprises displaying an area beyond the terminus of the list.

27. The non-transitory computer-readable storage medium of claim 26, wherein the area beyond the terminus of the list is black, gray, a solid color, or white.

28. The non-transitory computer-readable storage medium of claim 17, wherein changing from translating in the first direction to translating in the second direction makes the terminus of the list appear to be elastically attached to an edge of the touch screen display or to an edge displayed on the touch screen display.

29. The non-transitory computer-readable storage medium of claim 15, wherein the indication that the terminus of the list has been reached is an indication that movement of the object on the touch screen display continues to be detected after the terminus of the list has been reached.

30. The method of claim 16, further comprising in response to detecting that the object is no longer in contact with the touch screen display, translating the one or more items in a second direction.

31. The method of claim 16, wherein displaying the indication includes displaying a colored indication visually distinct from the one or more items.

32. The method of claim 16, wherein a direction of movement of the object corresponds to the translation of the one or more items in the first direction.

33. The method of claim 16, wherein the object is a finger.

34. The method of claim 16, wherein the first direction is a vertical direction, a horizontal direction, or a diagonal direction.

35. The method of claim 30, wherein the second direction is opposite the first direction.

36. The method of claim 16, wherein translating in the first direction prior to reaching the terminus of the list has an associated speed of translation that corresponds to a speed of movement.

37. The method of claim 16, wherein translating in the first direction is in accordance with a simulation of an equation of motion having friction.

38. The method of claim 30, wherein translating the one or more items in the second direction is a damped motion.

39. The method of claim 16, wherein displaying the indication comprises displaying an area beyond the terminus of the list.

40. The method of claim 39, wherein the area beyond the terminus of the list is black, gray, a solid color, or white.

41. The method of claim 30, wherein changing from translating in the first direction to translating in the second direction makes the terminus of the list appear to be elastically attached to an edge of the touch screen display or to an edge displayed on the touch screen display.

42. The method of claim 16, wherein the indication that the terminus of the list has been reached is an indication that movement of the object on the touch screen display continues to be detected after the terminus of the list has been reached.

* * * * *